US006452611B1

(12) United States Patent
Gerba et al.

(10) Patent No.: US 6,452,611 B1
(45) Date of Patent: *Sep. 17, 2002

(54) METHOD AND SYSTEM FOR PROVIDING DYNAMICALLY CHANGING PROGRAMMING CATEGORIES

(75) Inventors: George Gerba, Venice; Robert Lambert, Glendale; Michael Nichols, Altadena, all of CA (US)

(73) Assignee: Corporate Media Partners, Los Angeles, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/103,316

(22) Filed: Jun. 24, 1998

Related U.S. Application Data

(63) Continuation-in-part of application No. 09/018,541, filed on Feb. 4, 1998.

(51) Int. Cl.[7] ............................................... G06K 15/00
(52) U.S. Cl. ....................................... 345/721; 345/821
(58) Field of Search ................................. 345/327, 356, 345/328–330, 333, 340, 352–355, 821, 786, 721, 720, 722, 726, 822–824, 853–855; 709/217; 725/109, 46, 41

(56) References Cited

U.S. PATENT DOCUMENTS

| 4,495,654 A | 1/1985 | Deiss .......................... 455/151 |
| 4,527,194 A | 7/1985 | Sirazi ........................... 358/86 |
| 4,641,205 A | 2/1987 | Beyers, Jr. ................. 360/33.1 |
| 4,751,578 A | 6/1988 | Reiter et al. ................. 358/183 |
| 4,847,696 A | 7/1989 | Matsumoto et al. ........ 358/335 |
| 4,885,775 A | 12/1989 | Lucas ........................... 380/10 |
| 5,014,125 A | 5/1991 | Pocock et al. ................. 358/86 |
| 5,038,211 A | 8/1991 | Hallenbeck .................. 358/142 |
| 5,093,718 A | 3/1992 | Hoarty et al. .................. 358/84 |
| 5,210,611 A | 5/1993 | Yee et al. ................. 358/191.1 |
| 5,220,420 A | 6/1993 | Hoarty et al. ................. 358/86 |
| 5,410,344 A | 4/1995 | Graves et al. ................. 348/1 |
| 5,469,206 A | 11/1995 | Strubbe et al. ................ 348/7 |
| 5,517,254 A | 5/1996 | Monta et al. ................ 348/569 |
| 5,524,195 A | 6/1996 | Clanton, III et al. ........ 395/155 |
| 5,552,837 A | 9/1996 | Mankovitz .................. 348/734 |
| 5,592,551 A | 1/1997 | Lett et al. ...................... 380/20 |
| 5,596,373 A | 1/1997 | White et al. ................. 348/569 |
| 5,619,249 A | 4/1997 | Billock et al. .................. 348/7 |
| 5,623,613 A | 4/1997 | Rowe et al. ................. 395/353 |
| 5,625,763 A | 4/1997 | Cirne .......................... 395/133 |
| 5,629,733 A | 5/1997 | Youman et al. ................. 348/7 |
| 5,630,119 A | 5/1997 | Aristides et al. ............ 395/601 |
| 5,659,350 A * | 8/1997 | Hendricks et al. ............. 348/6 |
| 5,673,089 A | 9/1997 | Yuen et al. ................. 348/734 |

(List continued on next page.)

*Primary Examiner*—Steven Sax
(74) *Attorney, Agent, or Firm*—Brown Raysman Millstein Felder & Steiner LLP

(57) ABSTRACT

A method and system for providing dynamically changing sets of categories of television programming. The method involves a person or intelligent agent generating at a head end a first data set identifying programming categories based at least in part on programming choices available for viewing at a first time. This data set is transmitted from the head end to remote receivers, which display the set of programming categories to the viewer who can select a category and view the various programming choices within the category. The method further involves generating a second data set identifying different programming categories based at least in part on programming choices available for viewing at a second time later than the first time. This second set is also transmitted to remote receivers so that viewers see an updated set of programming categories. Thus, viewers are always presented with categories for which programming is currently available.

29 Claims, 57 Drawing Sheets

U.S. PATENT DOCUMENTS

| | | | |
|---|---|---|---|
| 5,737,029 A | 4/1998 | Ohkura et al. | 348/564 |
| 5,751,282 A | 5/1998 | Girard et al. | 345/327 |
| 5,754,258 A | 5/1998 | Hanaya et al. | 348/734 |
| 5,758,257 A * | 5/1998 | Herz et al. | 455/2 |
| 5,808,694 A | 9/1998 | Usui et al. | 348/569 |
| 5,809,204 A | 9/1998 | Young et al. | 386/83 |
| 5,822,123 A | 10/1998 | Davis et al. | 348/564 |
| 5,880,768 A * | 3/1999 | Lemmons et al. | 348/1 |
| 5,886,746 A | 3/1999 | Yuen et al. | 348/564 |
| 5,940,073 A | 8/1999 | Klosterman et al. | 345/327 |
| 5,959,688 A | 9/1999 | Schein et al. | 348/569 |
| 5,969,748 A | 10/1999 | Casement et al. | 348/7 |
| 5,986,650 A | 11/1999 | Ellis et al. | 345/327 |
| 5,987,213 A | 11/1999 | Mankovitz et al. | 386/83 |
| 6,020,883 A * | 2/2000 | Herz et al. | 345/327 |
| 6,052,145 A | 4/2000 | Macrae et al. | 348/10 |
| 6,052,554 A * | 4/2000 | Hendricks et al. | 455/5.1 |
| 6,078,348 A | 6/2000 | Klosterman et al. | 348/10 |

\* cited by examiner

| GUIDE | | TITLE | NEXT 1 | NEXT 2 |
|---|---|---|---|---|
| ALL | XYZ | INDEPENDENCE... | 9:00p | 11:30p |
| NOW | HITS! | SHINE | 9:00p | 11:00p |
| 9:30 | LAST TIME | SLING BLADE | 9:00p | — |
| 10:00 | HITS! | CRASH | 9:00p | 10:30p |
| THE HITS | HITS! | NIXON | 10:30p | 12:45p |
| OUR PICKS | HITS! | 1995 (DIR. OLIVER STONE) STARRING ANTHONY HOPKINS. THE STORY OF RICHARD M _____ RATING (R) 1 HR 57 MIN. | | |
| COMEDIES | XYZ | | | |
| DRAMAS | XYZ | | | |
| 10:22p | XYZ | | | |

FIG. 10A

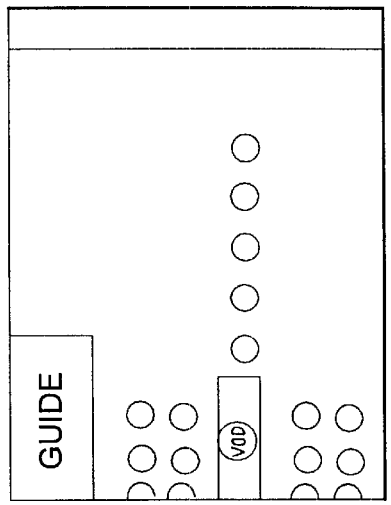
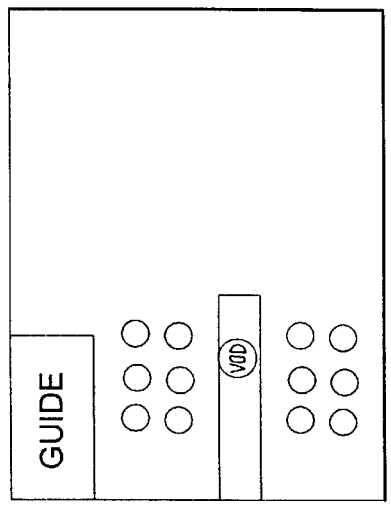
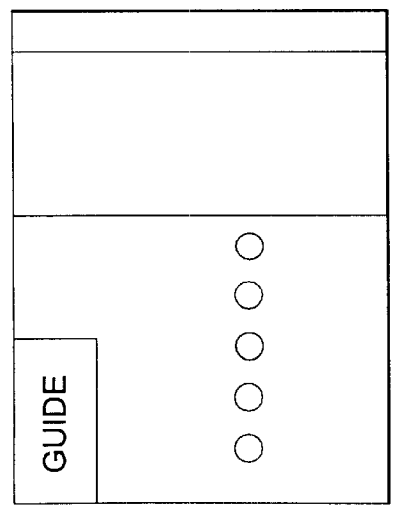
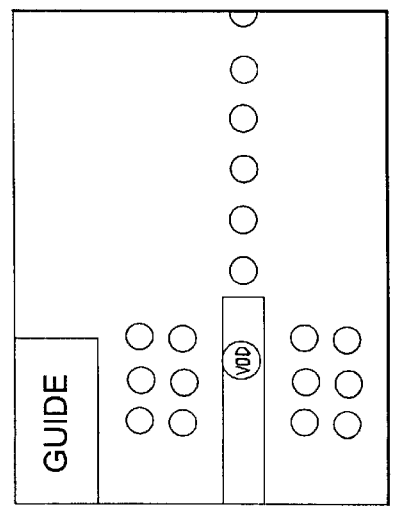

| GUIDE | | TITLE | NEXT 1 | NEXT 2 |
|---|---|---|---|---|
| ALL<br>NOW 9:30<br>10:00<br>THE HITS<br>OUR PICKS<br>COMEDIES<br>DRAMAS | XYZ | INDEPENDENCE.... | 9:00p | 11:30p |
| | HITS! | SHINE | 9:00p | 11:00p |
| | LAST TIME | SLING BLADE | 9:00p | — |
| | HITS! | CRASH | 9:00p | 10:30p |
| | HITS! | NIXON | 10:30p | 12:45p |
| | HITS! | 1995 (DIR. OLIVER STONE) STARRING ANTHONY HOPKINS. THE STORY OF RICHARD M _____ | | |
| | XYZ | | | |
| 10:22p | XYZ | _____ RATING (R) 1 HR 57 MIN. | | |
| | XYZ | | | |

| BEWITCHED | I LOVE LUCY | JAG | M*A*S*H* |
|---|---|---|---|
| FRIENDS | MELROSE PLACE | JERRY SPRINGER | KING OF THE HILL |
| DICK VAN DYKE | MR. ED | HAPPY DAYS | JAWS |
| SMALL WONDER | SMALL WONDER | SPIDERMAN | ABC NEWS |
| TRACY ULLMAN | HONEYMOONERS | VIPER | SPORTS REVIEW |
| MAD ABOUT YOU | THE SIMPSONS | X-FILES | TONIGHT |
| ALL MY CHILDREN | DYNASTY | GENERAL HOSPITAL | NBC NEWS |
| SUNSET BEACH | JEOPARDY | BIONIC WOMAN | CBS NEWS |

604 — (near MR. ED / HAPPY DAYS)
C
602

| SEINFELD | BEWITCHED | I LOVE LUCY | JAG |
|---|---|---|---|
| COPS | FRIENDS | MELROSE PLACE | JERRY SPRINGER |
| KNIGHT RIDER | DICK VAN DYKE | MR. ED | HAPPY DAYS |
| SUPERMAN | SMALL WONDER | ~604 | SPIDERMAN |
| THE LUCY SHOW | TRACY ULLMAN | HONEY-MOONERS | VIPER I |
| PARTY OF FIVE | MAD ABOUT YOU | THE SIMPSONS | X-FILES |
| ER | ALL MY CHILDREN | DYNASTY | GENERAL HOSPITAL |
| SANTA BARBARA | SUNSET BEACH | JEOPARDY | BIONIC WOMAN |

FIG. 24A

| SEINFELD | BEWITCHED | I LOVE LUCY | JAG | M*A*S*H* |
|---|---|---|---|---|
| COPS | FRIENDS | MELROSE PLACE | JERRY SPRINGER | KING OF HILL |
| KNIGHT RIDER | DICK VAN DYKE | MR. ED | HAPPY DAYS | JAWS |
| SUPERMAN | SMALL WONDER | | SPIDERMAN | ABC NEWS |
| THE LUCY SHOW | TRACY ULLMAN | HONEY-MOONERS | VIPER I | SPORTS REVIEW |
| PARTY OF FIVE | MAD ABOUT YOU | THE SIMPSONS | X-FILES | TONIGHT |
| ER | ALL MY CHILDREN | DYNASTY | GENERAL HOSPITAL | NBC NEWS |
| SANTA BARBARA | SUNSET BEACH | JEOPARDY | BIONIC WOMAN | CBS NEWS |

FIG. 24B

| BEWITCHED | I LOVE LUCY | JAG | M*A*S*H* |
|---|---|---|---|
| FRIENDS | MELROSE PLACE | JERRY SPRINGER | KING OF HILL |
| DICK VAN DYKE | MR. ED | HAPPY DAYS | JAWS |
| 604 | SMALL WONDER | SPIDERMAN | ABC NEWS |
| TRACY ULLMAN | HONEY-MOONERS | VIPER I | SPORTS REVIEW |
| MAD ABOUT YOU | THE SIMPSONS | X-FILES | TONIGHT |
| ALL MY CHILDREN | DYNASTY | GENERAL HOSPITAL | NBC NEWS |
| SUNSET BEACH | JEOPARDY | BIONIC WOMAN | CBS NEWS |

| GUIDE | TODAY | | TOMORROW |
|---|---|---|---|
| ALL SHOWS<br>MY SHOWS<br>DRAMA<br>MOVIE 1<br>MOVIE 2<br>SPORTS<br>KIDS<br>COMEDY | 2 | CHIP'N'DALE | 9:00p |
| | 4 | I LOVE LUCY | 9:00p |
| | 5 | NED & STACEY | 9:00p |
| | 7 | TINY TOON ADVENTURE | 9:00p |
| | 9 | COSBY | 9:30p |
| | 11 | MARRIED ... | 9:30p |
| | 13 | DOUG | 9:30p |
| | 18 | SEINFELD | 9:30p |
| | 22 | HOME IMPROVEMENT | 9:30p |

FIG. 30

| GUIDE | MOVIE TITLE | NEXT 1 | NEXT 2 |
|---|---|---|---|
| ALL | | | |
| NOW | | | |
| 9:30 | | | |
| 10:00 | | | |
| THE HITS | | | |
| OUR PICKS | | | |
| COMEDIES | | | |
| DRAMAS | | | |
| XYZ INDEPENDENCE... | | 9:00p | 11:15p |
| HITS! SHINE | | 9:00p | 11:00p |
| LAST TIME SLING BLADE | | 9:00p | — |
| HITS! CRASH | | 9:00p | 10:30p |
| LAST TIME STAR WARS | | 11:00p | — |
| HITS! RETURN OF JEDI | | 1:00p | mon 11:30p |
| XYZ EMPIRE... | | 1:00p | 3:30p |
| XYZ FARGO | | 1:00p | 3:30p |
| XYZ BOOTY CALL | | 1:00p | 3:30p |

FIG. 31

| map (0,0)*<br>HOST,<br>GAMES;Pol's-C,1 | map (0,1)*<br>HOST,<br>MOVIES;Pol's-A,2 | map (0,2)*<br>HOST,<br>TV;Policies-A,2 | map (0,3)*<br>HOST,<br>SPORTS;Pol's-C,1 | map (0,4)*<br>HOST,<br>SHOPPING;Pol's-C,1 |
|---|---|---|---|---|
| map (1,0)*<br>MSB,<br>GAMES;Pol's-C,1 | map (1,1)*<br>MSB,<br>MOVIES;Pol's-A,2 | map (1,2)*<br>MSB,<br>TV;Policies-A,2 | map (1,3)*<br>MSB,<br>SPORTS;Pol's-C,1 | map (1,4)*<br>MSB,<br>SHOPPING;Pol's-C,1 |
| map (2,0)*<br>IPG,<br>GAMES;Pol's-A,3 | map (3,1)*<br>VIEWING,<br>MOVIES;Pol's-B,3 | map (2,2)* <u>810</u><br>IPG,<br>TV;Policies-B,3 | map (2,3)*<br>IPG,<br>SPORTS;Pol's-A,3 | map (2,4)*<br>IPG,<br>SHOPPING;Pol's-A,3 |
| map (3,0)*<br>VIEWING,<br>GAMES;Pol's-A,3 | map (4,1)*<br>INFO,<br>MOVIES;Pol's-B,3 | map (3,2)* <u>812</u><br>VIEWING,<br>TV;Policies-B,3 | map (3,3)*<br>VIEWING,<br>SPORTS;Pol's-A,3 | map (3,4)*<br>VIEWING,<br>SHOPPING;Pol's-A,3 |
| map (4,0)*<br>CUSTOM,<br>GAMES;Pol's-A,3 | map (4,1)*<br>INFO,<br>MOVIES;Pol's-B,3 | map (4,2)* <u>814</u><br>INFO,<br>TV;Policies-B,3 | map (4,3)*<br>INFO,<br>SPORTS;Pol's-A,3 | map (4,4)*<br>INFO,<br>SHOPPING;Pol's-A,3 |
| map (5,0)*<br>CUSTOM,<br>GAMES;Pol's-C,4 | map (5,1)*<br>CUSTOM,<br>MOVIES;Pol's-C,4 | map (5,2)*<br>CUSTOM,<br>TV;Policies-C,4 | map (5,3)*<br>CUSTOM,<br>SPORTS;Pol's-C,4 | map (5,4)*<br>CUSTOM,<br>SHOPPING;Pol's-C,4 |

FIG. 40

METHOD AND SYSTEM FOR PROVIDING DYNAMICALLY CHANGING PROGRAMMING CATEGORIES

This application is a continuation-in-part of U.S. application Ser. No. 09/018,541, filed Feb. 4, 1998, now pending.

RELATED APPLICATIONS

The present application is related to the following commonly owned applications:

application Ser. No. 09/103,317, filed Jun. 24, 1998, titled "Method and System for Providing User Interface for Electronic Program Guide,"

application Ser. No. 09/103,315, filed Jun. 24, 1998, titled "Method and System for Providing Selectable Programming in a Multi-Screen Mode,"

application Ser. No. 09/018,541, filed Jun. 24, 1998, titled "Method And System For Navigating Through Content In An Organized And Categorized Fashion,"

All of the above applications as well as application Ser. No. 09/018,541 are hereby incorporated by reference into this application.

BACKGROUND OF THE INVENTION

This invention is directed to a method and system for providing content in an organized and categorized manner. In particular, this invention is directed to a method and system for delivering television programming which is categorized in domains and for delivering navigational tools which provide information about and access to multiple channels or programs. Users can navigate through the domains, tools, and channels with a feeling of three dimensional movement.

In the early days of television, viewers were offered few channels and a limited number of programs. Indeed, over-the-air television broadcasting in any given region was, and still is, limited to only about half of the thirteen VHF channels and several UHF channels. With limited channels and programming, viewers had little difficulty choosing what to watch at a given time by simply switching from one channel to the next until a desired program was presented.

The advent of cable and satellite television broadcast systems increased the number of channels being delivered. Presently, many programming providers, whether using cable, microwave, satellite, or the like, provide upwards of 60 to 100 channels of programming at any time. As with over-the-air broadcasting, the channels are arranged linearly in numeric order, e.g., from channel 1 through channel 99. Viewers change channels or "channel surf" by either moving from channel to channel in linear fashion or by selecting a specific channel by number and jumping directly from another channel to that channel.

The increased channel capacity of newer systems has provided the opportunity and need to offer a greater number and variety of programming of different types. For example, not only are there an increased number of conventional television programs such as situation comedies, dramas, game shows, and the like, but television now provides a proliferation of talk shows, cooking shows, music videos, shopping programs, movies, and more. Furthermore, entire channels are devoted to showing only programming of a specific category or group, such as movie channels, comedy channels, cooking channels, sports channels, shopping channels, etc. Cable and satellite system operators offer some of these channels as part of a "base" subscription package, and offer other channels, such as Home Box Office or Showtime, only for a premium. Additional channels offer programs on a pay-per-view basis.

With the increased number of channels and programs offered by cable and satellite systems, it becomes more difficult for viewers to identify the programming choices at any time by channel surfing. The time taken to move from channel to channel, wait at each channel to determine what program is on, and decide whether to watch the program seriously cuts down viewing time once a program is selected. In addition, the viewer must remember what program is playing on each channel in order to decide what to watch and return to a prior channel if desired. Finally, this type of channel surfing makes viewing by other viewers a jumpy, disconcerting, and generally unpleasant experience.

New technological developments such as digital video and high definition television promise to dramatically increase the number of channels available. Television broadcasting systems of the near future will likely have 500 or even 1000 channels available for viewing at any given time. Interactive services, including video on demand and Internet or on-line services provide even more potentially available content for distribution over television broadcast systems. The problems described above associated with channel surfing through a more limited number of channels will clearly become exponentially more serious, to the point where conventional channel surfing techniques become entirely unusable.

Thus, there is a need for a new system for organizing and navigating through television channels and programs. The present invention provides such a system. Furthermore, with such a large quantity of programming content available to viewers, it is desirable to organize the content in a manner that is intuitive and provides for highly efficient viewing by the viewing audience. The present invention provides a viewing audience with content organized and presented to facilitate navigation through the content in an efficient and intuitive manner.

SUMMARY OF THE INVENTION

It is an object of the present invention to solve the deficiencies noted above in current television programming delivery and selection.

It is another object of the present invention to provide an interface for television program selection that makes the process of selecting and viewing programs non-intimidating, pleasant, and entertaining.

It is another object of the invention to provide a navigation system advantageous for use with various types of data including on-line services over the Internet, kiosks or information booths, Internet browsers, as well as conventional television programming or movies. Such a navigation system provides an easy transition from today's limited viewing choices to the unlimited pallet of digital television, to encourage access to a maximum number of relevant program offerings, and to remove the fear, uncertainty and intimidation factors from digital television.

It is another object of the invention to provide viewers with new options for obtaining information and navigating through the many channels provided for viewing.

It is another object of the invention to provide viewers with more options for navigating through the information provided.

These and other objects are provided by a system and method for delivering content that is organized to allow a viewer to access desired programming in an orderly fashion and which provides viewers with a feeling of three dimensional movement while navigating through content choices. The method involves categorizing the content into a plurality of domains according to related subject matter. Example domains include television, movies, shopping, cooking, sports, local, kids and the like. A plurality of navigational tools are provided which each offer information about a variety of content choices in a given domain. Some tools also provide access to the content choices; that is, allow users to move from the tool to the display of the content choice. The tools are, for example, a host tool, where a "host" gives a tour of the content available in a given domain, a multiscreen browser which displays audiovisual representations of the content choices, and an intelligent program guide which scrolls the content choices for a given time period. The tools are generally ordered to correspond to the cognitive abilities of viewers, with tools ranging from the simple host tool which presents preselected choices to a custom tool which allows viewers to program viewing selections and parameters.

When the system is applied to a television environment, the television programming originates at a head end, is organized and categorized into domains, tools and channels, and is processed for distribution through cable or another type of wired or wireless broadcast distribution. At the user locations, a set top box and remote control are provided. The set top box includes appropriate demultiplexing and decoding circuitry in order to develop signals playable by a television receiver. The playable signals are then output to the television set for display. The remote control contains special buttons for navigating between domains and tools, and for performing other advantageous functions such as tagging programs for later viewing.

BRIEF DESCRIPTION OF THE DRAWINGS

For a fuller understanding of the invention, reference is made to the following description taken in connection with the accompanying drawings, in which:

FIGS. 10A–10H are a sequence of screen displays showing a transition between domains in accordance with the flow chart in FIG. 11;

FIGS. 11A–11H are a sequence of screen displays showing a transition between tools in accordance with the flow chart in FIG. 11;

FIGS. 23A–23C illustrate a first embodiment of a sequence of screens in the intelligent program guide showing the handling of programming that is longer than one half (½) hour;

FIGS. 24A–24C illustrate a second embodiment of a sequence of screens in the intelligent program guide showing the handling of programming that is longer than one half (½) hour;

FIGS. 30 and 31 show exemplary screens for the intelligent program guide tool for specific categories and domains;

FIG. 40 is an exemplary two dimensional map illustrating policies for context sensitive switching.

DETAILED DESCRIPTION OF THE PREFERRED EMBODIMENTS

The preferred embodiments of the present invention described below illustrate the invention as applied to television programming. While television programming is a preferred application of the present invention, all types of content are contemplated within the scope of the invention. For example, the present invention may be applied to content provided over the Internet by on-line services, other communication networks, in kiosks or other information booths, by Internet browsing software, etc. Thus, the terms programming and content are used to generally describe all types of audio and video information as well as digital data.

Conceptual Overview of Navigational System

In accordance with the present invention, a navigational system is provided in which programming to be distributed is categorized and organized to facilitate navigation by viewers through the programming. The full set of available programming is organized into a number of domains, each of which represents some categorical class or business unit of programming. Examples of domains include television, movies, local programming, sports, and others. Each of the domains may be further organized into more particular categories of programming specific to that domain. For example, the television domain may be broken into categories such as news, comedy, drama, etc., each representing a type of program available in the television domain.

In addition to organizing programming into domains, the navigational system of the present invention provides a number of navigation tools to viewers. The navigation tools provide current or future programming choices to viewers through different user interfaces. The specific programming choices made available depend upon the tool being used and the viewer's current domain and category. Some tools provide a limited number of preselected choices, while other tools present all the programming choices and allow viewers to narrow the choices by selecting certain categories. For example, if a viewer is using a tool in the television domain and the viewer selects the comedy category, the tool will present program choices related to television comedy programs. The viewer can select one of the program choices for viewing and, if the selected program is currently available, the selected program is presented to the viewer. If the viewer changes to the movies domain, the tool will present a choice of movies available for viewing.

Figure 1:
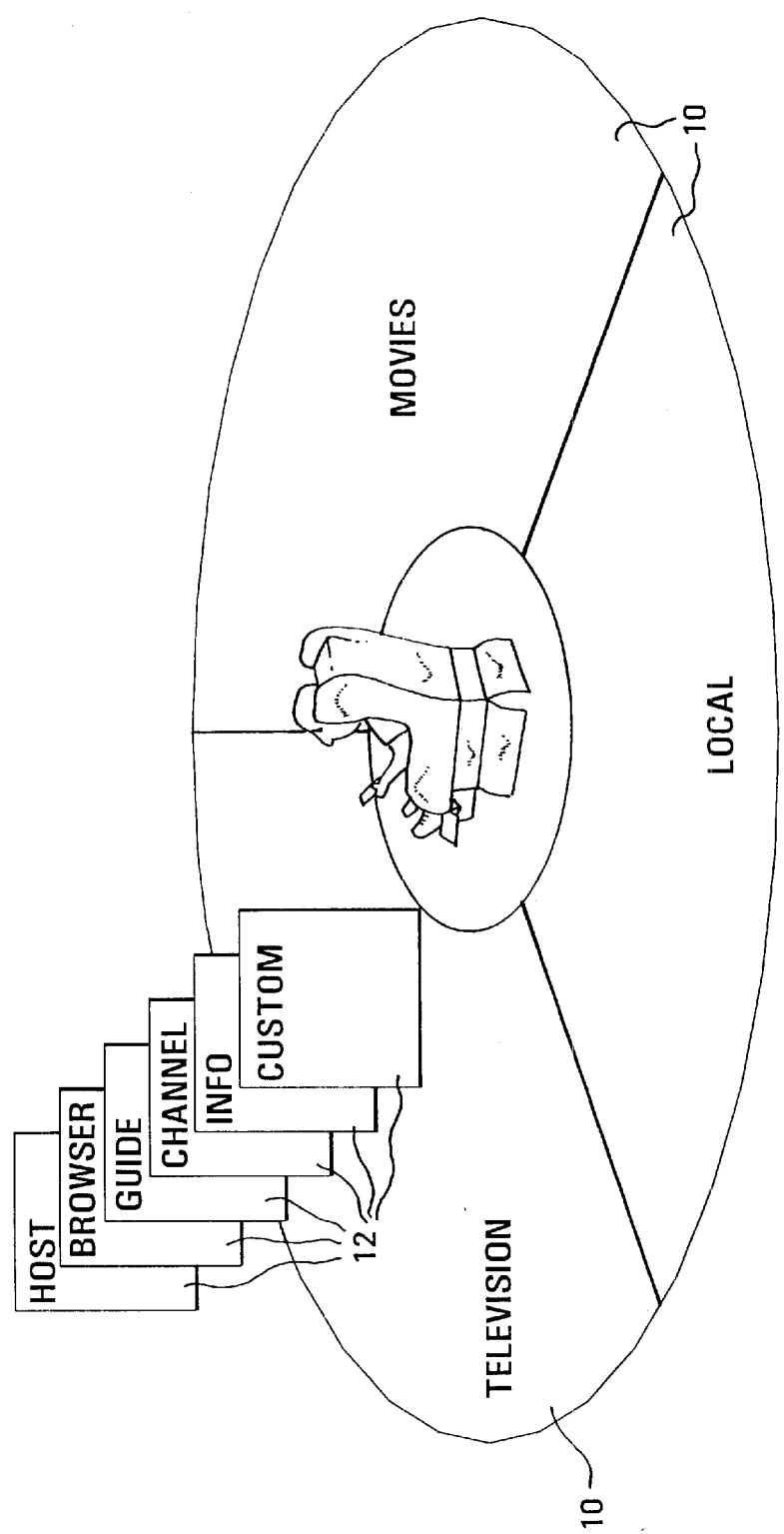
FIG. 1 is a pictorial representation of a user viewing content in accordance with the present system illustrating a plurality of tools and domains.
Figure 2:
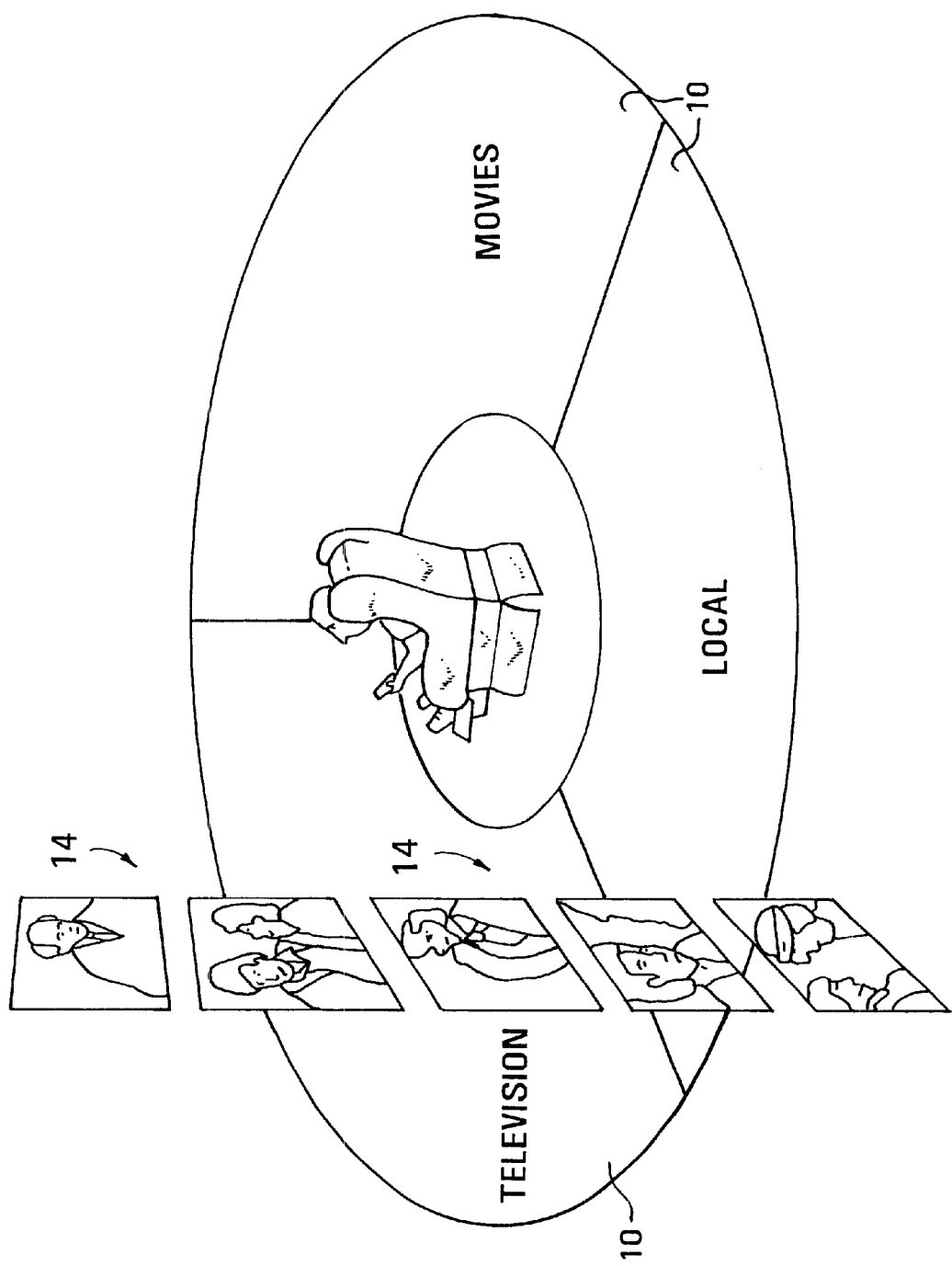
FIG. 2 is a pictorial representation similar to FIG. 1 showing a user navigating through channels within the television domain and channel tool.
Figure 3:
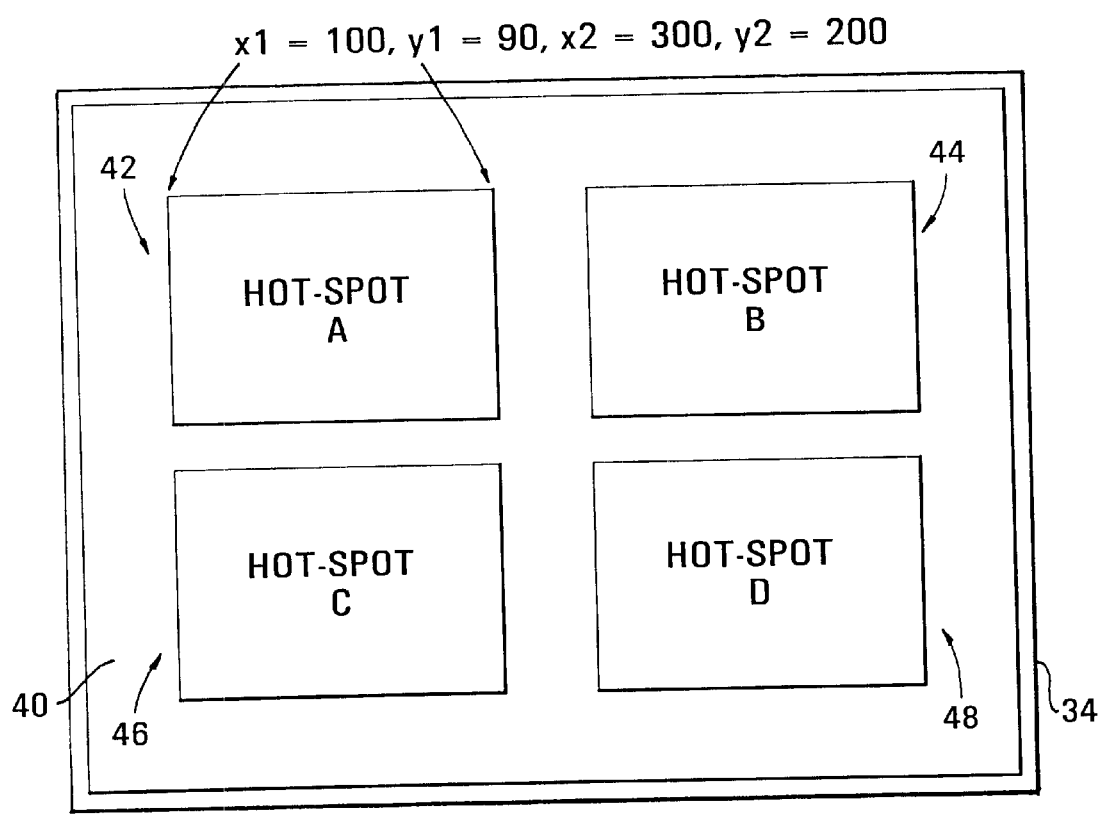
FIG. 3 is a schematic representation of a television screen including a plurality of hot-spots.

FIGS. 1 and 2 pictorially illustrate the mental impression a user receives when navigating through the navigational system of the present system. For ease of illustration, the example of FIG. 1 illustrates only three domains 10: television, movies, and local programming. The domains 10 are arranged in a circle because they are sequentially accessible by the viewer in a looped configuration. That is, the viewer can move from the television domain to the movies domain to the local domain and then back to the television domain. Each time the viewer changes domains along the loop, a perception of moving around the circle is realized. The navigational system provides transitional segments, described below, when moving between domains to enhance the viewer's feeling of motion when navigating between domains.

As shown in FIG. 1, a series of tools 12 are illustrated arranged along a radius of the domain circle. Although the tools 12 are shown with reference to the television domain, they are accessible in each of the domains. The viewer may scroll from tool to tool within the television domain, and may change domains 10 while using one of the tools 12. As the viewer scrolls through the tools 12, the viewer gets a feeling of motion in a direction perpendicular to the direction of motion between domains 10. Transitional segments are provided to enhance this perception of movement between tools as compared to movement between domains.

At the intersection of each domain and tool, representing a layer or level in the system and sometimes referred to herein as a "zone," the viewer is given a selection of programming choices for viewing. The specific programming choices in each zone are determined by the current domain and category of programming or channel, and the manner in which these choices are presented is determined by the tool being used. In FIG. 2, different channels of programming content available in a given zone are aligned along an additional axis, pictorially represented in a linear fashion along a virtual vertical axis orthogonal to the radius 14. The movement within a zone from channel to channel or from category to category provides the feeling of transition which is different than the transitions between domains or tools.

The navigational system of the present invention may be implemented in a one way or two way broadcast system and makes use of certain special hardware devices including a set top box and remote control. The following sections describe these elements.

System Architecture

A one way broadcast system generally includes a head end and a plurality of receiving ends at subscriber's homes. The transmission from head end to subscribers may be by direct dish-to-dish microwave, cable, satellite or other transmission media known to those of skill in the art.

In preferred embodiments, the head end system converts analog television programming into compressed digital information suitable for transmission in accordance with techniques known to those of skill in the art. The digital video information, which may be in MPEG format, is transmitted as digital channels, with multiple digital channels being transmitted in a single tunable frequency band. The set top box can tune to one of the frequency bands and generally includes circuitry for digital video decoding, including a demultiplexer, processor, and MPEG and graphics overlay processor and memory chips. A set top box designed to perform digital video decoding and to support the functionality of the present invention is available from Zenith Electronics Corporation of Glenview, Ill. and DiviCom Inc. of Milpitas, Calif. Additional data is transmitted in the frequency bands, such as program guide data used to support the intelligent program guide tool of the present invention, described in greater detail below.

A two-way or interactive broadcast system is similar to the one way system, except that an additional means is provided for transmission of signals from the set top box to the head end. This additional means may include a telephone link from the set top box to the head end, one or more back channels in a cable system to transmit intermittent bursts of information from the set top box to the head end, or, in a wireless broadcast system, a transmitter in the set top box to wirelessly transmit information back to the head end. Two way communication facilitates an array of services to be provided, such as video on demand, purchasing of products seen on television, etc. Additional embodiments of a two way system may become practicable as developments are made in the art.

As explained above, a preferred use for this system is to provide television programming, including standard and premium television channels, movies and pay-per-view events through separate channels. However, content other than video may also be provided. For example, the system may be adapted to transmit pages of any kind of text, picture and other multimedia elements encoded as hypertext markup language (HTML) data with accompanying files such that world wide web-like pages can be delivered to the television screen.

As described in detail below, several of the navigation tools of the present invention provide an interactive interface which allows viewers to select programs or channels for immediate or later viewing. In a one way broadcast system, the viewer's selections in these tools can not be communicated back to the head end. Therefore, functionality must be provided with the broadcast content which allows viewers to interact with the tools on a real time basis. This functionality is useful even in a two way broadcasting system to minimize the amount of up channel communication required for viewer interaction.

To provide this functionality, programs and other data are transmitted from the head end along with and linked to audiovisual content. The programs include overlay functions which link data with the audiovisual content and create actionable areas on a television screen which can be selected by viewers and which, when selected, provide links to video, audio, graphics or other data events. The data defining these actionable areas, referred to herein as "hot-spots," and linking them to the actionable events is also provided with the broadcast content. The overlay functions and hot-spot data are synchronized with the audiovisual content to give viewers the ability to interact with the hot-spots and cause the overlay functions to operate and display the linked audiovisual or other data.

Examples of hot-spots are shown in FIG. 4. A television receiver 34 is illustrated which includes a screen 40 with four hot-spots 42, 44, 46 and 48 indicated thereon. The hot-spots are predetermined areas on the screen that can be accessed by a remote control, mouse (not shown), or other conventional input device. Each hot-spot is defined by data provided with the audiovisual content. This data may include, for example, predetermined coordinates. For example, in FIG. 4, the upper left hand corner of hot-spot 42 may be defined by x and y coordinates x1=100, y1=90 and the lower right hand corner may be defined by coordinates x2=300, y2=220. Using this coordinate data, a computer program resident in the set top box can draw a rectangle representing the hot-spot and overlay the hot-spot with audiovisual or other content to be presented at that location on the screen. Viewers can move from hot-spot to hot-spot using directional keys on the remote control, described below, and the program displays a visual indication of the currently activated hot-spot, such as a highlight around the hot-spot.

When the viewer selects one of the hot-spots, such as by activating a button on the remote control, the set top box program determines whether a hot-spot exists and is currently activated, and if so, the program automatically changes the state of the screen being displayed by moving to the event linked to and indicated by the hot-spot. In the typical situation, this would be a full screen presentation of the audiovisual sequence illustrated within the hot-spot. However, it may be other information such as alternate audio, graphics, text or other appropriate content like a game.

The overlay functions include a variety of retrievable information and interactive functions that are made available to viewers while viewing a particular television program or tool. Each television program may have unique overlay functions since the overlay functions made available are based upon the unique content of each program. When a television program having overlay functions and associated interface data is sent by the content provider from the head end to a viewer, the overlay functions and interface data for the television program are synchronized with the television program and loaded into the viewer's set top box. The set top box, described in more detail below, contains a processor which reads the overlay functions and interface data, implements the interface, and enables the overlay functions in real time and in synchronization with the associated actionable event in the programming. As the viewer interacts with the television program through the synchronized interface, the set top box implements the relevant overlay functions selected by the viewer. Alternatively, in a two way broadcast system, the set top box may communicate with the content provider as necessary to implement certain overlay functions selected by the user.

Patent application Ser. No. 08/773,263 and application Ser. No. 08/774,055, both filed Dec. 23, 1996, are hereby incorporated by reference into this application.

Remote Control

Figure 4A:
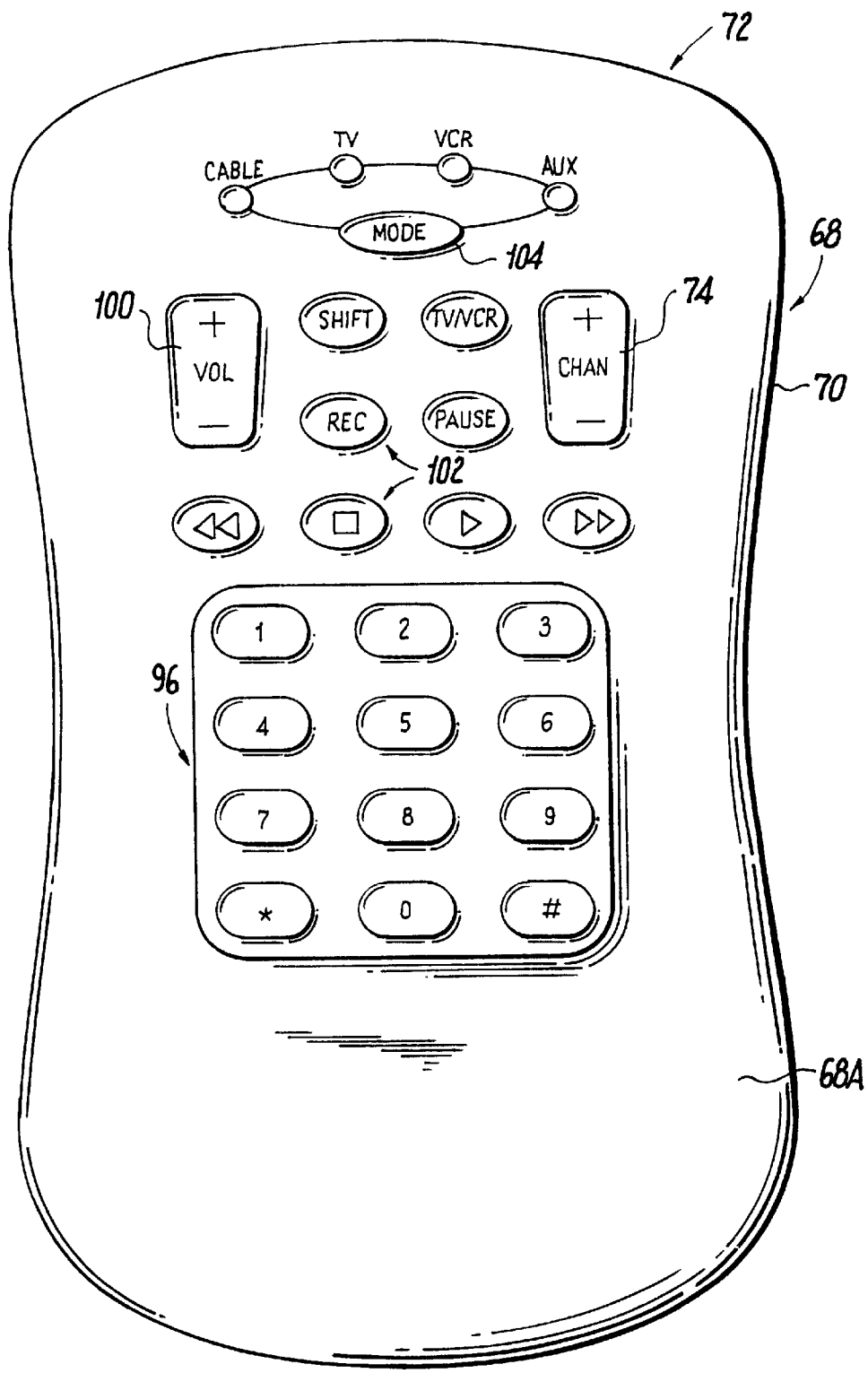
FIGS. 4A and 4B are elevational views of two sides of a remote control designed in accordance with the present invention.
Figure 4B:
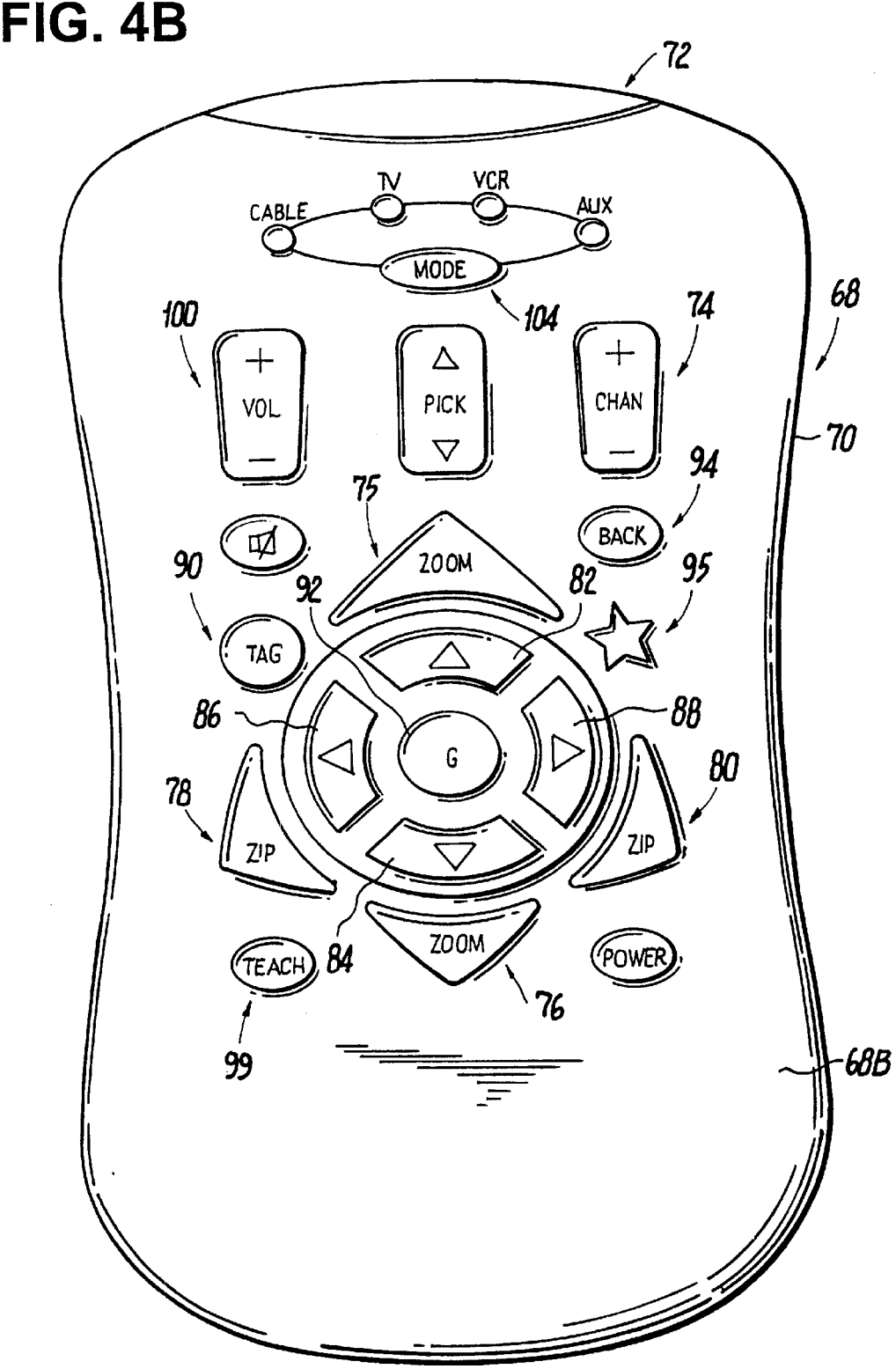
Figure 4C:
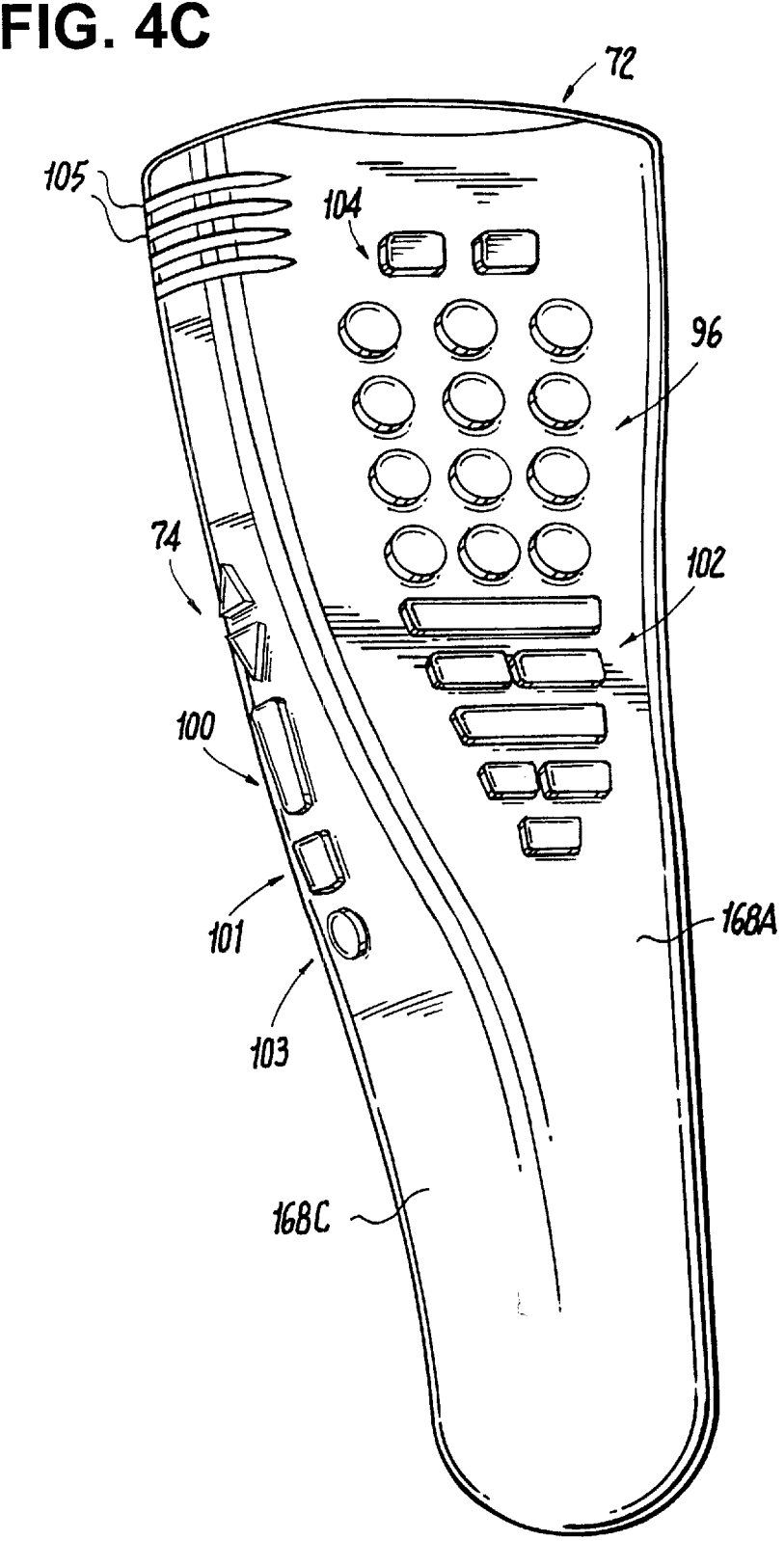
FIG. 4C is a back and right side perspective view of an alternate embodiment of a remote control designed in accordance with the present invention.
Figure 4D:
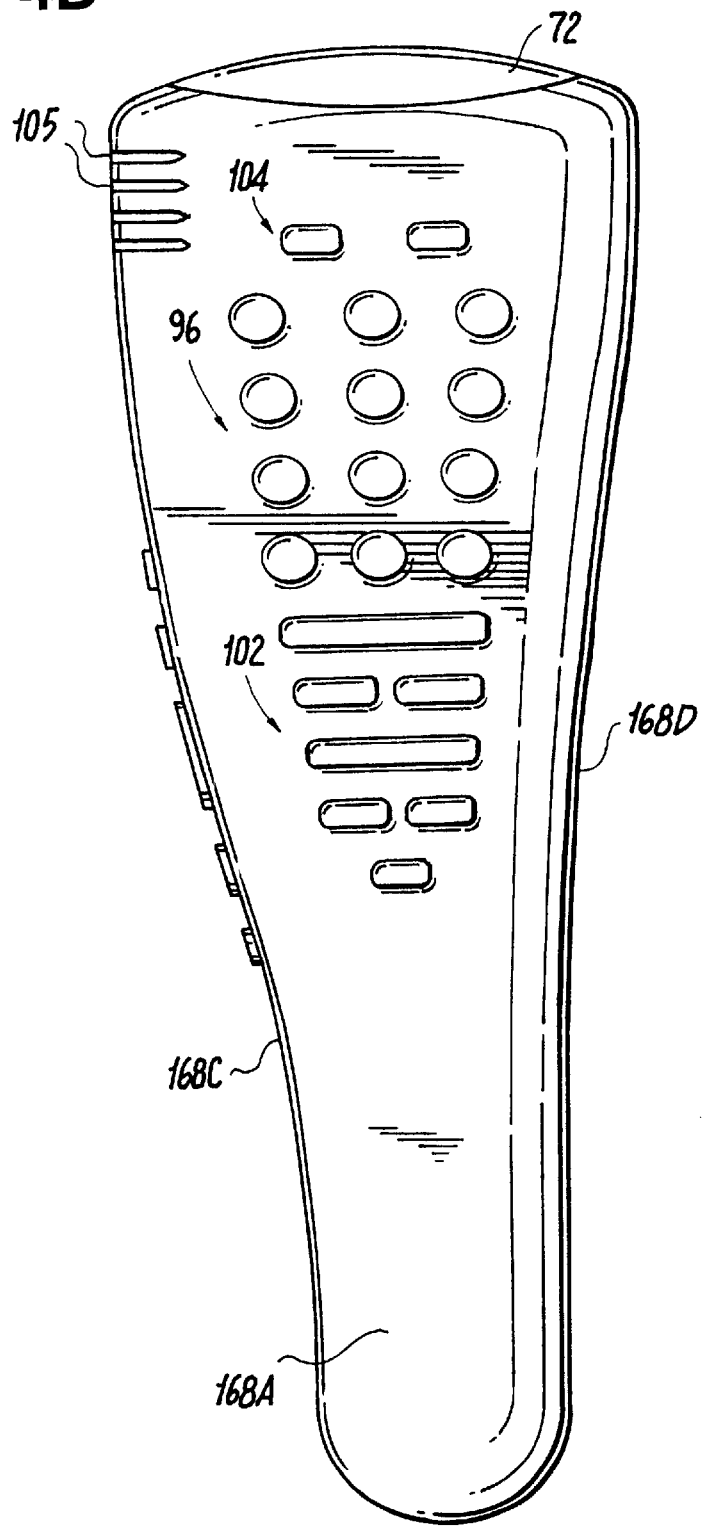
FIG. 4D is a back side elevational view thereof.
Figure 4E:
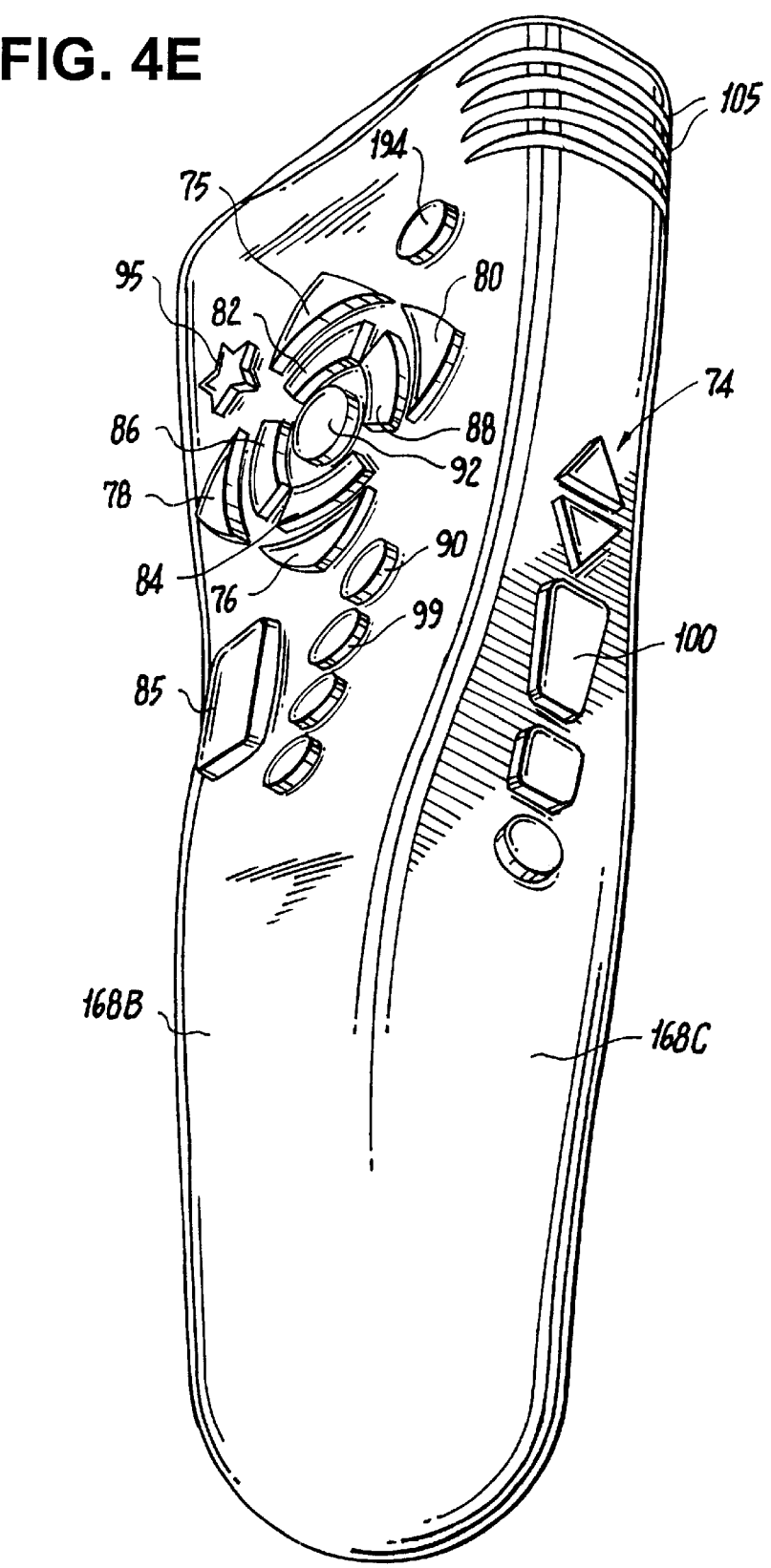
FIG. 4E is a front and right side perspective view thereof.
Figure 4F:
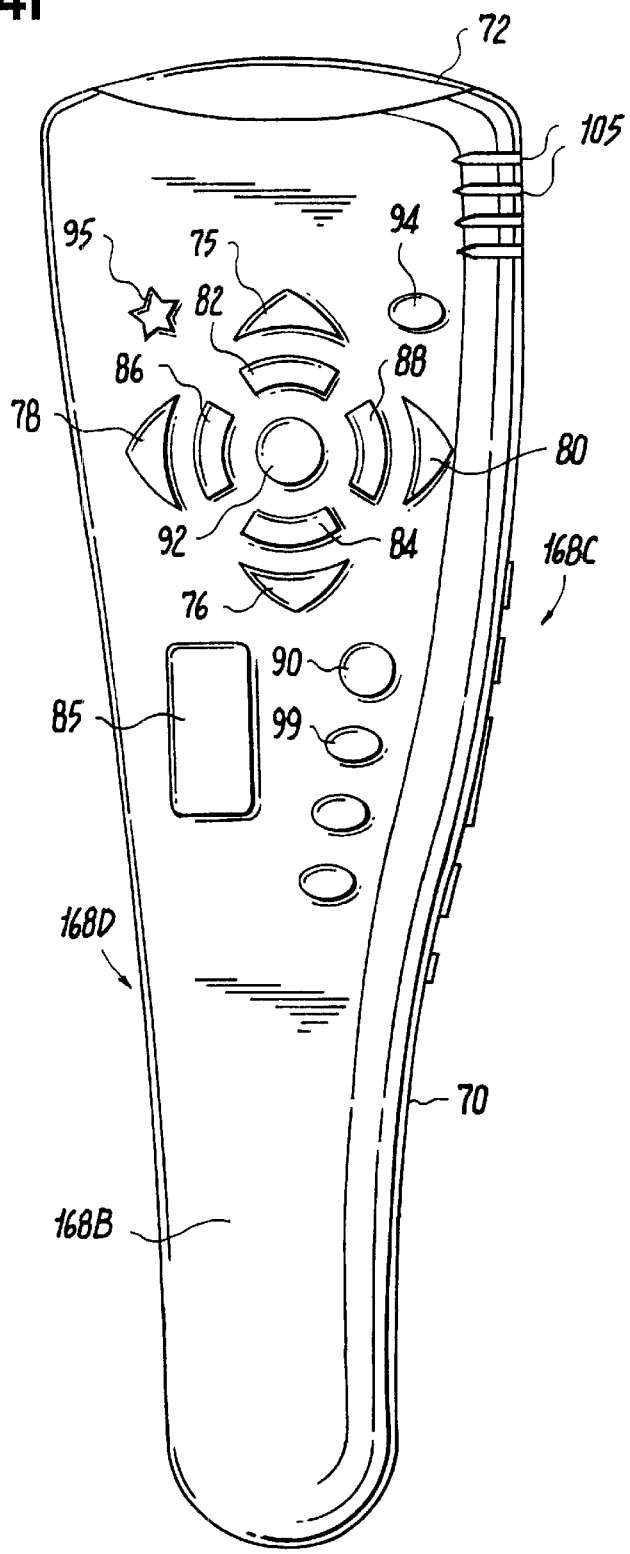
FIG. 4F is a front side elevational view thereof.

An infrared remote unit 68, illustrated in FIGS. 4A and 4B, sends signals input by a viewer to an infrared input of the set top box. The remote control unit 68 contains a number of features to facilitate use of the navigational features and tools of the present invention. The exemplary remote control unit 68 includes a housing 70 which houses a light emitting diode (LED) unit 72 and electronics (not shown). The remote control unit 68 has two sides 68A (FIG. 4A) and 68B (FIG. 4B). A keypad positioned on a first side 68A of the remote control unit 68, generally indicated at 96, includes numbers 0 through 9 as well as a star (*) button and pound (#) button.

A channel up/channel down key or button 74 is provided on each side of the remote control unit 68 with a center toggle, so that a single button is used for both channeling up and channeling down in a conventional manner. Additionally, a volume up/volume down button 100 is provided on each side of the remote control unit 68 with a center toggle, so that the volume control is also on a single actuation button. Viewers can thus use the first side 68A of the remote control unit 68 in a conventional, "channel surfing" fashion. The first side 68A of the remote control unit 68 also contains conventional buttons for activating a VCR, generally indicated at 102, which can be programmed in a conventional manner to activate any VCR unit, a mode button 104 which changes remote control modes between cable, television, and VCR (also contained on the second side 68B); and other keys conventional to remote control units.

In accordance with the present invention, in addition to moving between channels viewers may also move between domains and tools. At the center of the second side 68B of the remote control unit 68 are a series of actuation keys or buttons 75–80 used by viewers to navigate between domains and tools. Actuation buttons 75 and 76, positioned in an opposing up and down arrangement, are provided to move up and down between tools. Actuation buttons 78 and 80, positioned in an opposing left and right arrangement, are provided for movement between domains. A press of either button 75 or 76 causes movement from one tool to another and a press of either directional button 78 or 80 causes linear movement from one domain to another. The second side 68B also contains channel and volume buttons 74 and 100, so viewers need not flip the remote control over to change channels or volume.

To help remind viewers of the difference between navigating between domains and tools and simply changing channels, the domain and tool actuation keys 75–80 on the remote control unit 68 are provided with a different shape than the channel button 74. The actuation buttons 75–80 are provided in an essentially circular arrangement with an indented contour from the center outward for an aesthetically sophisticated arrangement.

Four directional keys or buttons 82–88 are provided on the remote control for navigating within the tools. The specific operation of these directional keys depends upon the tool, as will be described in greater detail below. In addition, an up/down menu navigation key 85 with a center toggle is provided for moving up and down within menus presented in the tools.

The second side 68B of the remote control unit 68 contains additional, special actuation buttons to facilitate use of the navigational system of the present invention. One such button is an enter or "gimme" button 92. Actuation of the enter button 92 executes requests or selections or, if pressed when a hot-spot is highlighted or otherwise selected, activates the actionable event linked to the hot-spot. For example, if a certain program is featured within a hot-spot, pressing the enter button 92 causes the system to tune to the channel on which that program is available, thus presenting the program.

As described in more detail below, the navigational system of the present invention also allows viewers to tag one or more programs to be played at a later time. A tag button 90 is provided on the remote control unit 68 to facilitate this function. The remote control unit 68 further contains a back button 94 which returns the viewer to a preceding tool or channel or which steps backward through a process, a map button 95 which displays a navigational map of domains and tools, as described further below, and a teach or help button 99 which activates help screens provided by the system.

An alternative embodiment of a remote control unit is illustrated in FIGS. 4C, 4D, 4E and 4F. The alternative remote control unit 168 has a housing 170 and LED unit 72, and has buttons positioned on three sides of the housing 170—a back side 168A, right side 168B, and front side 168C. The buttons are positioned such that a user may use the remote control 168 in either a conventional, "channel surfing" manner using a channel keypad or in accordance with the navigational system of the present invention, and in either event have easy access to channel and volume control buttons used in both cases without the need to duplicate those buttons on both sides of the unit, as with the remote control unit shown in FIGS. 4A–4B.

Thus, in the alternative remote control unit 168, the back side 168A contains a channel keypad, generally indicated at 96, conventional buttons for activating a VCR, generally indicated at 102, a mode button 104 which changes remote control modes between cable, television, VCR, and other mode(s), and may contain other keys conventional to remote control units. Mode indicator lights 105 extend around the remote control unit 168 from the back side 168A to the front side 168B so as to be visible on whichever side the remote control unit 168 is held.

On the front side 168B (FIGS. 4E and 4F) of the remote control unit 168 are the actuation buttons 75–80 used by viewers to navigate between domains and tools, the four directional buttons 82, 84, 86, and 88 for navigating within the tools, and pick menu actuation keys 85, which may be either two separate keys or one toggle switch, for moving up and down within menus presented in the tools. The front side 1 68B also contains enter or "gimme" button 92, tag button 90, back button 94, map button 95, and teach or help button 99, all of which function substantially as described above in relation to remote control unit 68.

The right side 168C (FIGS. 4C and 4E) of the remote control unit 168 contains buttons which are usable with both the navigational buttons on the front side 168B and the channel keypad buttons positioned on the back side 168A. These buttons include two channel selection buttons 74, one up and one down provided for channeling up and channeling down, a volume up/volume down button 100 with a center toggle, a mute button 101, and a power on/off button 103. Viewers can thus use the right side 168C of the remote control unit 168 in a conventional, "channel surfing" fashion, and can easily access these "channel surfing" functions from either the conventional, television/VCR back side 168A or from the navigational, domain/tool front side 168B of the remote control unit 168.

To use the present system, a viewer needs only the set top box and associated remote control unit. The hardware required by the viewer is of essentially the same nature as the hardware required in current television broadcast subscription systems. As with other hardware, the system hardware for use with the present invention is easy to connect and operate in a home viewing environment.

Although the hardware just described includes remote control units specially designed for use with the navigational system of the present invention, one skilled in the art will recognize that other hardware devices may be used to facilitate use of the present invention. For example, a computer, such as a personal computer with appropriate sound and video processors and conventional input devices such as a keyboard and mouse, could be programmed as needed to provide the functionality described above.

Navigational System Operation

Figure 5:
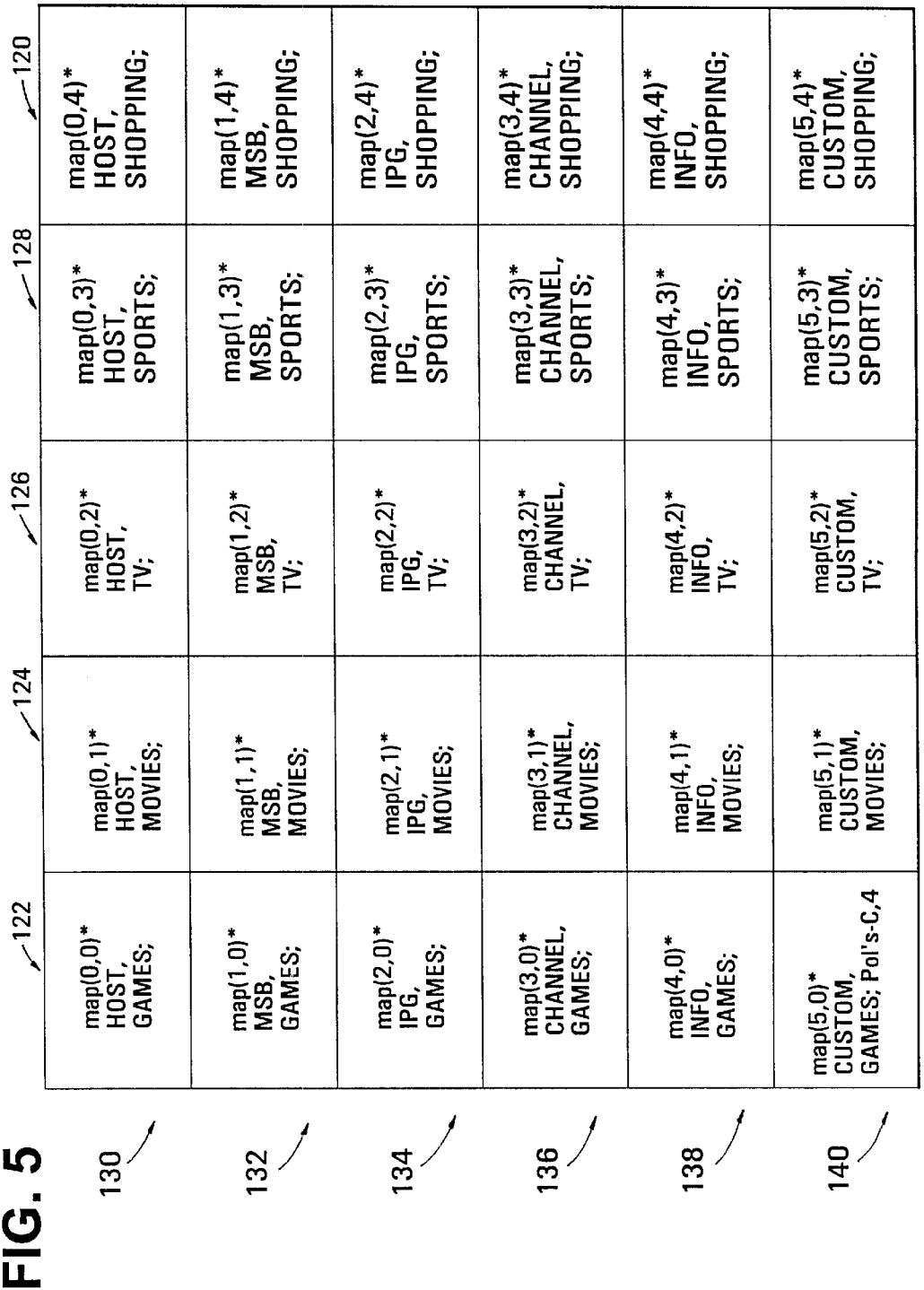
FIG. 5 is an exemplary two dimensional map of tools versus domains.

As explained above, the navigational system of the present invention allows for navigation among domains, tools, and channels. FIG. 5 illustrates a two dimensional programming map with domains arranged in columns and tools organized in rows. Five domains are used for purposes of illustration: the games domain 122, movies domain 124, television domain 126, sports domain 128, and shopping domain 120. Additional domains may be provided, such as a local programming domain and a VOD domain which provides viewers with video on demand and other interactive services. Interactive domains such as the shopping and VOD domains would be best deployed with an interactive television broadcasting system. Of course, a given program may be classified as part of two or more domains, and would thus be available through each of those domains.

The navigational system also provides a number of navigational tools. Six tools are illustrated in the embodiment shown in FIG. 5, each positioned in a separate row of the map. The tools, described in more detail below, include the host tool 130, multiscreen browser tool ("MSB") 132, intelligent program guide tool ("IPG") 134, channel or viewing tool 136, information or "info" tool 138, and custom tool 140. For purposes of this application and for ease of understanding, the functioning of the domains and tools are described using the television domain 126 as the exemplary domain. However, one skilled in the art will understand the similar operation of the tools in other domains.

A viewer wishing to move between domains (an action sometimes referred to herein as "zipping"), such as from the movies domain 124 to the television domain 126, would push the right actuation button 80 of the remote control 68. That is, for example, if the viewer is using the MSB tool 132 while in the movies domain 124, the viewer can move to the television domain 126 and remain in the MSB tool 132. To move back from movies domain 124 to television domain 126, the viewer would depress the left actuation button 78 of remote control 68. Similarly, a viewer moving from the IPG tool 134 to the MSB tool 132 (an action sometimes referred to herein as "zooming") would depress the up actuation button 75, and moving in the opposite direction would depress the down actuation button 76. In either case, the viewer remains in the same domain while moving between tools. Then, to move between channels within a given zone (an action sometimes referred to herein as "zapping"), the channel up/down button 74 is pressed.

The six tools are now described briefly, with more details on each provided below. In the host tool 130, an animated or video host is provided to guide the viewer through selected content choices. Typically, the content choices presented in the host tool 130 are determined by the content provider or other player involved with television programming or distribution. The host talks about these predetermined upcoming programs, and an on-screen menu allows viewers to select one or more of the programs for current or later viewing. See FIG. 12. The host tool 130 is similar to a guided tour, and is analogous to a guided tour provided by a tour company which sets out all the possible sites to visit and which allows tourists to decide which of the sites they desire to visit.

The next tool in the organizational scheme depicted in FIG. 5 is the multiscreen browser tool or MSB 132. In the MSB 132, multiple reduced sized videos or still images are provided. See FIG. 15. Additionally, a pick menu is provided of the categories of browsers available within a given domain, and viewers can change the content choices shown in the MSB by changing the category. For example, in a television domain the content in the MSB would be determined according to categories of subject matter of the programming content, such as comedy, drama, news, etc. The reduced sized videos or images are hot-spots, and viewers can select one of them to tune to the specific program represented therein.

Following the MSB 132 is the intelligent program guide or IPG 134. The IPG 134 is an interactive program guide which lists programs by channel and time in a text based format. See FIG. 21. The viewer can navigate around the guide with the remote control 68, and can select or tag a program listed in the guide for immediate or later viewing. In accordance with further advantageous features of the present invention, data for the IPG is broadcast from the head end on multiple channels so that the set top box, having only one tuner, need not tune away from the last channel watched to obtain the IPG data and can present that channel or other audio and video data simultaneously with the IPG, as described further below.

The channel tool 136, the next tool in the organizational scheme, is the actual programming content shown at full screen resolution. The channel tool 136 plays a segment of content, such as a video game in the games domain or a television show in the television domain. For example, in the television domain 126, channel tool 136 offers multiple channels of television programming, and allows for traditional channel surfing using the channel up/down buttons.

The info tool 138 provides information regarding the programming content provided in channel tool 136. For the television domain 126, the information may be information regarding the playing time of a program, the actors and actresses appearing in the program, plot, ratings information, or the like. Alternatively, in the sports domain 128, info tool 138 might provide further information regarding playoff races, individual player background, statistics or the like. The data for the info tool 138 may be obtained from the world wide web or other service.

The custom tool 140 allows viewers to preprogram particular preferences, such as which television channels they prefer and which channels they would like to block from their children's viewing, as well as other house-keeping activities. Alternatively, if a viewer has tagged program choices presented in one of the other navigation tools, such as the host tool 130, MSB 132 and IPG 134, the viewer can edit the list of tagged programs in the custom tool 140. The custom tool 140 also provides for the storage of customized channel rings, as described further below.

The tools shown in FIG. 5 are ordered in generally increasing order of complexity of use and detail of information provided. That is, in the host tool 130, shown first, the viewer receives a simple list of suggested program choices, and simply selects one of these choices for immediate viewing or tags it for later viewing. The MSB 132 presents the entire range of program choices for a given domain and category in audiovisual format, which is similar to traditional television viewing, and the IPG 134 presents the program choices in a textual format which is also familiar to most viewers. All of these tools, presented before the channel tool 136, are relatively simple to use but provide limited control and details. The info tool 138 and custom tool 140, which provide greater details about the programming and greater control over what and how programming is made available through the other tools, are positioned following the channel tool 136. Viewers wishing to maintain a simplified and more visual experience can thus remain "above" the channel tool 136, while others more familiar with more complex, computerized interfaces may venture "below" the channel tool 136.

As shown in FIG. 5, the navigational system maintains an index of the domains and tools. Although other indexing schemes may be used, the index of the embodiment shown in FIG. 5 is maintained as a two dimensional array of coordinates. The first coordinate in the array represents the tools and the second coordinate represents the domains. In the exemplary embodiment shown in FIG. 5, the tools have coordinates host=0, MSB=1, IPG=2, channel=3, info=4, custom=5, and the domains have coordinates games=0, movies=1, television=2, sports=3 and shopping=4. Thus, for example, the zone defined by the intersection of the host tool 130 and the movies domain is at coordinates (0,1), representing the host tool 130 at coordinate 0 and the movies domain at coordinate 1. When a viewer moves around within the navigational system using the actuation buttons 75–80 on the remote control 68, the coordinates change in one direction, and the index is used to determine what zone to present next.

As explained above, each tool provides multiple channels or categories that can be accessed through the remote control unit 68. In the host tool 130, MSB 132, and IPG 134, different program choices are provided for different categories. For example, comedies may be provided on one MSB category set or "channel," dramas are provided on another MSB "channel," and news programs are provided on a third MSB "channel." Alternatively, television channels may be grouped in numerical order, for example, television channels 1 through 9 provided on one MSB "channel," television channels 10 through 18 provided on the next MSB channel, etc. In either case, viewers navigate through these tool channels using the channel up/down button 74 on the remote control unit 68. Other tools, including the channel tool 136 and info tool 138, are broken into multiple television channels arranged in standard numerical order. See FIG. 6.

Figure 6:
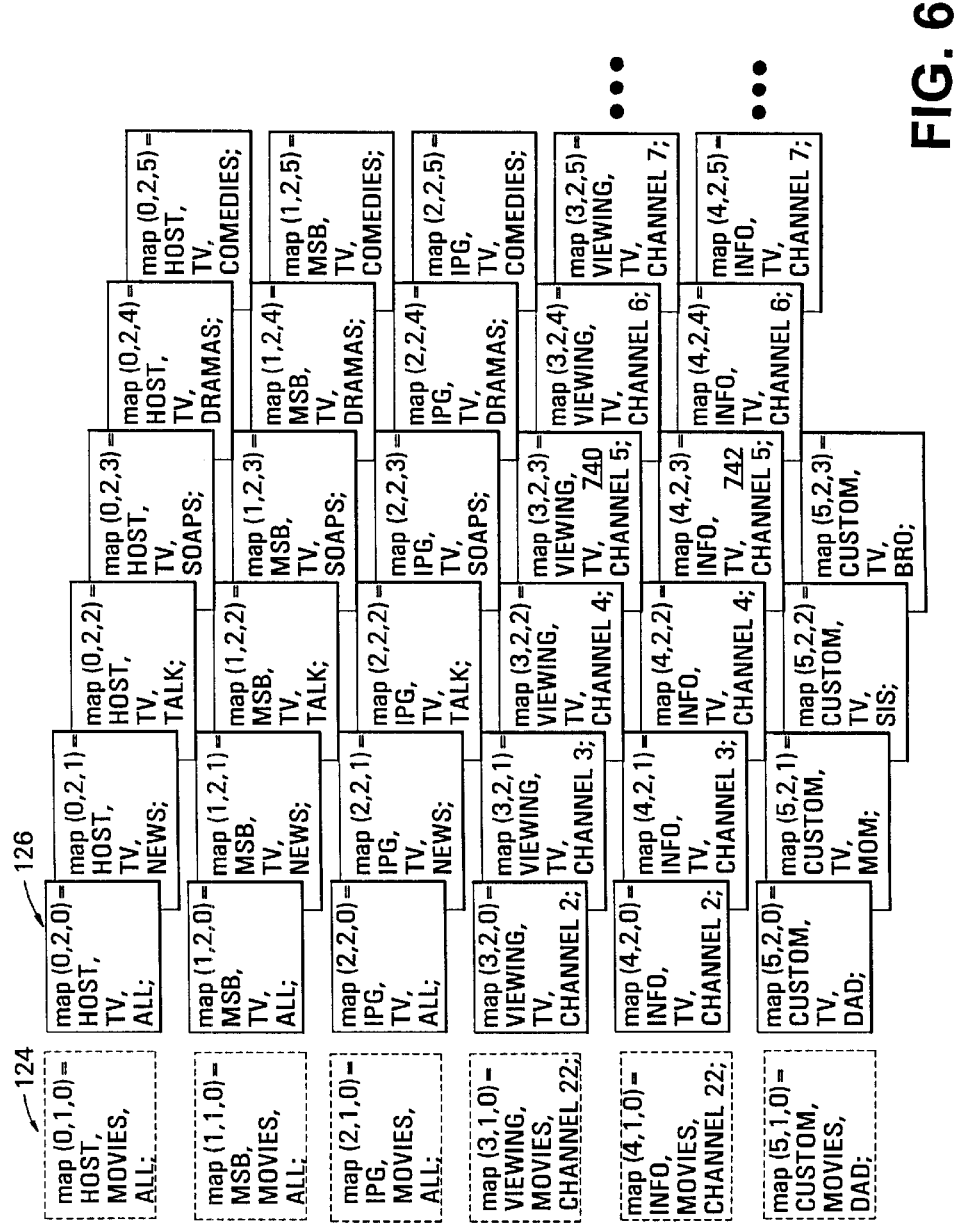
FIG. 6 is an exemplary three dimensional map illustrating the third dimension of the television domain of the map of FIG. 5.

As shown in FIG. 6, the index is expanded to three dimensions to track the channels available within each zone. The television domain 126 is used for illustrative purposes, with the movie domain 124 depicted in phantom. In the preferred embodiment, the coordinates for the expanded index are [tool, domain, channel]. The third dimension or channel dimension is indexed depending upon the channels available within the tool. For example, in an exemplary embodiment such as that in the host tool, all television channel=0, news television=1, talk television=2, soap operas=3, dramas=4 and comedies=5. Thus, if a user wants to get to the host in the television domain displaying choices of talk shows, the viewer navigates using the actuation buttons 75–80 and channel up/down button 74 to coordinates (0, 2, 2).

Aside from maintaining a viewer's position within the navigational system, the use of an index as described above provides additional advantages. One such advantage is context sensitivity. When a user is at a particular zone and channel and changes tools, the viewer remains not only in the same domain but also in the same category or channel. For example, if the viewer is at the IPG tool, television domain and talk show channel at coordinates (2, 2, 2) and presses the up actuation button 75, the viewer will change to the MSB tool and be brought to coordinates (1, 2, 2). Although the viewer changes tools from IPG to MSB, she remains in the television domain and talk channel. Thus, the navigational system is set up such that when moving between tools, if viewing any category of programming, the same category of programming will be provided in the separate tools.

In addition, when moving between domains, a viewer stays in the same tool. For example, if a user is at coordinates (2, 2, 1) and depresses the left actuation button 78, that viewer is sent to coordinates (2, 1, 2) or is placed into the IPG tool in the movie domain in the third channel (coordinate 2).

Figure 7:
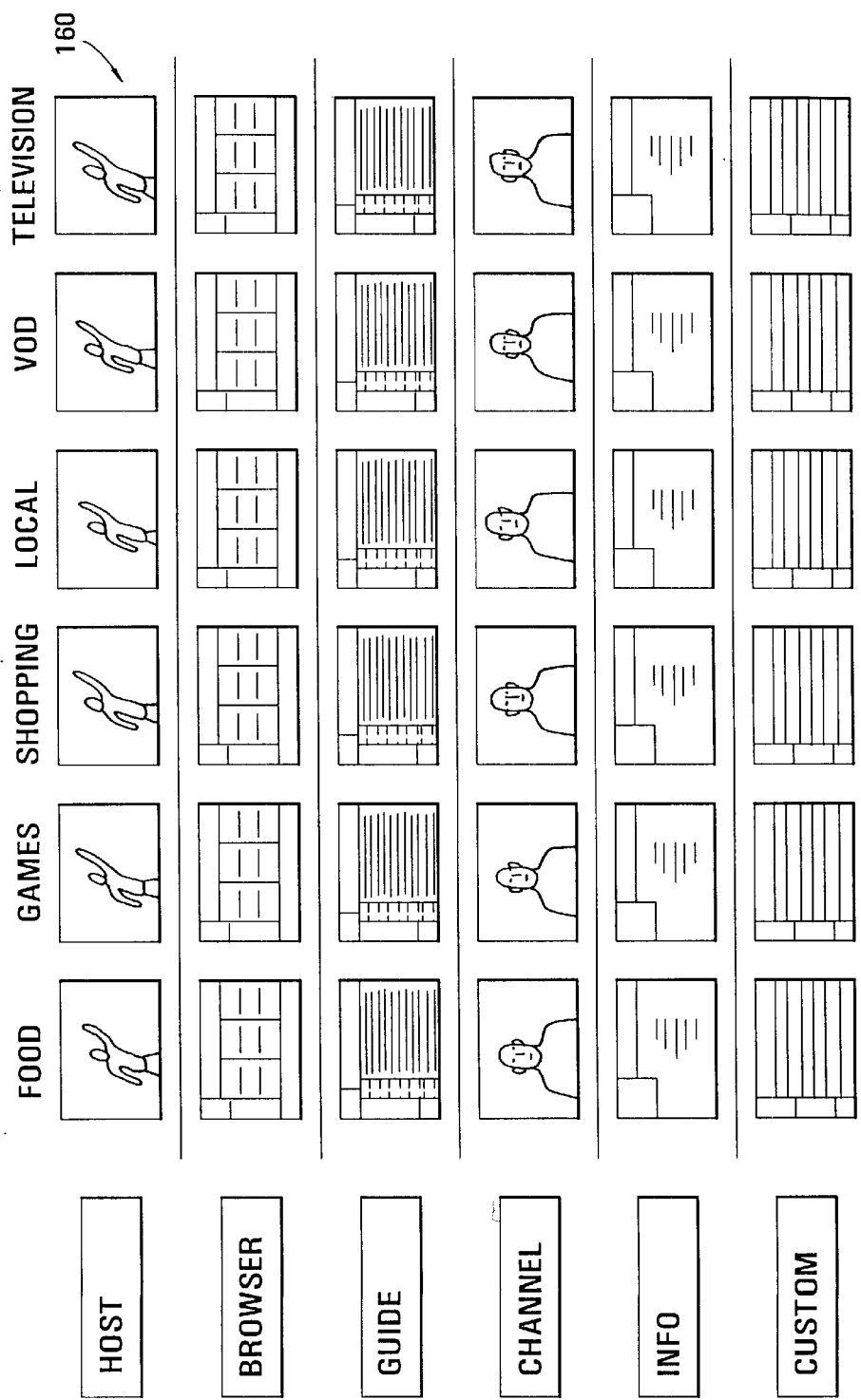
FIG. 7 is a screen display of a map listing tools along a first axis and domains along a second axis.

Another advantageous use of the indexed coordinate system is the presentation of a navigation map. An example of such a map is provided in FIG. 7. The navigation map lists the domains on a horizontal axis and the tools on a vertical axis. The zones defined at the intersection of the domains and tools are represented by still images or reduced video segments 160 depicting the nature of material available at the zone. These images or segments 160 may be hot-spots which link to the zone represented therein. The viewer can use the navigation map to find their current location within the system and to move around within the navigation map to select a desired zone to which to jump.

As a further aspect of the navigational system of preferred embodiments of the present invention, a number of common screen elements are provided on tool screens to help establish some uniformity of operation among the tools. Each tool screen has some or all of the elements. To illustrate the common screen elements of a preferred embodiment, reference is made to FIG. 8, which shows a screen in the IPG tool and VOD domain. The screen contains a tool window 180, clock 182, pick menu 184, tool identifier 186, domain identifier 188, picture-in-graphics cell 190, and description box 200.

The tool window 180 provides the interactive display area for the current tool. In some tools, including the IPG, the tool window contains a channel lineup 202 listing channel is numbers and logos in a series of vertically arranged cells. The data for the channel logo and/or number may be obtained from the head end if necessary, or may be stored in the set top box. Similarly, the time data for the clock 182 is synchronized with the time received from the head end.

The pick menu 184 displays a number of viewer selectable options which vary depending upon the tool used. In the MSB and IPG tools, and in some embodiments the host tool as well, the pick menu displays the available tool channels which, as explained above, represent categories of programming available within the given domain. These categories may be stored within the set top box or, if dynamically changing categories are desired, may be provided with the data broadcast from the head end. In the info tool the pick menu 184 displays available sub-topics, and in the custom tool the pick menu 184 displays available preference options. The viewer navigates up and down the pick menu 184 with the pick menu key 85 on the remote control 68, and selects one of the menu items using the enter or gimme key 92.

Dynamically changing categories are desirable to prevent the viewer from failing to receive any programming choices in an MSB or IPG screen when a given category is selected for which no programming choices are currently available. For instance, although a number of programming choices would be available within the MSB or IPG tool screen in a sports category on a Sunday afternoon, the MSB and IPG tools may have no programming choices for sports in the middle of the night. Using dynamically changing categories provides that no sports category will be presented at times when there are no or minimally few programming choices available within that category.

In addition, certain categories should preferably be broken into or presented as subcategories when warranted by the number of programming choices. In the example outlined above, on a Sunday afternoon when a large number of football games are available for viewing, the sports category may be replaced with a football subcategory to more accurately indicate the nature of the programming choices available.

To implement dynamically changing categories, the categories available at any given time are transmitted with the programming data from the head end, as explained above. The category data may be embedded in the data stream for the programming data, or may be sent as a separate data packet. Other data may be embedded with the list of categories, including the number of items in the pick menu, and, for each item in the menu, a service identifier representing the channel number pointed to by the menu item, data identifying the item's position and size in the menu, and other related data. Alternatively, a master list of all available categories may be stored and indexed in the set top box or remote control, with data identifying a subset of all such categories being transmitted from the head end.

The list of categories is generated at the head end or other location by receiving and storing a database containing television programming schedule data, as known to those of skill in the art. Each television program in the schedule is associated with a number of categories and/or subcategories. An intelligent agent is used to search through the programming available at a given time or period of time (e.g., a two or three hour time range) to identify the categories of programming available for that time period. Categories which have associated programs less than a predetermined, minimal threshold are eliminated from consideration. Categories having associated programs greater than an associated maximum (e.g., nine programs, the number which may be presented on a single MSB tool screen in one preferred embodiment) may be divided into subcategories. Alternatively, a human operator may select the categories based upon the programming contained in the schedule database.

As an alternative to a complete selection of categories at each time interval, selected categories would be selected on a default basis based on repetitive programming patterns. For example, because it is known that many professional football games programs are available for viewing at set times such as certain Sundays of the year, a sports category or football subcategory would automatically be selected for that time. This alternative takes advantage of the fact that television programming is a type of linear programming which has generally repeating patterns of scheduled events.

To help viewers keep track of their position in the navigational system, the tool screens provide a tool identifier 186 and domain identifier 188. The tool identifier 186 appears at the top left corner of the screen and displays the name of the current tool. The domain identifier 188 displays icons of the various domains, with a highlight on the current domain. The tool and domain information for these identifiers are obtainable from the coordinate index and tables relating the coordinates to particular tools and domains. The domain icons are stored in a dynamic RAM contained in the set top box. In some tools, such as the channel tool, the tool and domain identifiers appear only temporarily when a viewer changes tools or domains and then disappear in order not to block the view of a program or other content.

The picture-in-graphics cell 190 and description box 200 display additional information about a program highlighted in the tool window 180. This information is obtained from the head end as described above. The picture-in-graphics cell 190 displays audiovisual content of either the program highlighted in the tool window 180 or of the last channel watched before navigating to the current tool, a preference set by the viewer in the custom tool. The operation of the picture-in-graphics cell is described in greater detail below in relation to the IPG tool. The text for the description box 200 relates to the program highlighted in the tool window 180.

To provide viewers with a feeling of motion between domains and tools when actuation buttons 76 through 80 are pressed, transition segments are provided between screens. When actuation buttons 75 or 76 are pressed, a transition segment is provided on the screen that gives a feeling of motion upward or downward, respectively. When actuation buttons 78 or 80 are actuated, a transition segment is displayed that provides a feeling of motion left or right. These transition segments serve several purposes, including to provide a feeling of motion to the user, to orient the viewer to the direction in which the viewer is moving (e.g., up or down between tools), and to fill in a time gap created while the set top box is locating the appropriate data stream for the next tool or domain as requested by the user.

Figure 9:
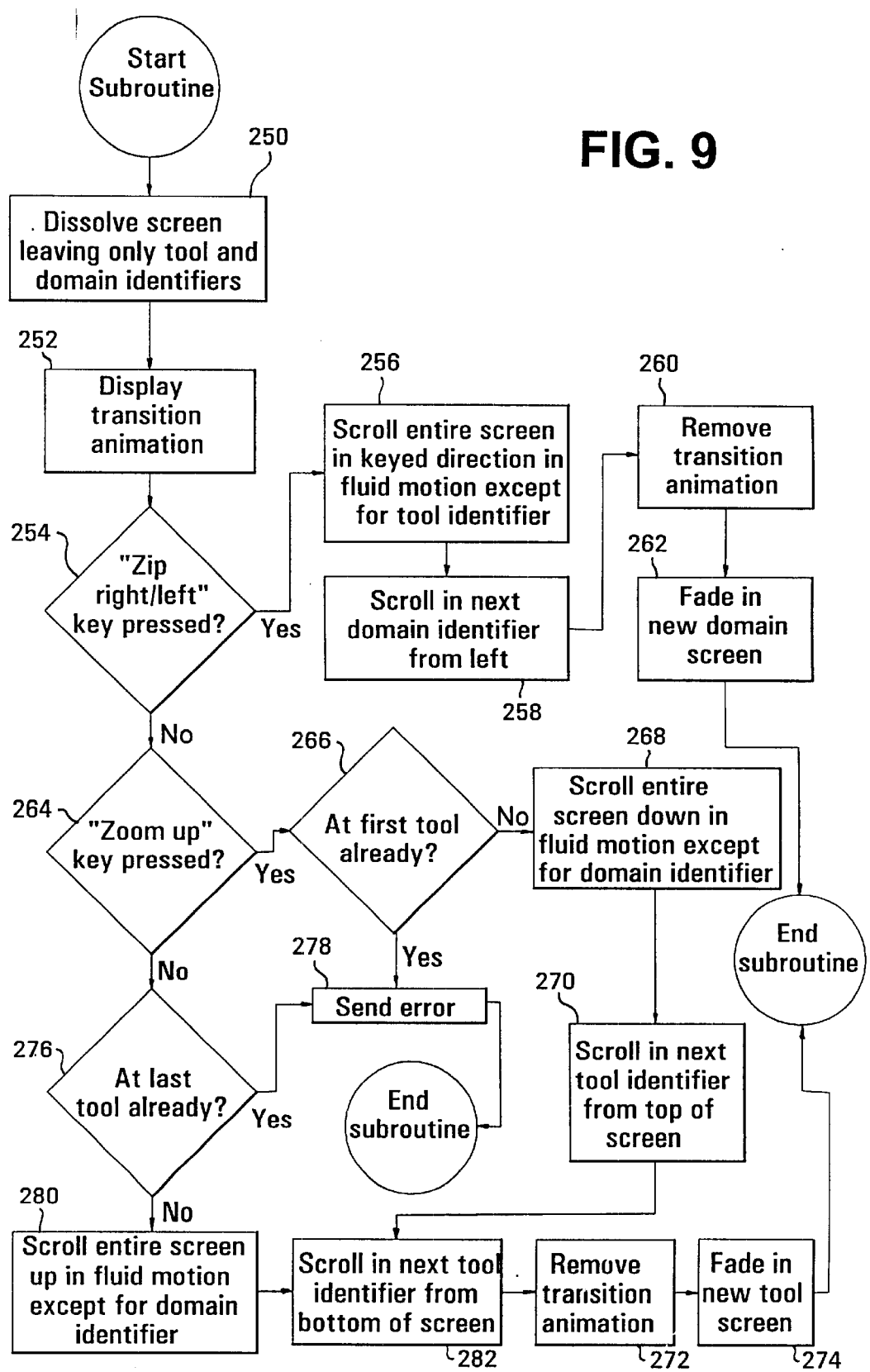
FIG. 9 is a flow chart showing the process of providing transitional segments when moving between domains and tools.
Figure 10B:
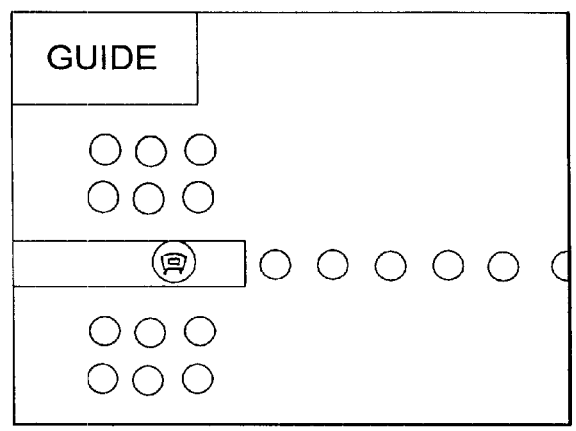
Figure 10C:
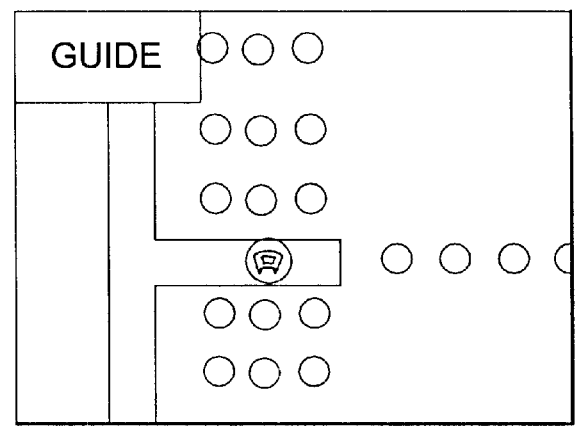
Figure 10D:
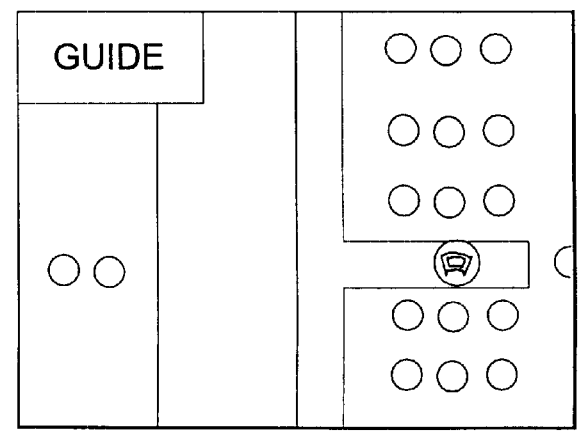
Figure 11B:
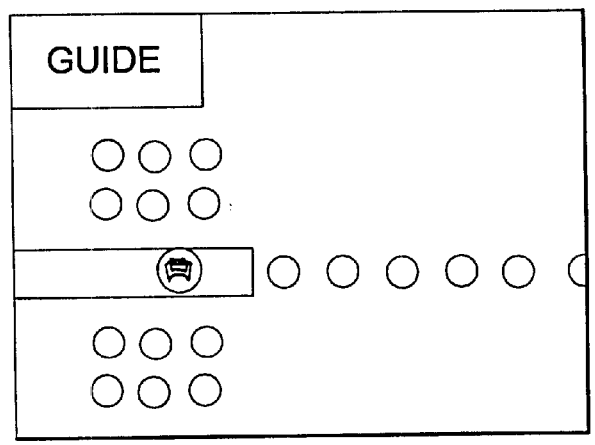
Figure 11C:
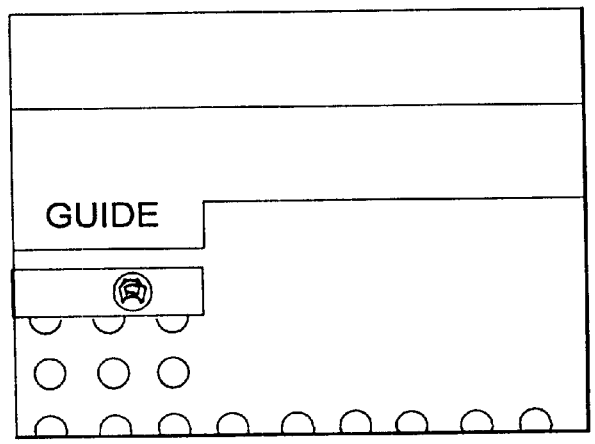
Figure 11D:
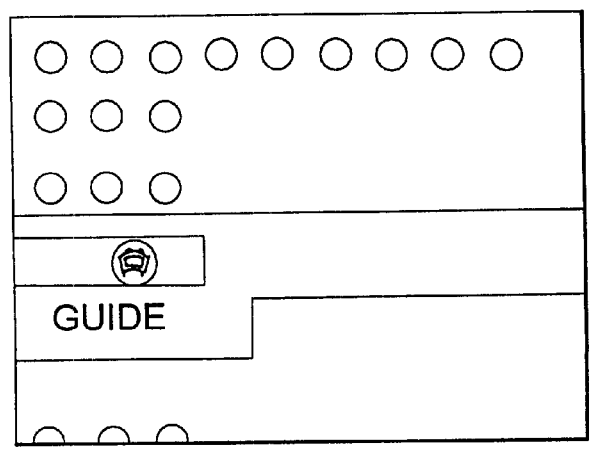
Figure 11E:
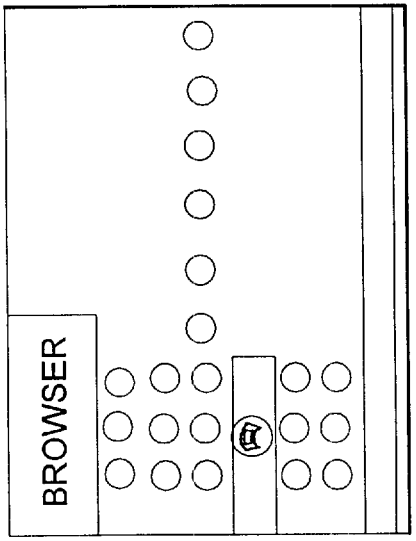
Figure 11F:
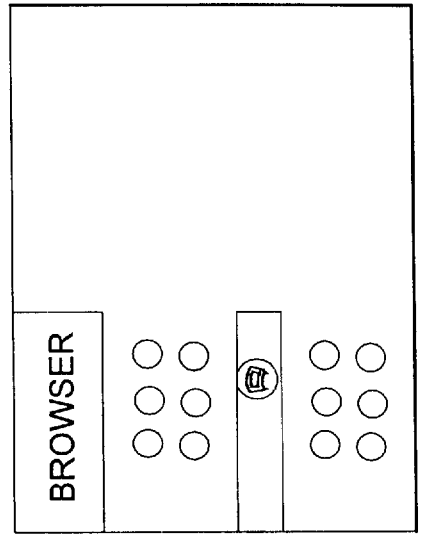
Figure 11G:
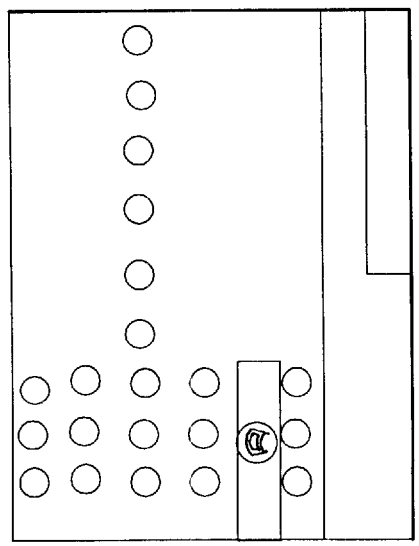
Figure 11H:
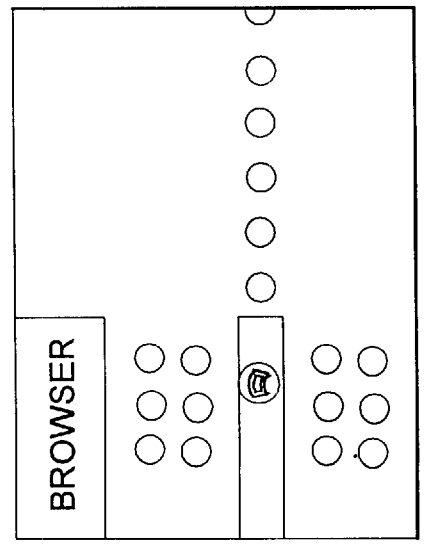

The process of displaying transition segments is shown in the flow chart of FIG. 9 as described with reference to the screen displays shown in FIGS. 10A–10H and 11A–11H. FIGS. 10A and 11A show a screen for the IPG tool in the television domain, having a tool identifier 186 and domain identifier 188. When a viewer presses one of the actuation buttons 75–80, the navigational system begins to retrieve the data required for the next screen, and the current screen is dissolved leaving only the tool identifier 186 and domain identifier 188, step 250. Next, transition animation is displayed, step 252, as shown in FIGS. 10B and 11B. The transition animation is stored in and retrieved from memory in the set top box.

If the right or left actuation button is pressed, step 254, indicating that the viewer wishes to move between domains, the entire transition screen is scrolled in the direction of the key pressed except for the tool identifier 186, step 256. The sequence of scrolling the transition screen is illustrated in FIGS. 10C–10E, with the screen shown scrolling to the right. Leaving the tool identifier 186 on the screen informs the viewer that the system is switching domains while remaining in the same tool. As the existing transition screen scrolls out, a new transition screen scrolls in from the opposite direction, step 258. The new transition screen contains transition animation as well as the domain identifier 188 highlighting the new domain. The sequence of scrolling in a new screen is illustrated in FIGS. 10D–10G, with the new screen scrolling in from the left. Thus, the viewer is informed that the system has changed from one domain to another, in this case, from the television domain to the VOD domain. After the new transition screen has completely scrolled in, the transition animation is removed, step 260 (see FIG. 10H), and the new domain screen for the current tool is faded in, step 262. The viewer can then interact with the new screen.

If the up actuation key is pressed, step 264, indicating that a change of tool is desired, the system checks whether it is at the first tool in the order of tools, step 266. In the preferred embodiment, this is the host tool. As explained above, the tools are arranged in a specific desired sequence, and the viewer is prevented from wrapping around from first to last in order to maintain that sequence. If the current tool is the host tool, an error indication is sent to the viewer, step 278, such as in the form of an audio beep. Otherwise, the entire transition screen is scrolled down except for the domain identifier 188, step 268. Leaving the domain identifier informs the viewer that while the tool is changing, the domain is remaining the same. The sequence of scrolling the transition screen down is illustrated in FIGS. 11C–11F. At the same time, a new transition screen with a new tool identifier 186 is scrolled in from the top of the screen, step 270, giving the viewer the impression of moving down from one tool to the next. The sequence of scrolling the new transition screen down is illustrated in FIGS. 11C–11G. Once the new transition screen is in place, the transition animation is removed, step 272 (see FIG. 11H), and a new screen showing the new tool is faded in, step 274.

A converse sequence of operations is performed if the viewer presses the up actuation key 75. The system checks whether it is at the last tool, step 276, and if so sends an error message, step 278. Otherwise, the entire transition screen except for the domain identifier is scrolled up, step 280, and a new transition screen is scrolled up from the bottom of the screen, step 282. When complete, the transition animation is removed, step 272, and the new tool screen faded in, step 274.

The transition segments enhance the viewer's feeling of motion when navigating between screens. In addition, the use of perpendicularly arranged transition segments when navigating between domains and tools reinforces the viewer's feeling of traveling in two different directions when moving between domains as opposed to moving between tools.

An alternative method of providing transitions between domains and tools highlights the feature wherein the last channel watched is contained in the picture-in-graphics cell 190 (FIG. 8), as described further herein. In this method, when a user presses the up or down key 75 or 76 while in the channel tool, the frame for the channel being watched rapidly shrinks down from the entire screen to the picture-in-graphics cell, with numerous intermediary frame sizes shown between the full size screen and the picture in graphics cell. Simultaneously with this transition,the IPG tool or info tool screen, as the case may be, is transitioned into the space left on the television screen by the shrinking channel frame. This transition indicates to the user that the picture-in-graphics cell 190 contains the last channel watched. When the user uses the up or down key 75 or 76 to move from the IPG tool or info tool screen back to the channel tool, the last channel being displayed in the picture-in-graphics cell 190 expands from the reduced size frame to full screen view.

For this alternative method of providing a picture-in-graphics cell, during transitions between tools, the current screen is not dissolved upon operation of one of the actuation buttons 75 or 76, but rather, the whole tool screen scrolls out while the new tool screen scrolls in, leaving the picture-in-graphics cell 190 stationary on the screen displaying the last channel watched. The domain identifier may remain on the screen as well. For this method, there are no separate transition screens or animation used. Rather, the current screen is scrolled out either while still in its full operational state with running video or multiple videos, if displayed, or the video or multiple videos for that screen are frozen while the new screen is scrolled in. Similarly, the new screen for the tool being scrolled in may contain running video or multiple running videos to be displayed. The video or videos for the new screen may continue to run while the screen is being scrolled in, or the running video or videos may be in a frozen state while the screen is being scrolled in, wherein after the screen scrolls in and the video picture or pictures are updated to the real time state to continue running. A similar operation would occur for transitions between domains, with the picture in graphics cell 190 and tool identifier remaining stationary while the two screens scroll laterally in and out.

Another implementation of this method may present in the picture-in-graphics cell 190 the video for the currently highlighted channel for the current tool as described further below. For example, as the lens in the IPG tool, described below, moves from channel to channel, the picture-in-graphics cell changes to display the video for the current channel highlighted by the lens. With this implementation, when the "gimme" button 92 is pressed, the current video being presented in the picture-in-graphics cell is expanded to full screen display.

The navigational system of the present invention provides other functions which operate in one or more of the tools. One such function allows viewers to tag programs for later viewing using the tag button 90 on remote control unit 68. The function of tagging programs or channels for later viewing varies somewhat from tool to tool and is described below with reference to each tool. The navigational system stores a list of the tagged programs along with the program times in the set top box, and updates this list as additional tags are created or existing tags deleted.

The navigational system polls the list of tagged programs on a regular basis, such as every five minutes, to determine whether a program on the list will be available for viewing within the given amount of time. For any programs which will be available within the given amount of time, the system displays a message to the viewer identifying the program or programs which will be available for viewing. If more than one program will be available, the message presents a menu of the programs to the viewer. The viewer can then select whether to watch the program or pick one of the programs for viewing. The system transfers to a display of the channel in which the program is scheduled for viewing.

Another function provided by the system involves blocking. As explained below, the custom tool may be used by a viewer to select certain channels or programs for blocking. The list of blocked channels or programs is stored in memory as explained below. If the channel or program is selected for viewing using one of the other tools, the system requires the viewer to enter a personal identification number ("PIN") before it allows the viewing. This function allows parents to prevent their children from watching certain channels or programs.

The navigational system of a preferred embodiment also provides for ordering pay-per-view events or video-on-demand. These types of programs may be grouped in a single domain such as the VOD domain. Because these programs are generally available a number of times during a day, when a viewer selects or tags a pay-per-view event or video-on-demand in any of the tools, the system prompts the user to select a given time. The system then requires the viewer to enter a PIN and pay for or authorize payment for the program.

The various navigation tools provided in preferred embodiments of the navigational system are described in greater detail in the following sections.

Host Tool

As explained above, the host tool is designed to provide a viewer with a "guided tour" of a day's or evening's programming. For example, a host may tell a viewer of the top rated shows for the day, selected movies available, special sporting events, etc. This tool also lets the viewer execute upon a hot-spot and be transferred to the viewer's choice of preferred programming. The list of programming choices is created by the content provider and transmitted with the program over the broadcasting system. Hosted viewing provides content providers with an opportunity for attracting and selling programming content to the viewer. For example, the host may recommend a pay-per-view event, video on demand, or the like in order to bolster sales of the event. Additionally,the host provides an opportunity to interact with viewers, such as by polling viewers to obtain marketing information or the like.

Figure 12:
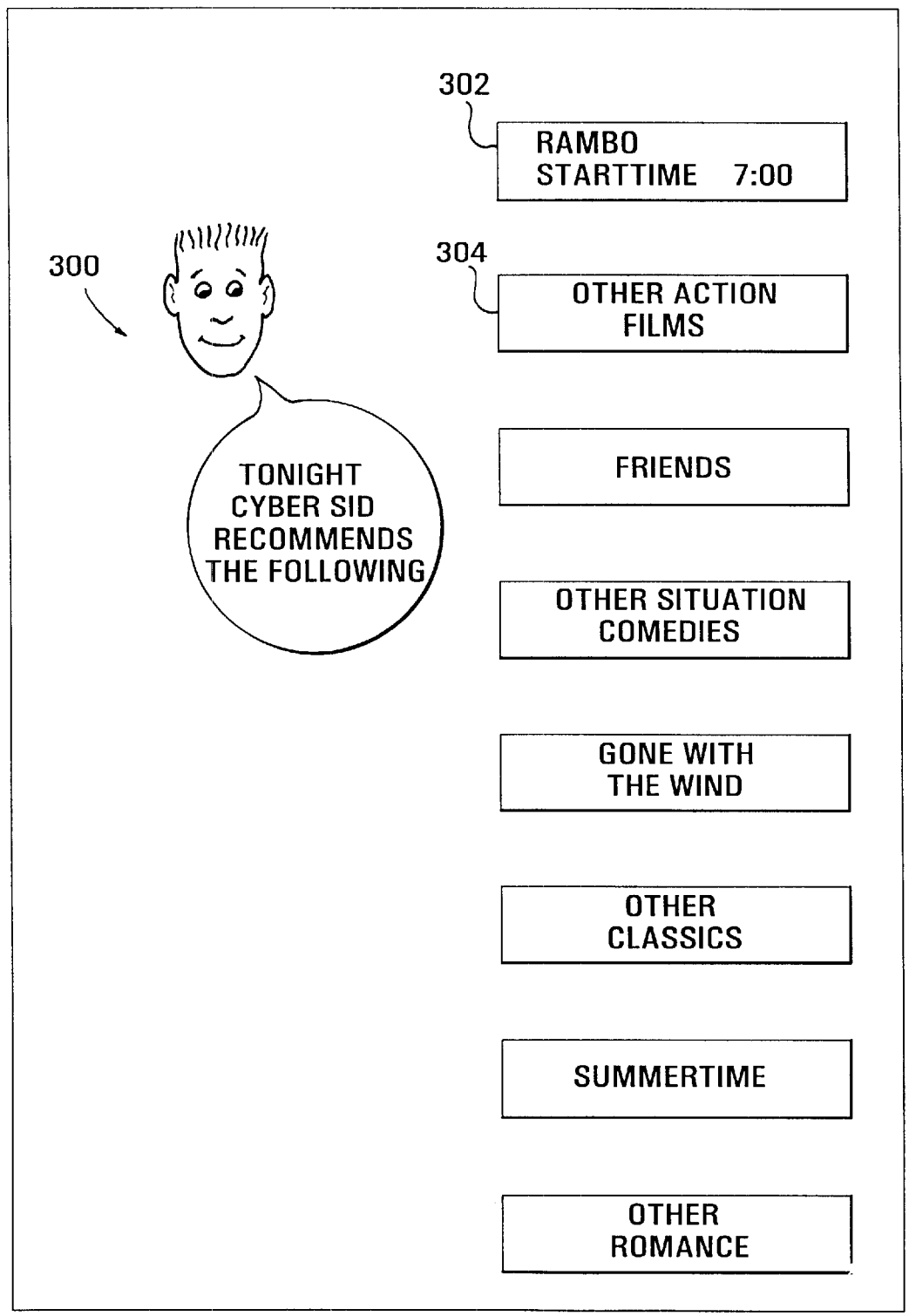
FIG. 12 is an exemplary illustration of an exemplary screen in the host tool.

Particular attention is directed to FIG. 12 which illustrates an exemplary screen for the host tool. In FIG. 12, an animated or taped or live video host 300 introduces the viewer to upcoming or currently available programs 302 and provides suggestions designed to assist the viewer in reviewing programming choices. The data for the menu of program choices 302 is transmitted to the viewer from the head end. As the head end periodically changes the menu choices, the menu is changed to reflect the addition and deletion of various menu choices. The set top box generates a selection cell which is controllable by the user through the down and up directional keys 84 and 82, respectively, on the remote control unit 68. In some embodiments, the selection cell also rotates through the choices automatically and the viewer uses the directional keys to move the selection cell manually.

Each program choice 302 is a hot-spot which links to the program identified therein. In some embodiments, audiovisual program data such as a reduced video image may also be displayed in the host tool. As the selection cell moves from choice to choice, the audiovisual data is changed to reflect the currently highlighted selection. The host tool screen also temporarily contains the tool identifier and may also contain the domain identifier.

Figure 13:
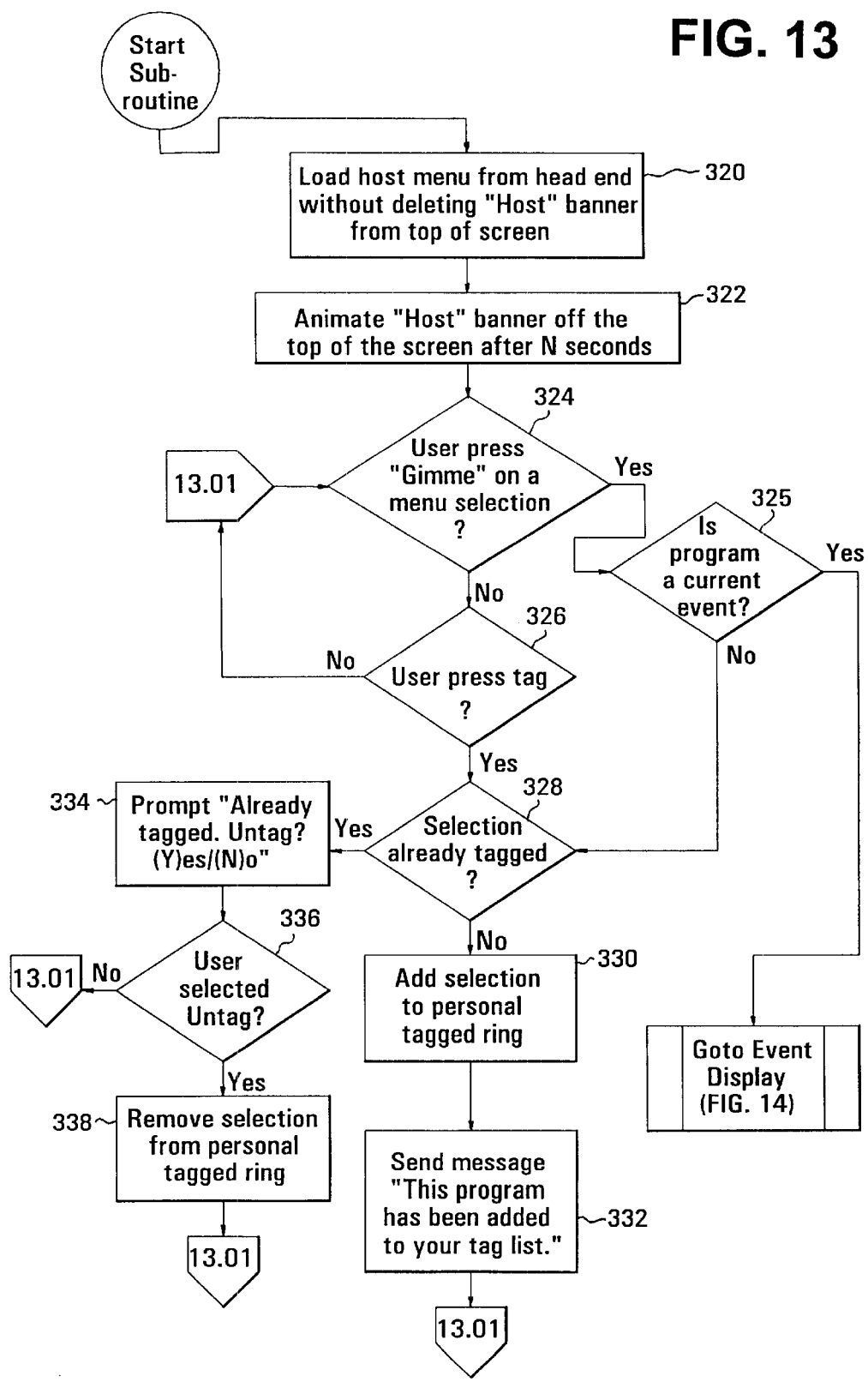
FIG. 13 is a flow chart showing the process of navigating around the host tool.

The process of displaying and handling viewer selections in the host tool is shown in the flow chart in FIG. 13. When a viewer navigates to the host tool, the tool identifier for the host is displayed along with the host menu received from the head end, step 320. The tool identifier is then removed from the screen after a few seconds, such as seven seconds, step 322. The viewer can then navigate among the program choices as explained above. If the viewer presses the gimme key 92 on a given program choice, step 324, the system determines whether the selected program choice is currently available for viewing, step 325. If the program choice is currently on, the program is displayed in accordance with an event display routine shown in FIG. 14 and described below. If the program choice is not currently on, the system treats the selection as if the viewer had pressed the tag key 90, and follows the same procedure as explained below.

If the viewer presses the tag key 90 on a program choice, step 326, the system determines whether the program choice is already tagged by checking the tagged list, step 328. If the program is not already tagged, the program is added to the tagged list, step 330, and a message to that effect is displayed to the viewer, step 332. A small box is also added to the program choice shown in the tool to indicate that the program is tagged. If the program choice has already been tagged, the system prompts the viewer for a decision whether to untag the program, step 334. If the viewer wants to untag the program choice, step 336, the program choice is removed from the tagged list, step 338.

Figure 14:
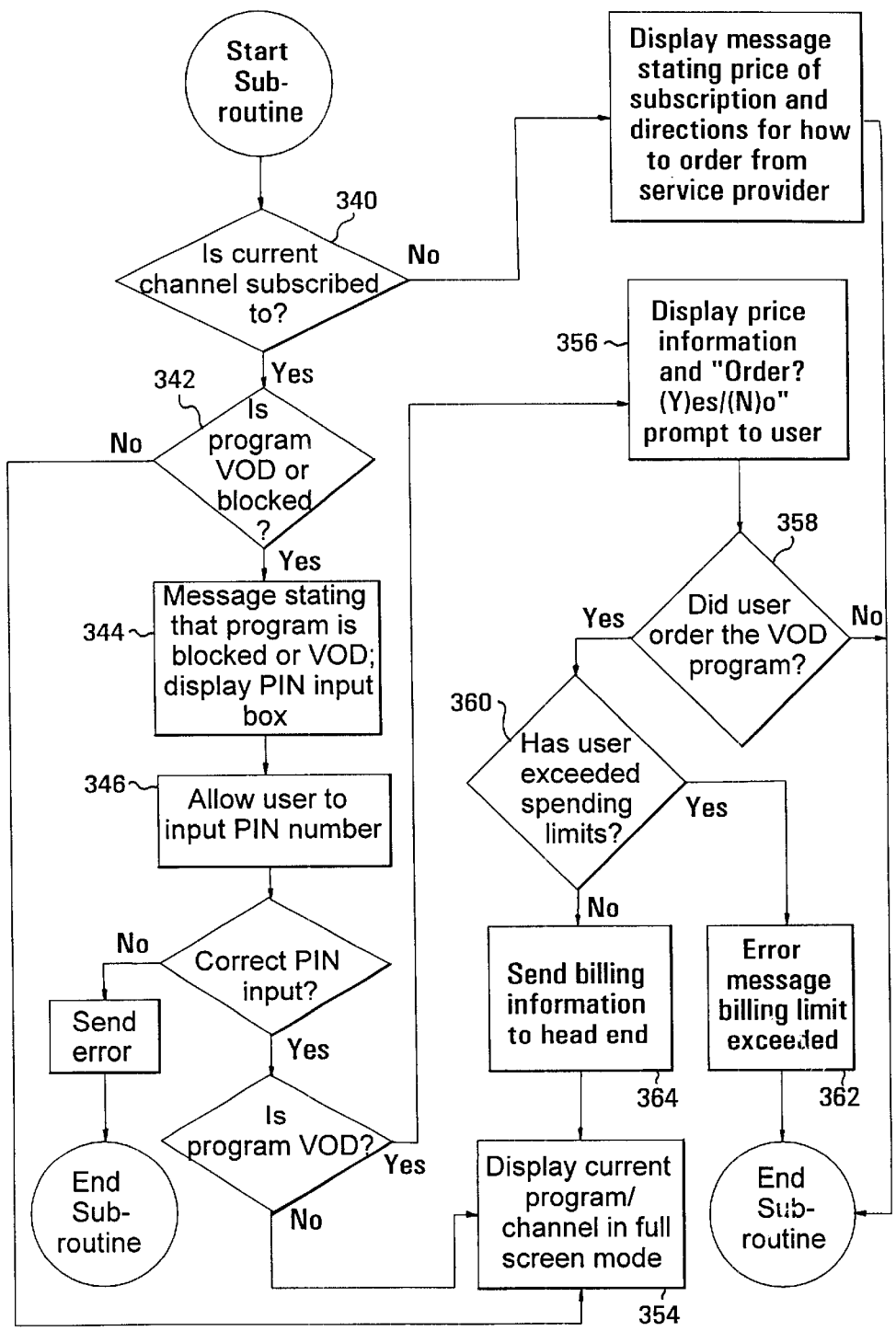
FIG. 14 is a flow chart showing the process of displaying events in accordance with one preferred embodiment of the present invention.

The steps taken by the navigational system when the viewer presses the gimme key 92 on a program choice are shown in the flow chart in FIG. 14. The system calls a conditional access system, known to those of skill in art, to determine whether the program choice selected is on a channel to which the viewer is currently subscribed, step 340. The system then determines whether the program choice or associated channel is blocked or available only on a pay-per-view or video on demand ("VOD") basis, step 342. The process of creating and storing blocked programs and channels will be described further below with reference to the custom tool. If the program or channel is blocked or VOD, the system displays a message to that effect, step 344, and allows the viewer to enter the required PIN for access to the program or channel, step 346. If the PIN input by the viewer is incorrect step 348, an error message is sent, step 350, and the program is not displayed.

If the correct PIN is input or the program or channel is not blocked, the system determines whether the selected program is a pay-per-view or VOD event, step 352. If not, the system displays the program in fill screen resolution mode, step 354. If the program is a pay-per-view or VOD event, the system requires the viewer to authorize payment for the event by displaying the price for the event (as received from the head end), prompting the viewer to decide whether to pay, step 356, and accepting the viewer's decision, step 358. In some embodiments, a viewer may set spending limits in the custom tool. If a spending limit is set, the system determines whether the addition of the selected pay-per-view or VOD program would exceed the spending limits, step 360. If the spending limits are exceeded, an error message to that effect is displayed, step 362, and the program is not displayed. If the pay-per-view or VOD event falls within the spending limits, the set top box transmits billing information to the head end (in a two way system), step 364, and displays the program, step 354. In some embodiments, the set top box stores the billing information in a holder and waits for the telephone line to be available before calling and transmitting the billing data to the head end.

FIG. 14 illustrates one process of presenting a selected program. One skilled in the art will recognize that the order of steps shown in FIG. 14 may be changed, or that certain steps may be omitted or added depending upon the interface desired.

Returning to FIG. 12, in some embodiments of the present invention the host tool also displays program categories 304. Selecting one of the categories brings the viewer to another tool screen, such as the MSB or IPG, with program choices filtered by the selected category, as explained further below with reference to each of these tools. These category selections 304 would thus be hot spots linked to those tool screens.

The host tool is the first level tool and it assists viewers in viewing programming content in the new navigational system of the present invention. The intuitive nature of the host tool is advantageous to those viewers that prefer a tour guide with targeted viewing as opposed to wandering or channel surfing as done by many viewers today.

Multiscreen Browser Tool (MSB)

The multiscreen browser tool is a second level tool that allows viewers to scan through a block of channels all at once. These blocks may contain programming, pay-per-view or video on demand previews, advertisements, shopping, etc. The MSB contains a plurality of windows, each showing still images or full motion video image running concurrently. In addition, viewers are able to see information for each program, such as title, channel, cost, rating and duration, and are empowered to display more in-depth information, such as cast information or a brief synopsis.

Figure 15:
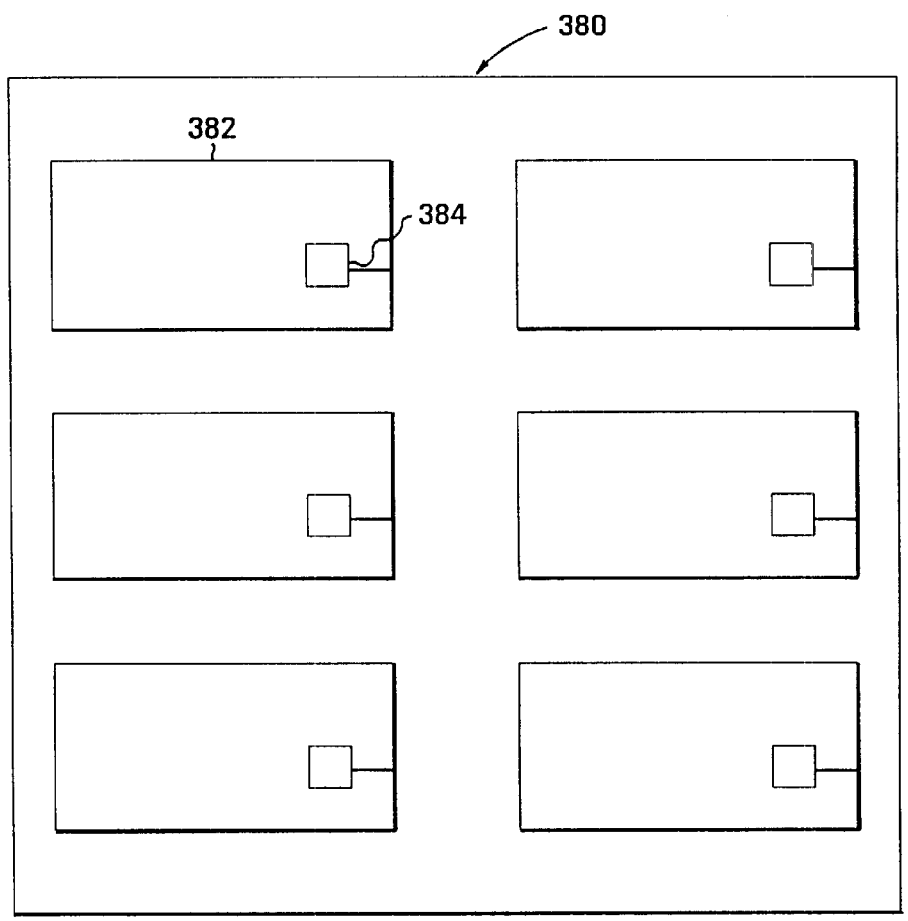
FIG. 15 is an illustration of an exemplary screen in the multiscreen browser tool.

An exemplary multiscreen display is shown in FIG. 15. The television receiver screen 380 is illustrated with six reduced sized video displays 382 each displaying a different reduced size video signal. Each reduced size video display includes a designated area for displaying indicia 384 of the reduced sized display provided, such as a channel logo for the channel on which the program featured in the window is available. The MSB also contains (not shown in FIG. 15; see FIG. 8) the tool identifier, domain identifier, a pick menu for the various MSB channels available, a clock, and a description box.

The set of video windows 382 displayed on a single MSB screen is selected according to the MSB channel. For example, in the "comedy" MSB channel, six different comedies would be displayed simultaneously. The viewer selects the desired channel by making a category selection in the pick menu or by using the channel selection button 74. The viewer then uses directional keys 82–88 on the remote control unit 68 to choose for which reduced sized image 382 the viewer desires to receive the associated audio. A graphic highlight is displayed around the viewer's selected reduced sized image 382.

Figure 16A:
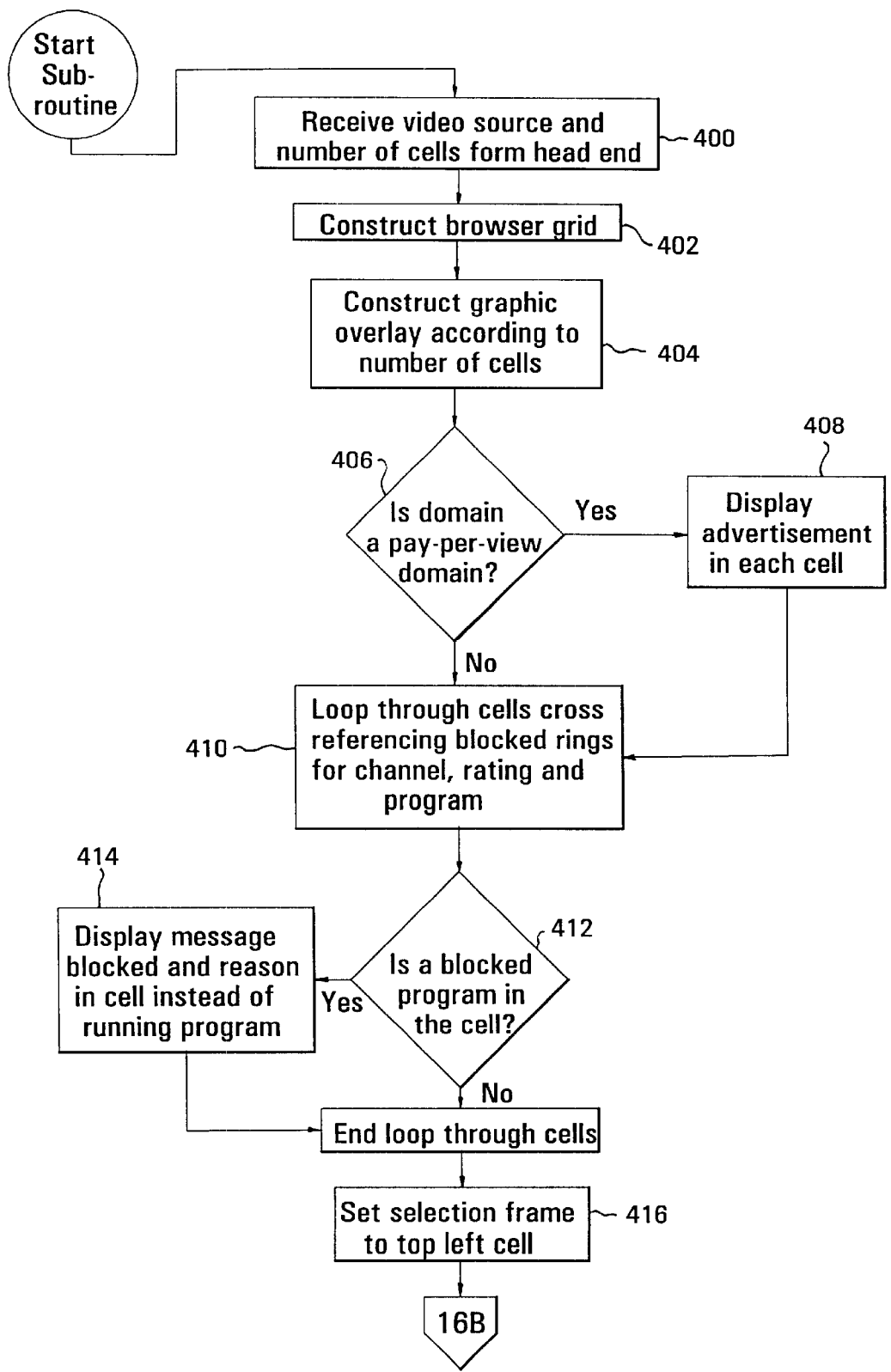
FIGS. 16A–16B contain a flow chart showing the process of creating and navigating around the multiscreen browser tool in accordance with one embodiment of the present invention.
Figure 16B:
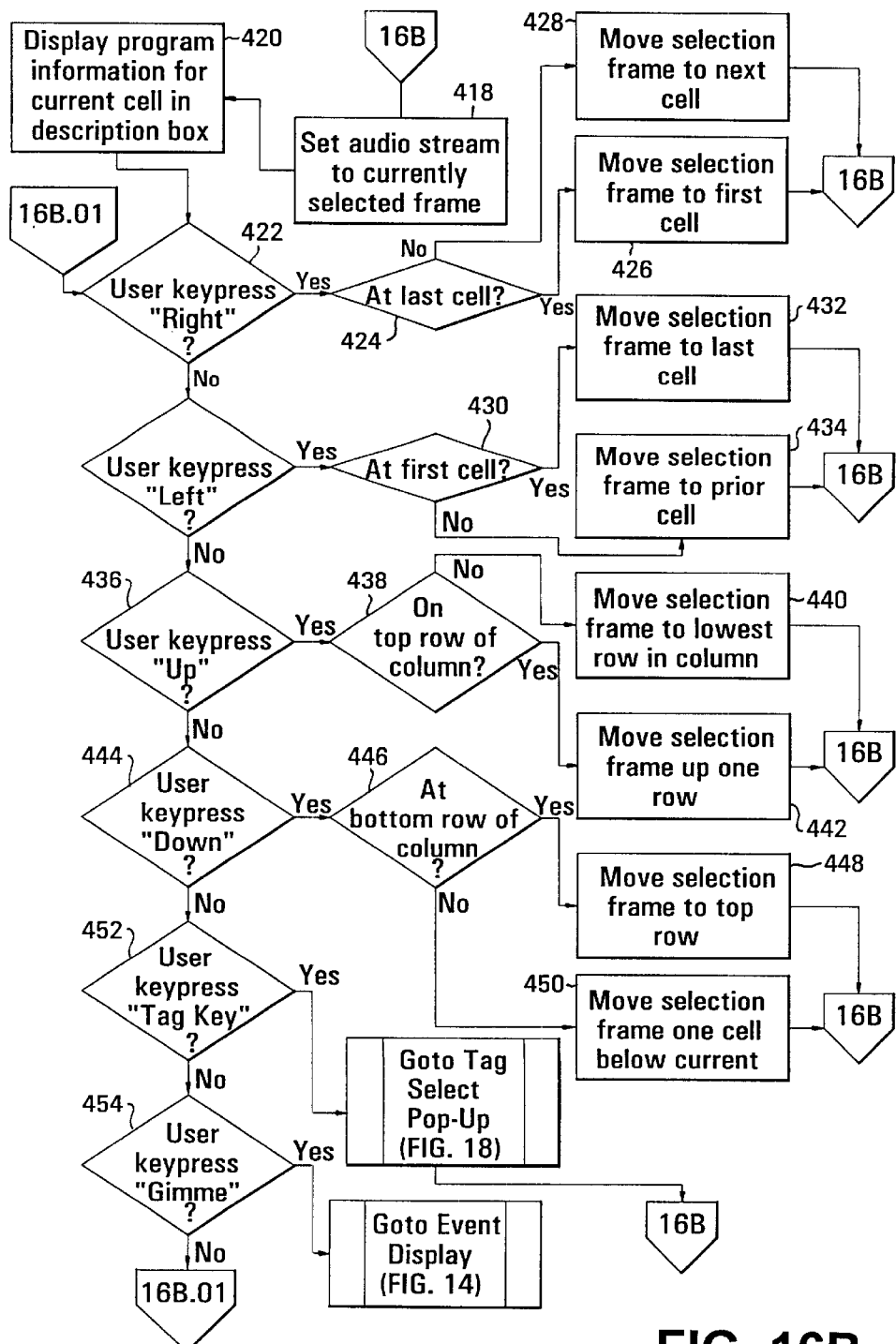
Figure 17:
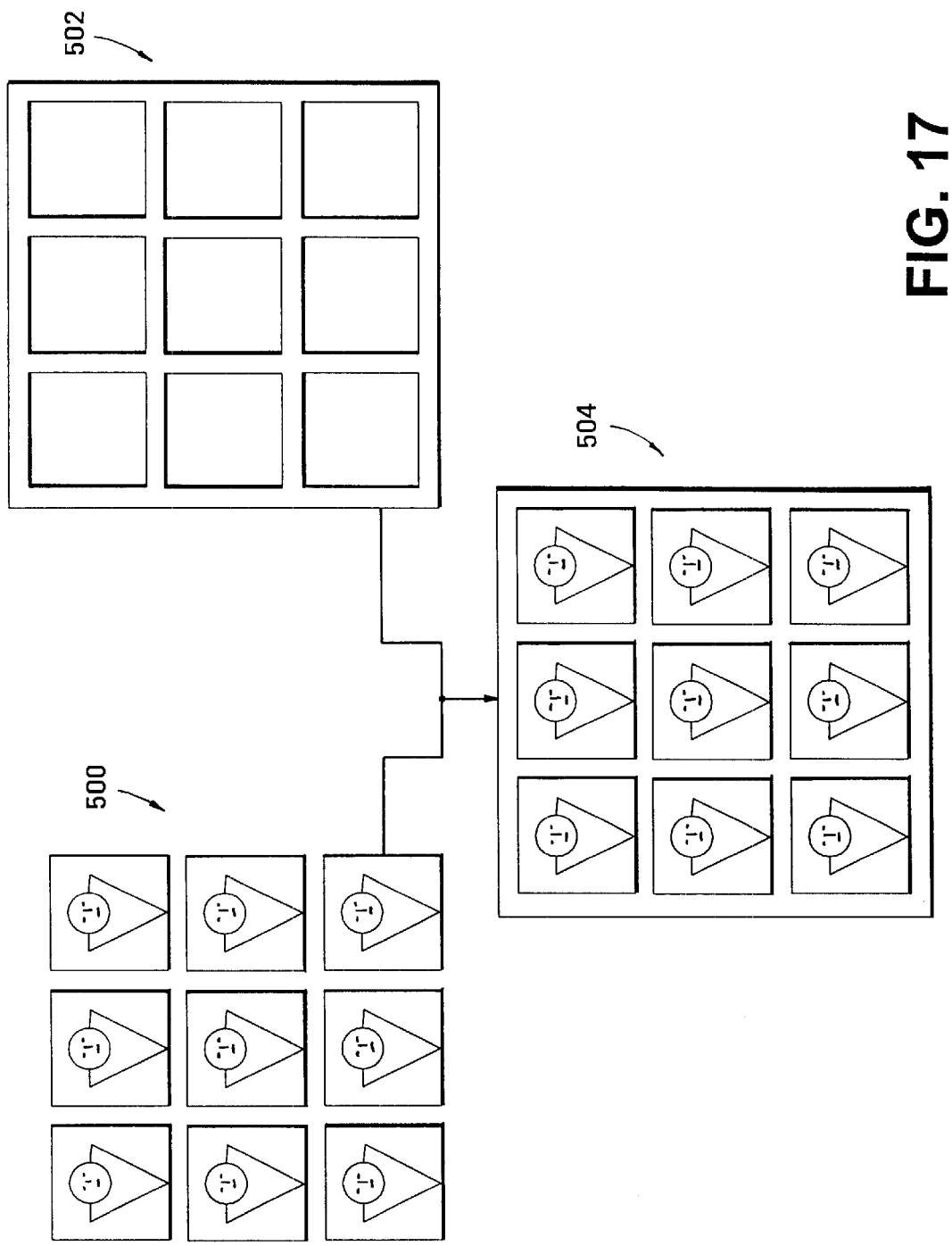
FIG. 17 shows a video source and grid overlay for the multiscreen browser tool of one embodiment of the present invention.

The process of displaying and navigating through the MSB is shown in the flow chart in FIGS. 16A–16B. The set top box receives a video source from the head end containing the videos to be reduced, which may already be reduced at the head end, and placed in MSB windows, step 400. The data received from the head end specifies the number of cells to be placed in a given MSB screen. In some embodiments, the data specifying the number of cells for each MSB display is sent in advance with the program guide information. A sample video source 500 for an MSB screen is shown in FIG. 17. The set top box then constructs an overlay grid, step 402, with a number of cells corresponding to the number of cells in the video source. FIG. 17 shows a sample overlay grid graphic 502 generated by the set top box for the video source 500. The set top box then overlays the grid 502 and the video source 500, step 404.

The MSB does not necessarily display all the videos contained in the video source received from the head end. If the programs are in the VOD domain which provides pay-per-view programming, step 406, an advertisement video or still image received from the head end is displayed, step 408. Alternatively, the head end may provide the advertisements in lieu of the actual program videos. For standard programming, the system cross references each video in the video source with the blocked programs, channels or ratings information, step 410, to determine whether the program is blocked, step 412. If the program is blocked, the system replaces the video for that program with a message indicating that the program is blocked and the reason therefor, e.g., the program has a rating of R, step 414. Once each program is checked, the set top box sends the overlaid graphic and video source, with channels blocked as necessary, to the television receiver for display. By default, the top left cell in the MSG graphic is set as highlighted, step 416.

Referring now to FIG. 16B, which continues from FIG. 16A, the system plays the audio stream associated with the video stream in the currently selected cell, step 418. As explained above, for each program the head end transmits the audio data separately from but linked to the video data. Both types of data are processed in the set top box for presentation on the television receiver. Description data related to the program is also transmitted from the head end and linked to the video data. The system displays the description data associated with the program in the selected cell in the description box, step 420. As a result, the viewer can view the video in the selected cell, hear the audio, and read the description about the program at the same time.

The viewer navigates around the MSB windows 504 by pressing one of the direction keys 75–80 on the remote control unit 68. If the user presses the right direction key 80, step 422, the system determines whether the viewer was currently at the last cell in the grid, step 424, and if so, wraps to the first cell, step 426. Otherwise, the system moves the selection frame to the next cell to the right, step 428, in the same or following row. Similarly, if the viewer presses the left direction key 78, the system determines whether the viewer was currently at the first cell in the grid, step 430, and if so, wraps to the last cell, step 432, or else moves the selection frame to the prior cell to the left, step 434, in the same or immediately preceding row.

The operation of the up and down direction keys 75 and 76 is similar. If the up button is pressed, step 436, and the current selected frame is on the top row of a column, step 438, the selection frame is moved to the lowest row in the column, step 440. If the selection frame is not is at the top row, it is simply moved up one row in the column, step 442. If the down button is pressed, step 444, and the current selected frame is on the bottom row of a column, step 446, the selection frame is moved to the top row in the column, step 448. If the selection frame is not at the bottom row, it is moved down one row in the column, step 450.

Each time the selected frame is moved to a new cell, the system switches to presenting the audio stream and description data linked to the program in the new selected cell, steps 418 and 420.

While a given MSB window is selected, a viewer can press the tag button 90 or the gimme button 92. If the viewer presses the tag button, step 452, the system displays the tag select menu and allows the viewer to tag the program, in accordance with the processes shown in FIGS. 20 and 21 and described immediately below. If the viewer presses the gimme button 92, step 454, the system displays the event linked to the selected window in accordance with the process shown in FIG. 14.

Figure 18:
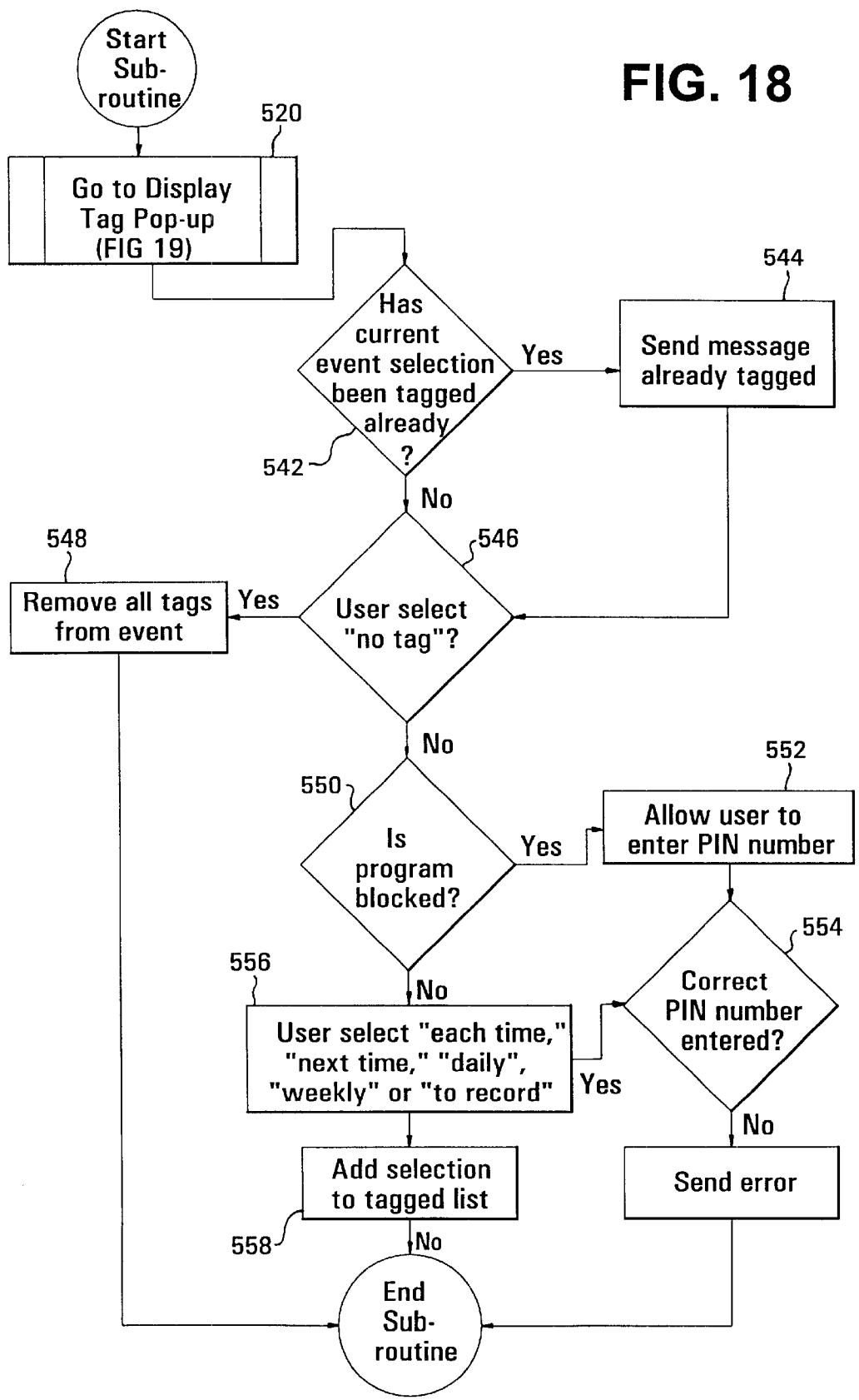
FIGS. 18 and 19 contain flow charts showing the processes of generating a tag edit menu and tagging programs or channels for later viewing.
Figure 19:
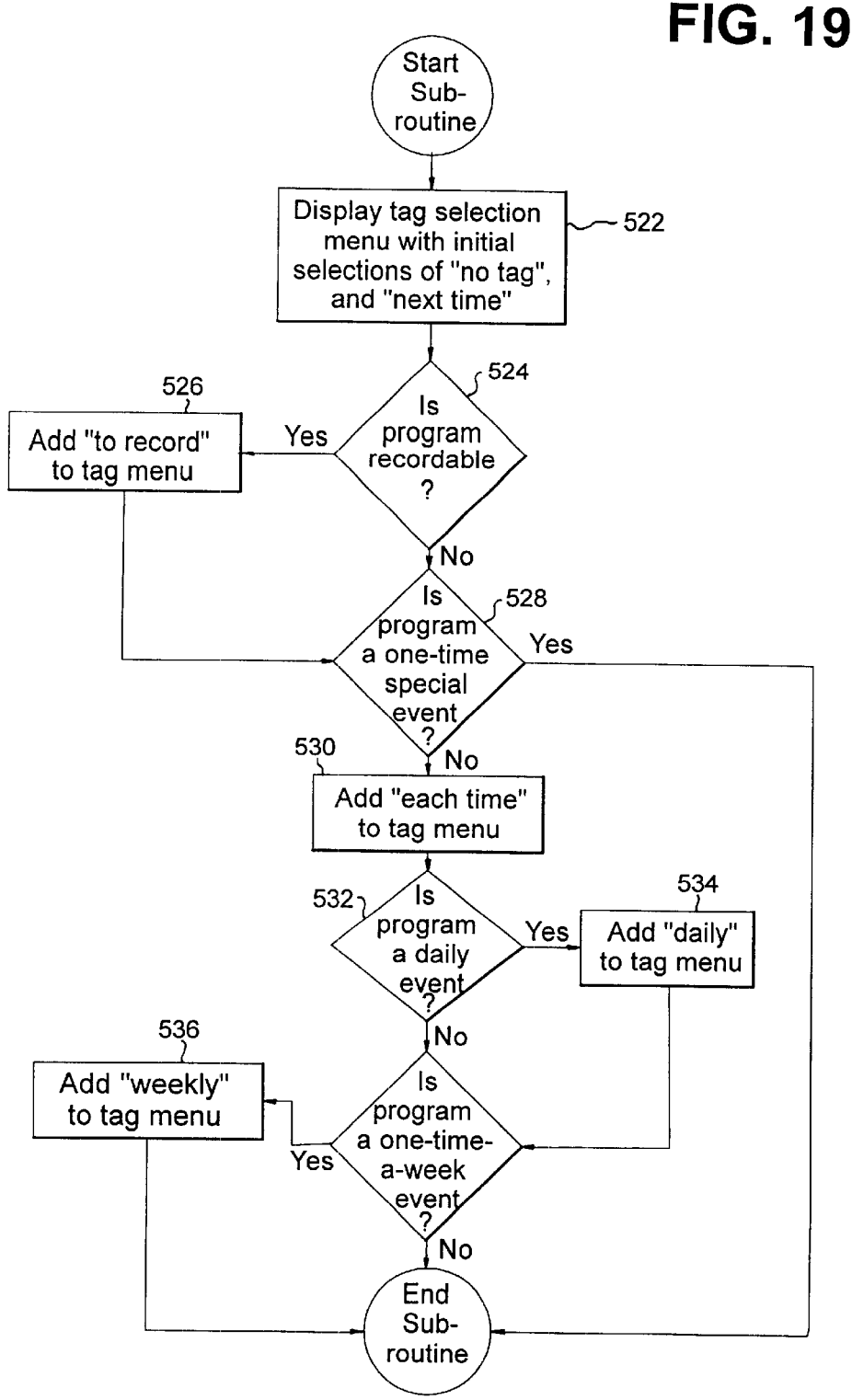
Figure 20:
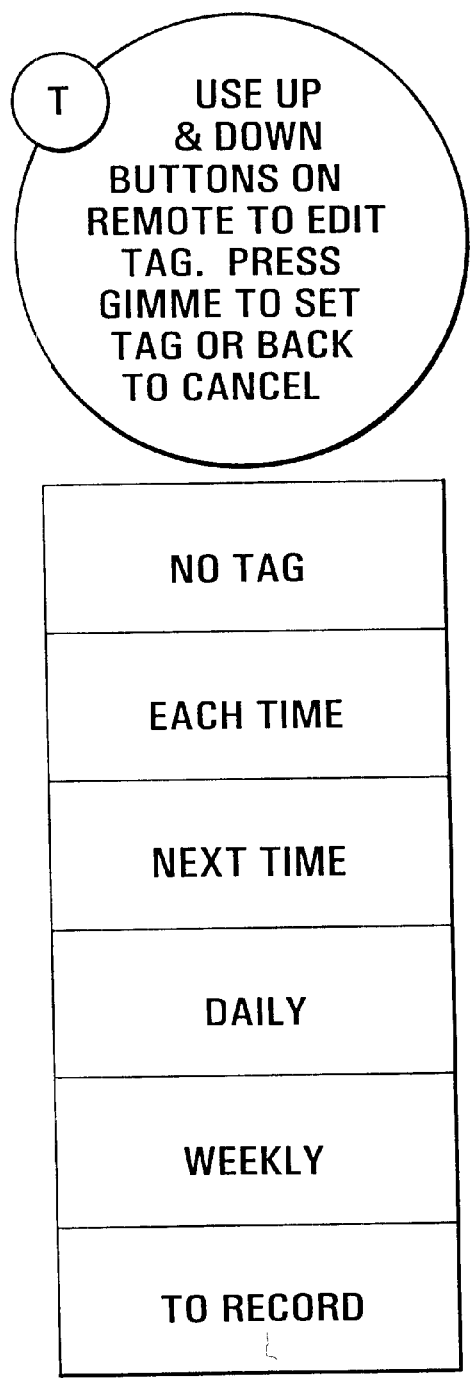
FIG. 20 is an exemplary tag edit menu generated and used according to the processes shown in FIGS. 18 and 19.

The process of creating tags is now described with reference to FIGS. 18–20. As seen in FIG. 18, when the tag button 90 is pressed, the tag pop-up menu is created, step 520. In accordance with some embodiments of the invention, the tag menu is tailored based upon the specific program. Referring specifically to FIG. 19, the tag menu always contains the options "no tag" and "next time," so these options are placed in the tag menu to be displayed, step 522. If the program is capable of being recorded (as, for example, if the head end does not include a code with the program indicating that it may not be recorded), step 524, a "to record" tag is added to the tag menu, step 526. If the program is a one time special event (e.g., a boxing match), step 528, no other is options are added to the tag menu. Otherwise, the program is on more than once and an "each time" option is added to the tag menu, step 530. If the program is a daily event, step 532, a "daily" option is added to the tag menu, step 534. If the program is on once a week, a "weekly" option is added to the tag menu," step 536. A resulting tag menu with all options available is shown in FIG. 20.

Returning to FIG. 18, once the tag menu is generated and displayed, the system checks the tagged list to determine whether the currently selected program has already been tagged, step 542. If so, the system displays a message or tag alert indicator to that effect, step 544. If the viewer selects the "no tag" option on the tag menu, step 546, the program is removed from the event list and all visual indicators of the tag are removed, step 548. The system also determines whether the program is blocked, step 550, and if so, requires the viewer to input a PIN, step 552. If the correct PIN is input, step 554, or if the program is not blocked, the viewer may select one of the options on the menu, step 556, and the program with the selected option is added to the tagged list, step 558.

Accordingly, it can be readily seen from the foregoing that the MSB allows a typical "channel surfer" to navigate through a variety of different programming content in a much more efficient manner than typical channel surfing. This is due to the fact that the multiscreen browser provides a viewer with multiple reduced sized programming images on a single screen, and with each click of the channel changing button the viewer receives new sets of programming content. Additionally, the multiscreen browser allows the user to view the video for multiple programs and listen to different audio tracks of the multiscreen images. In a two way broadcasting system, the user may even contact the head end via telephone line 115 to request that one or more video channels be sent in a multiscreen mode.

Intelligent Program Guide Tool (IPG)

As explained above, the IPG presents a program guide with program channels and times in a grid. Viewers can use the IPG to determine what programs are available at any time or to plan out viewing preferences in advance. The IPG contains particular features and elements detailed below that enhance the operation of the present invention.

Figure 21:
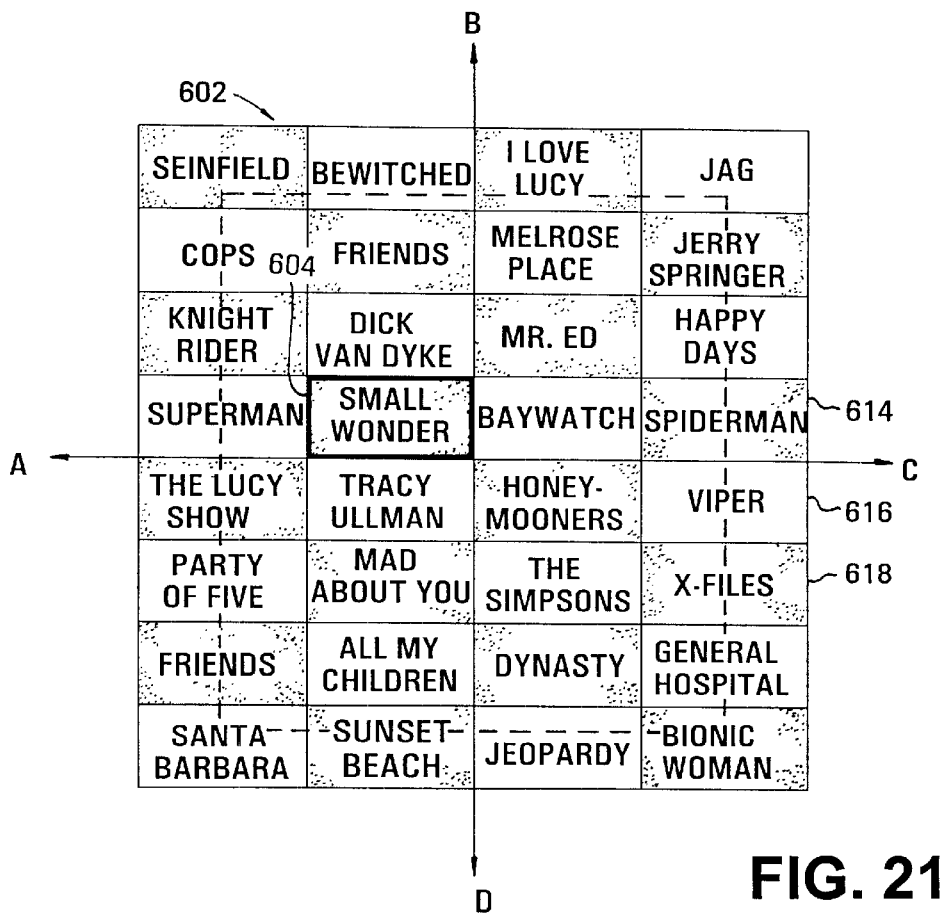
FIG. 21 is a diagrammatic illustration in top plan view of a data plane approach to an intelligent program guide with a lens transposed thereon.
Figure 22:
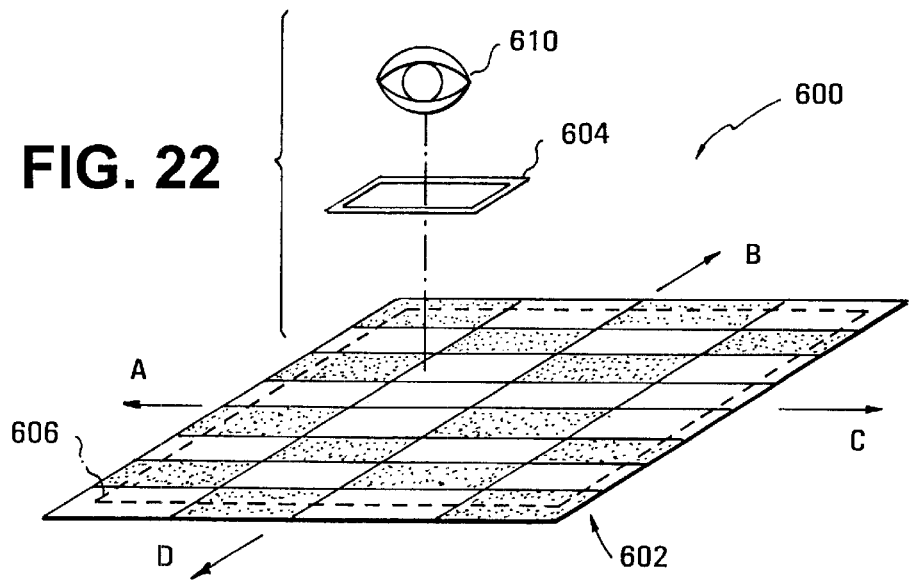
FIG. 22 is a diagrammatic illustration in isometric view of a data plane approach to an intelligent program guide with a viewer's sight path through a lens illustrated.

Particular attention is directed to FIGS. 21 and 22 which generally illustrate the functional operation of the intelligent program guide. Specifically, FIG. 21 is a top plan view and FIG. 22 is an isometric view of the IPG tool window. The IPG tool window, generally indicated as 600, is designed as a matrix data plane 602 which includes television scheduling information arranged by channel vs. time. Portions of the data plane 602 are moved smoothly relative to a television screen which is indicated in phantom as reference numeral 606, while a selection cell or lens 604 remains in a stationary position with respect to the television screen 606. A viewer 610 (FIG. 22) sees all the information provided on television screen 606 and receives more detailed information with regard to the data in the matrix box directly under lens 604.

The program guide functions such that each row of data represents the programming provided on a specific channel at sequential times, and the columns of information represent different programs available within a given time slot. In the preferred embodiment, the columns are broken into time frames of ½ hour, representing the standard length of a short television show.

Each IPG includes a finite number of channels, and scrolls through the channels when the user causes the scroll by pressing the up and down directional buttons 82 and 84 on remote control 68 (FIG. 6). In the down mode of operation, data plane 602 scrolls in the direction of arrow B, and television screen 606 and lens 604 are stationary. Thus, lens 604 continuously highlights the next lower matrix box. For example, as data plane 602 scrolls in the direction of arrow B, lens 604 will sequentially highlight the appropriate matrix box, from 614 to 616, then, from matrix 616 to matrix box 618. Near the end of each ½ hour, the data plane shifts in the direction of arrow A, such that the next column of programming information is highlighted under lens 604.

The remote control 68 (FIG. 4) is designed to allow the user to control the movement of data plane 602. If the user holds down a directional button 82 through 88, the data plane first moves relatively slowly, but if the user continues to hold down the button, the plane's movement speed increases. For example, the user causes the data plane to move to the right and left by use of the directional buttons 86 and 88 of the remote control 80. The system is designed such that when a matrix box is fully within lens 604, the matrix boxes on the top, bottom and each side of the screen are partially displayed. This partial display indicates to the user that there is more information located in each of the directions of arrows A, B, C and D. The user uses the directional buttons of the remote control to access the desired portion of data plane 602.

Further in accordance with the present invention, the matrix boxes are hot-spots which are linked to the programs identified therein. Also, the IPG contains other common tool no screen elements, including the tool identifier, domain identifier, pick menu featuring IPG category channels, clock, picture-in-graphics cell, and description box (not shown in FIG. 21; see FIG.8). As a result, the viewer can determine their current domain and can obtain more detailed information regarding the highlighted matrix box under the lens 604. For example, information such as the plot, rating, duration, actors, actresses, etc. may be displayed in the description box, either automatically or at a viewer's request.

Figure 23A:
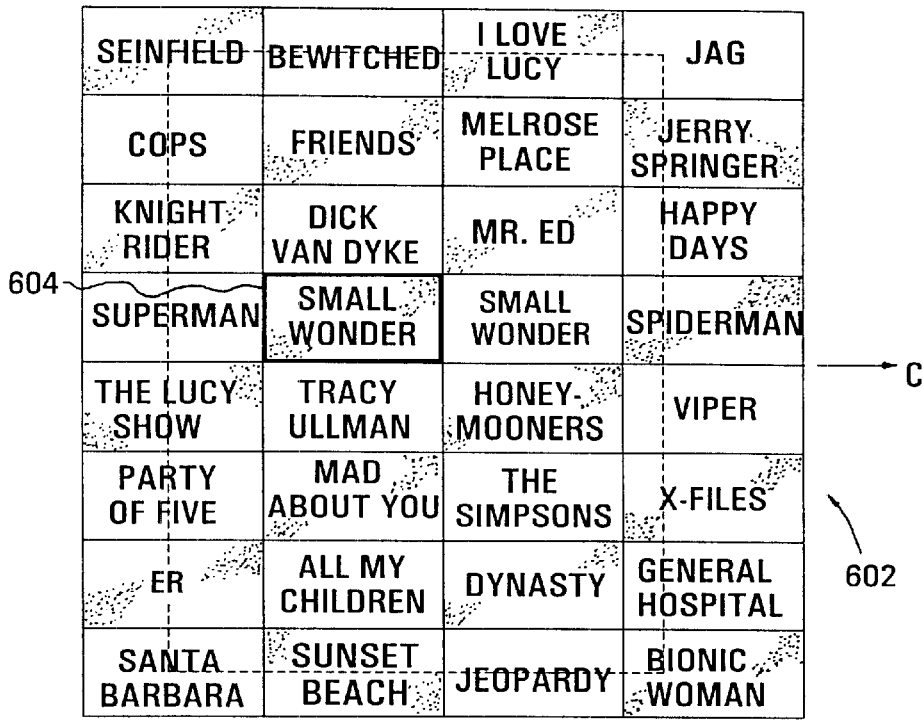
Figure 23B:
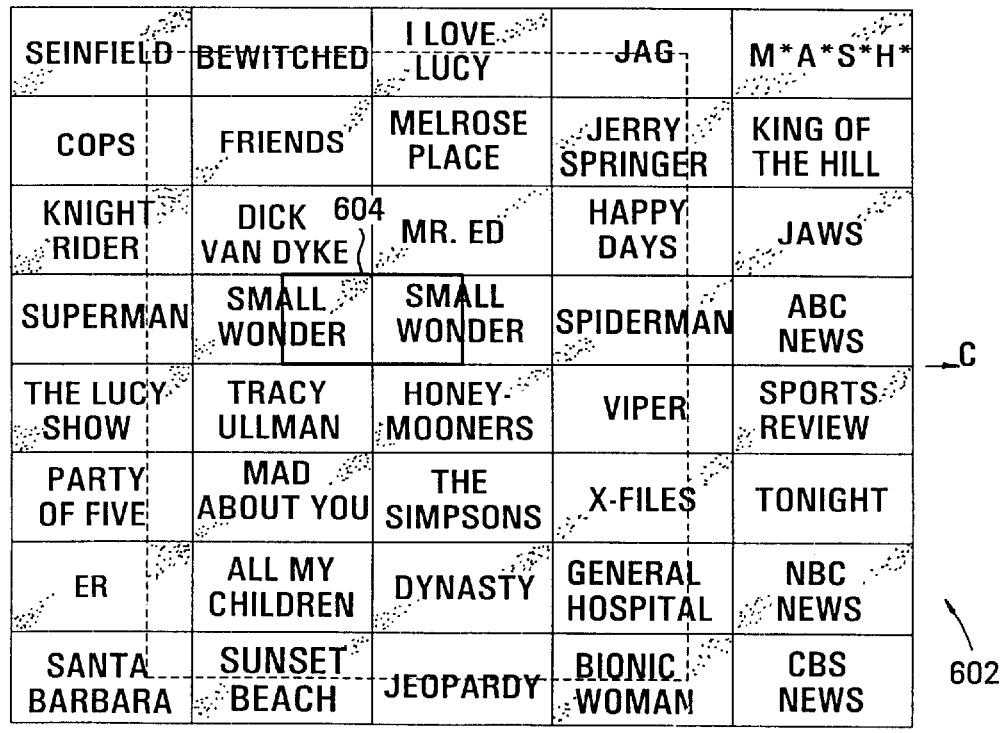
Figure 25:
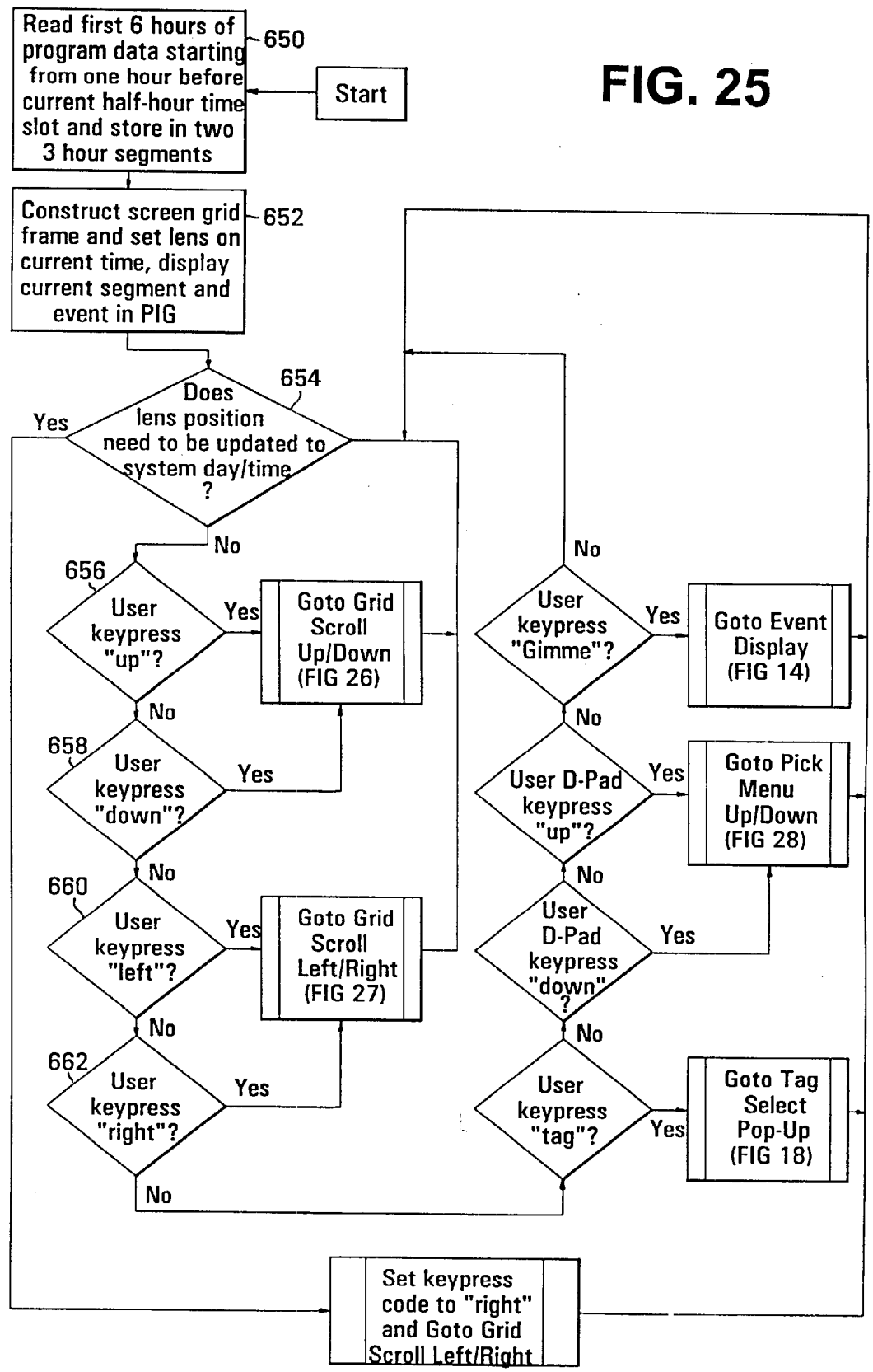
FIG. 25 is a flow chart showing the process of generating and navigating through the intelligent program guide tool in accordance with one embodiment of the present invention.

Television programs which are longer than 30 minutes can be handled in two ways. In either case the movement is at the same smooth rate, with acceleration as movement over 30 minute programs. One way is illustrated in the exemplary displays shown in FIGS. 23A–23C. In this embodiment, the title "Small Wonders," a one-hour program, is repeated in two consecutive matrix boxes, each box representing 30 minutes. The lens 604 smoothly scrolls from the first occurrence of the title to the second. When a user presses right directional button 88 on remote control 80, the system moves data plane 602 in the direction opposite arrow C, so that it appears lens 404 moves in the direction of arrow C. FIG.23B shows lens 604 during a snapshot when it is between boxes in the matrix grid.

Another way to handle 30 minute programs is illustrated in the exemplary displays in FIGS. 24A–24C. In this embodiment, only one occurrence of the title "Small Wonders" is provided in a matrix box, with the following box being empty. The title moves smoothly with the lens 604 from the left matrix box to the right matrix box as the data plane 602 is moved in the direction opposite to arrow C. This movement between the boxes in a greater than 30 minute program also occurs whenever the title would otherwise scroll off the screen to the right or left regardless of whether it is in the lens or not.

Figure 8:
FIG. 8 is a sample tool screen illustrating common tool screen elements used in one embodiment of the present invention.
Figure 34:
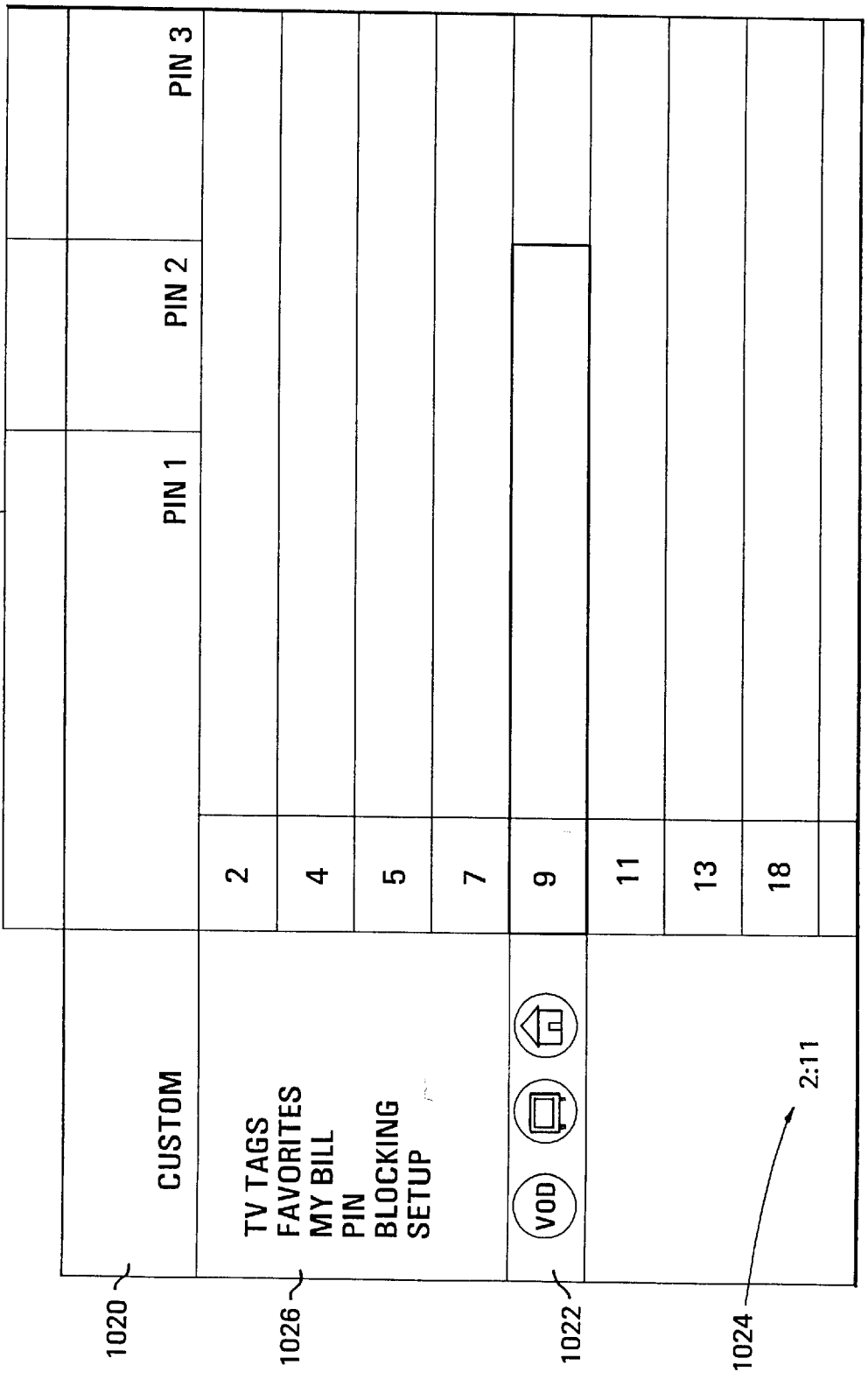
FIG. 34 is an exemplary screen in the custom tool.

As shown by comparing various drawings in several figures, the lens size is variable. For example, a comparison between FIGS. 8 and 34 shows that the size of the lens changes between tools. The lens shown in FIG. 34 is longer to accommodate the larger cell size used for a screen in the Custom tool than the lens shown in FIG. 8 having a shorter size for the IPG tool. Comparing FIG. 21 with FIGS. 8 and 30 shows that the lens size also varies among domains and among categories within a domain. In FIG. 21, showing one embodiment of an IPG screen in the television domain, the lens is sized to fit a 30 minute matrix box. In the exemplary IPG screen for the VOD domain shown in FIG. 8, the lens is sized to fit a movie title and next play time. Similarly, in the exemplary IPG screen for the television domain in the comedy category shown in FIG. 30, the lens size accommodates the program name and play time.

As one skilled in the art will recognize, such different lens sizes may also be used within a given IPG tool screen for matrix boxes of different sizes. That is, for example, different size lenses 604 may be used in FIGS. 23A or 24A for programs of different length, with the lens size used corresponding to the length of the program. The lens 604 varies between different sizes when the movement of the data plane 602 causes the lens 604 to cover programs of different lengths. For example, a 30 minute matrix box sized lens 604 would be used when a 30 minute program such as "Spider-man" comes into position with the lens 604, while a 60 minute matrix box size lens 604 would be used when a 60 minute program such as "Small Wonders" comes into position with the lens 604. Part of the lens 604, such as the left-most part, remains in a fixed position relative to the display. In this way, the lens 602 highlights the matrix box for the entire program as the box is moved into lens 602. Programs shorter than 30 minute duration, such as 15 minutes or less, can be similarly accommodated with correspondingly shorter lens sizes, and lens 604 changes size accordingly.

The process of generating and navigating around the IPG screen is shown in FIGS. 25–30. The head end transmits program event data for a certain limited amount of time, typically about six hours worth, to the set top box. The set top box reads and processes the data by dividing it into two three hour segments of program data, step 650. The system constructs a screen grid frame graphic, overlays it on the data and positions the grid so that the lens is on the current time, step 652. The lens is positioned on a default channel identified by the head end or set by the viewer in the custom tool. The video data linked to the program under the lens is retrieved, reduced, and displayed in the picture-in-graphics cell.

To keep the lens positioned at the current day and time, the system regularly checks whether the lens is positioned at the current day and time or whether it needs to be updated, step 654. If it needs to be updated, the system acts as if the right directional button was pressed and scrolls the grid in accordance with the process described below with reference to FIG. 27. This way, if a viewer moves to the IPG tool and uses it for a period of time, it is automatically updated to the current time while watched.

The viewer navigates around the IPG using the directional keys 82–88. If the viewer presses the up or down directional keys, steps 656 or 658, the system scrolls the IPG grid in accordance with the procedures described below with reference to FIG. 26. If the viewer presses the left or right directional keys, steps 660 or 662, the system scrolls the IPG grid left or right in accordance with FIG. 27. If the viewer presses the tag button, the program currently within the lens is tagged in accordance with the process shown in FIG. 18, as described above. The viewer can select items in the pick menu using the pick menu keys 85, and the ensuing pick menu selection process is described below with reference to FIG. 28. If the viewer presses the enter or gimme button 92, the program currently under the lens is displayed in accordance with the event display procedure described above with reference to FIG. 14.

Figure 26:
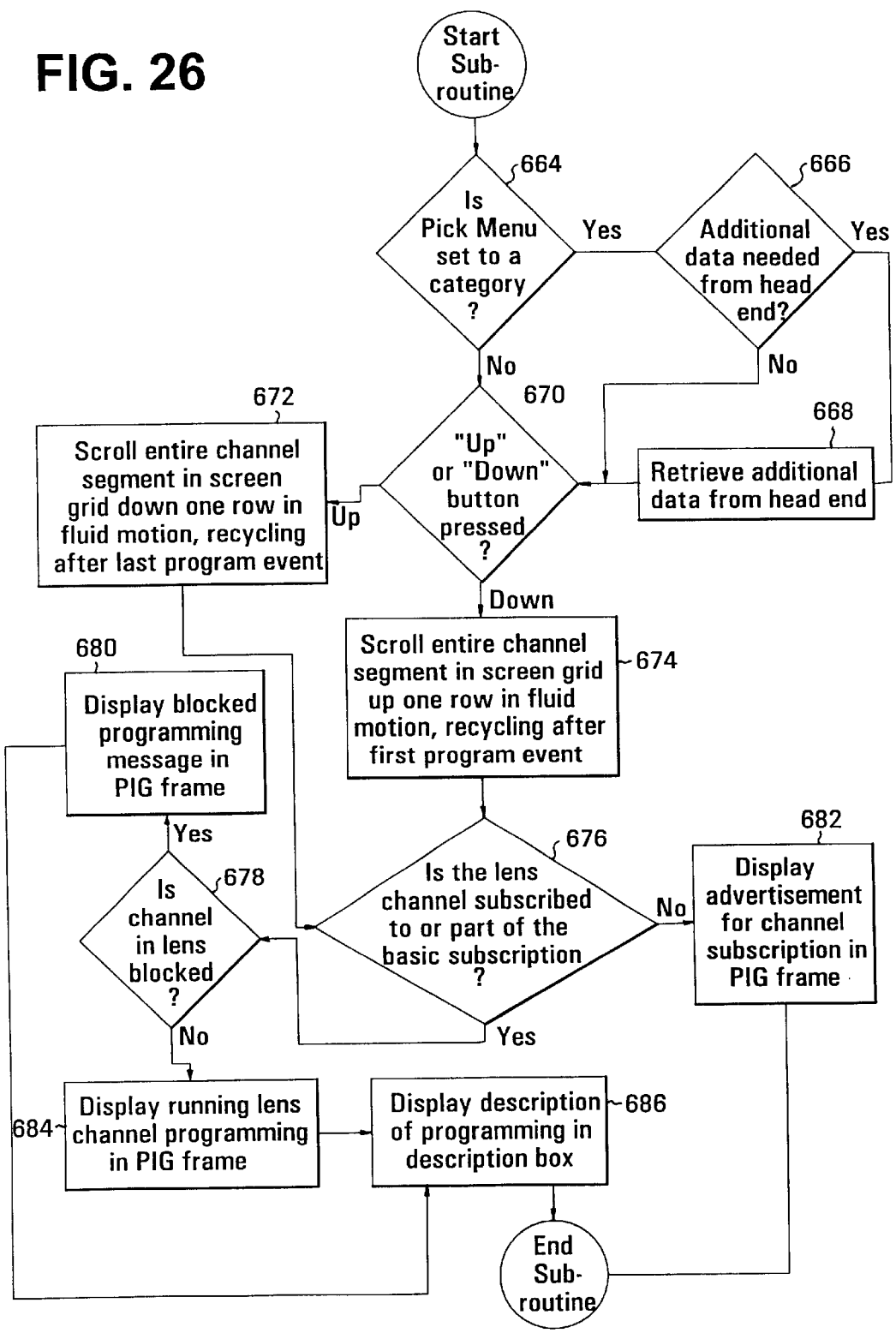
FIGS. 26 and 27 contain flow charts showing the process of moving the program guide grid in the intelligent program guide tool.
Figure 29:
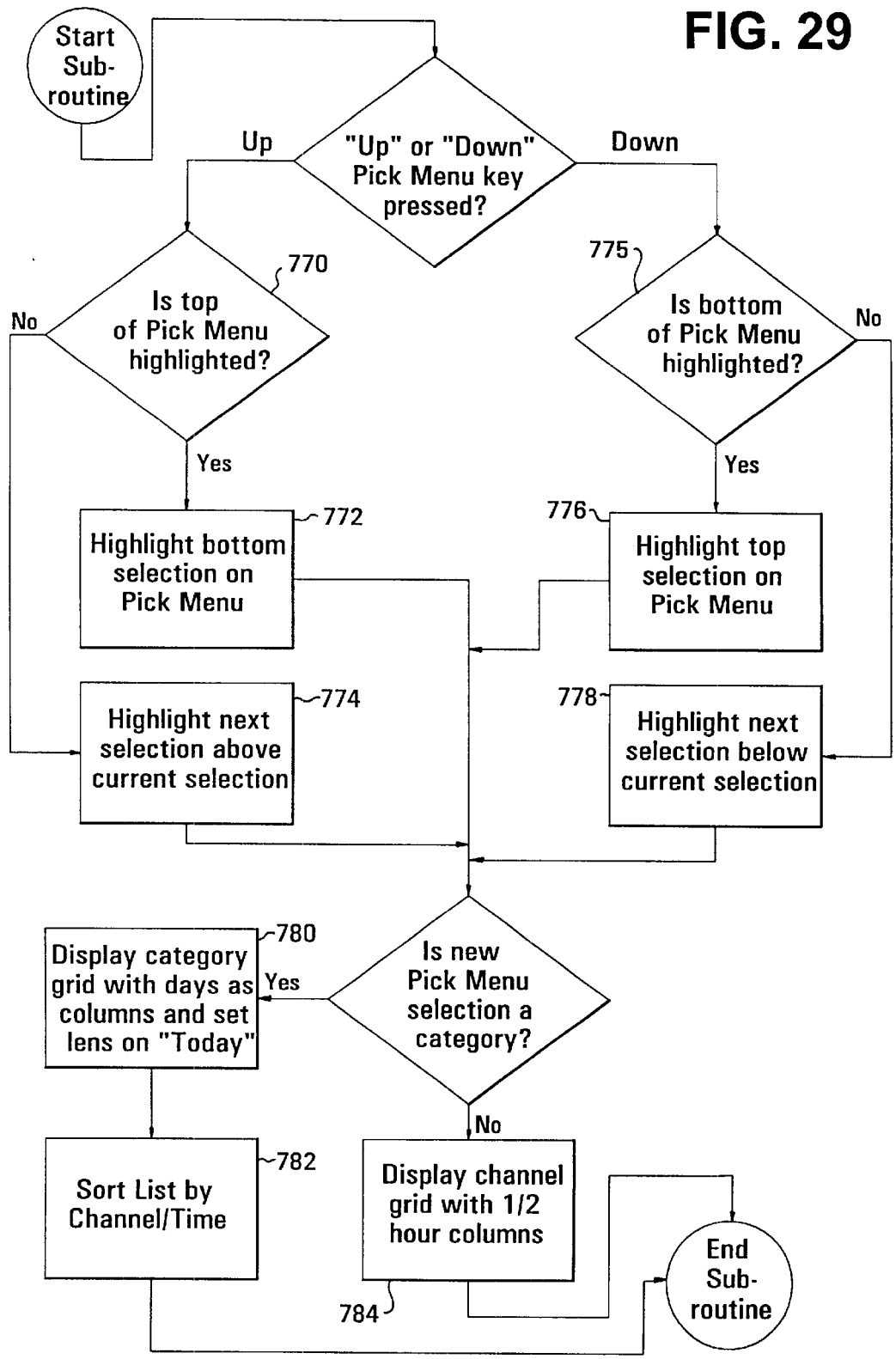
FIG. 29 is a flow chart showing the process of navigating and making selections in a pick menu in the intelligent program guide.

Turning now to FIG. 26, if the IPG grid is to be scrolled up or down, additional data may be required from the head end if the IPG is currently displaying a category of programming rather than all channels, step 664. A sample screen display in the IPG tool with a specific category (e.g., comedy) selected is shown in FIG. 29. In the category, the IPG displays a list of program within the category and the times they are available for viewing. If additional data is needed to scroll up or down within this category, step 666, the data is retrieved from the head end, step 668. Otherwise, for each time the up direction button 82 is pressed, step 670, the entire channel segment in the grid is scrolled down one row, recycling back to the first channel in the segment after the last channel, step 672. For a press of the down directional button, the same procedure is implemented by moving the grid up, step 674.

Once the grid is moved up or down, the lens is positioned over a new program on a new channel. If the channel in the lens is subscribed to by the viewer, step 676, and is not blocked, step 678, the video linked to the program is displayed in the picture-in-graphics cell, step 680. If the viewer does not subscribe to the channel, the system displays an advertisement in the picture-in-graphics cell, step 682. If the program or channel is blocked, a message indicating the blockage is displayed in the picture-in-graphics cell, step 684. In any event, the description data linked to the program is displayed in the description box, step 686, either automatically or at the request of the viewer.

Figure 27:
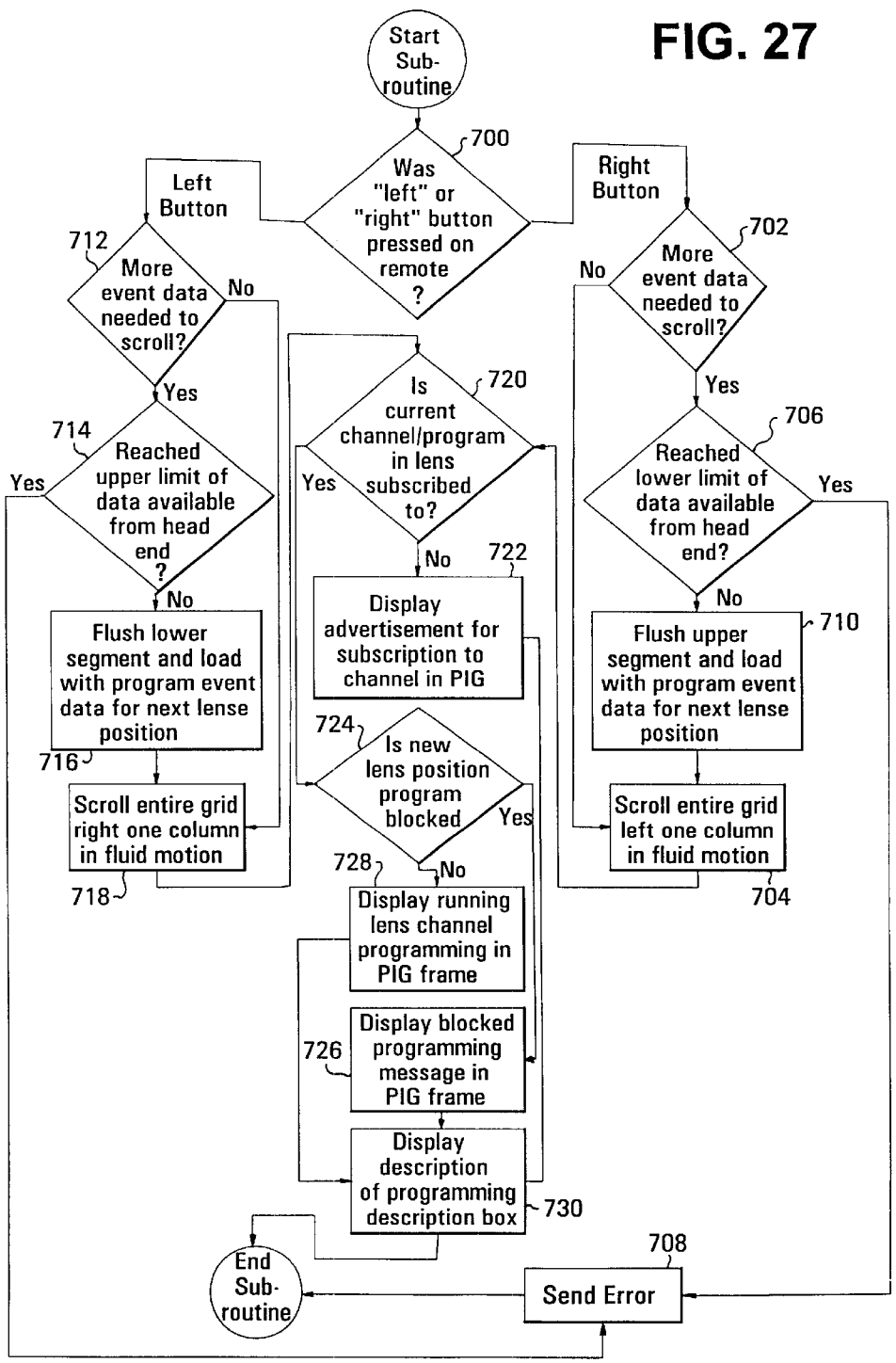

If the IPG grid is to be scrolled right or left, the system moves the grid in accordance with the process shown in FIG. 27. A move to the right of left involves displaying programs for additional times. Because the system receives and maintains a limited amount of program data, such as six hours stored in three hour segments in some embodiments, a move to the right or left may involve retrieving new program data. Thus, with reference to FIG. 27, if the right directional button is pressed, step 700, the system checks whether new program event data is needed, step 702. If the current program data segment contains sufficient data, the entire grid is scrolled to the left one column, step 704. If the current data segment is insufficient, the system determines whether the lower limit of data received from the head end has been reached, step 706. If the limit is reached, an audio feedback error message is sent, step 708, and the grid is not scrolled. If additional data is available, the upper data segment is flushed and loaded with the next event data, step 710, and the grid is scrolled left, step 704. The corresponding process is followed when the left button is pressed, as shown in steps 712, 714, 716, and 718 in FIG. 27.

Once the grid is scrolled either left or right, a new program item may appear in the lens. As explained above, a new program will not appear if the hour half program moves to the next or previous matrix box. If a new program appears, the system determines whether the viewer subscribes to the channel or program, step 720, and, if not, displays an advertisement in the picture-in-graphics cell, step 722. If the program is blocked, step 724, the system displays the blocked message in the picture-in-graphics cell, step 726. Otherwise,the video source linked to the program is displayed in the picture-in-graphics cell, step 728, and the description data linked to the program is displayed in the description box, step 730.

Figure 28:
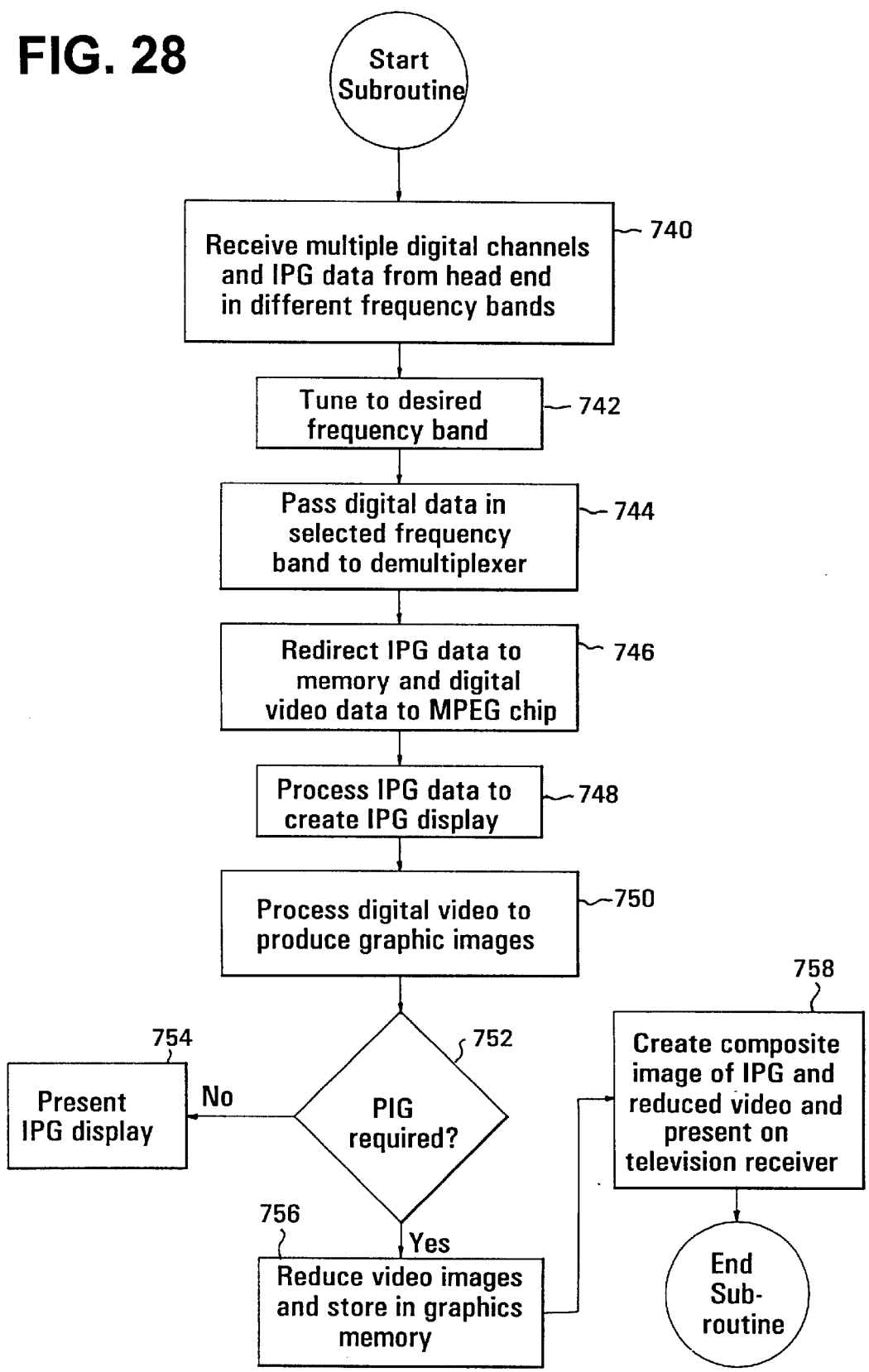
FIG. 28 is a flow chart showing the process of presenting a picture-in-graphics cell in the intelligent program guide tool of one embodiment of the present invention.

The operation of the picture-in-graphics ("PIG") feature used in the IPG is described to with reference to FIG. 28. The operation of the PIG is similar in other tools. As opposed to a picture-in-picture system which requires the use of two tuners to present two images, the PIG system of the present invention requires only one tuner. As a result, the set top box, which in one preferred embodiment has only one tuner, can simultaneously present IPG data and video from a digital video channel, such as the last channel watched or the channel linked to a program highlighted under the lens. This avoids the increased complexity and cost of providing a set top box with two tuners.

Referring to FIG. 28, the set top box receives multiple frequency bands containing multiple digital channels and IPG data from the head end, step 740. Some frequency bands may contain digital video channels which each include video information and IPG data. Other frequency bands may include digital video channels and a separate data channel containing a continuous stream of IPG data that is then synchronized to the digital video channels in the band such that the separate digital video channels are appropriately described by the IPG data. Alternatively, one dedicated frequency band may be provided to transmit only IPG data, which is then stored in set top box memory and synchronized with video when tuned to a frequency band that has video.

A processor in the set top box controls the tuner to tune to a desired frequency band, step 742, depending upon the tool or channel selected by the viewer. The tuner then passes that selected frequency band's digital information to a demultiplexer in the set top box, step 744. Under control by the processor, the demultiplexer redirects the IPG data to a memory chip such as a RAM in the set top box and redirects digital video data to a MPEG chip, step 746. The processor processes the IPG data stored in the RAM to create data representing the IPG to be displayed, step 748. The MPEG chip receives the digital video data from the MPEG video stream and processes the data to output a series of graphic images which represent the MPEG video, step 750.

A graphics chip receives the graphic image data from the MPEG chip and data representing the IPG image from the processor. If a PIG is not required in the IPG, step 752, the graphics chip converts the IPG data into a form that the television receiver can present, step 754. If a PIG is required, the graphics chip reduces the MPEG image data, step 756 and combines it with IPG image data to create a composite image, step 758, for display on the television receiver. Such graphic manipulation and combination is known to those of skill in the art. Alternatively,if a very high speed processor is used, the demultiplexer can send all data to the RAM and the processor then processes the IPG and digital video data to form the requisite composite or single video image for display on the television receiver via a simple graphics chip which converts the data into a NTSC signal.

As shown in FIG. 8, the PIG cell 182 may be located in a corner of the tool screen. Alternatively, the PIG screen may be overlaid on part of the tool screen. For example, the PIG cell may be positioned near the IPG lens (such as just above and to the right of the lens) so that the viewer can see the program title in the lens and watch the PIG video together, without the need to move his or her eyes substantially from lens to PIG cell and back. In that case, the graphics memory is organized into layers of graphics planes such that the IPG is displayed in the foreground while the plane with the reduced video images is in the background. The foreground IPG plane is then depicted in a transparent color to allow the moving video in the PIG to be viewed through the IPG plane.

As explained above, the IPG data may be transmitted with each digital video channel, as a separate digital channel in the same frequency band with other digital video channels, or in a separate frequency band from the digital video data. When transmitted in a frequency band with digital video data, the IPG may contain the entire set of IPG data or only a subset thereof, for example, IPG data for the programming available on the channel in the same frequency band or for programming available on all channels with the next few hours.

If all IPG data is transmitted via an IPG data channel in a first frequency band, such as on a "home" channel transmitted either with or without other digital channels in the same band, and a viewer is watching a video channel in a second frequency band, the tuner needs to tune from the second frequency band to the first frequency band to display the currently transmitted IPG data. In that event, the set top box will be unable to simultaneously display the IPG and the last channel watched. Thus, to accomplish the goal of being able to display the last channel watched while using the IPG, IPG data must be available in tunable frequency bands that may contain digital video channels so that the set top box can obtain the IPG data needed to update and present the IPG.

In one embodiment, IPG data for all channels is transmitted on an IPG data channel in each tunable frequency band. This has the effect of transmitting multiple home channels and has the disadvantage of wasting a significant amount of bandwidth. To reduce the bandwidth requirement, in another embodiment only "near-term" IPG data, that is, IPG data for a few hours around the current time, is transmitted in each tunable frequency band while a home channel in another frequency band transmits "long-term" IPG data, that is IPG data relating to shows outside this time frame. This allows the viewer to display an IPG with near-term IPG data and a PIG presenting video and audio for the last channel watched or for a program selected in the IPG. When the viewer desires to display IPG information outside the near-term time frame, the set top box tunes to the home IPG channel and may no longer be able to display the last channel watched in the PIG. This drawback may be acceptable since the viewer may be more interested in viewing the IPG when viewing the IPG beyond the near-term time frame.

In another embodiment each tunable frequency band has both a near-term and long-term channel. The set top box can then acquire long-term IPG data, if needed, without losing the last channel watched. Moreover, the long-term IPG data need not be frequently retransmitted, while the near-term IPG data is updated frequently. This embodiment has the advantage of minimizing the amount of time needed to acquire updated IPG data, thereby reducing the latency time for a viewer.

In another embodiment, the IPG data channel in each tunable frequency band contains IPG data for only the data video channels in that tunable frequency band and the immediately adjacent frequency band. The set top box can then display the IPG for the channels in the current and adjacent frequency bands and a viewer moving among the IPG channels in the current frequency band can simultaneously watch those channels. When the viewer moves to another channel in a different frequency band while moving among the IPG, the set top box already has IPG information available about that channel in the newly current frequency band (and previously adjacent) and has more time to acquire the new IPG data transmitted in the IPG channel contained in that frequency band.

The process of navigating and selecting items from the pick menu in the IPG screen is shown in FIG. 29. The pick menu wraps from top to bottom. Thus, if the pick menu key 85 is pressed up, and the current selection is the top item in the menu, step 770, the bottom item of the menu is selected, step 772. Otherwise, the selection moves up one item, step 774. Similarly for pressing the pick menu key 85 down, if the bottom of the menu is highlighted as the current selection, step 775, the next item is the top item, step 776, and otherwise the highlighted changes to the next menu item below the current item, step 778. If the viewer presses the gimme key 92 to select a pick menu item, a new grid is displayed. If the selected pick menu item is a category (as opposed to all available programs or favorites), the category grid is displayed, as shown in FIG. 30, with days as columns each listing programs and times and the lens set on the current day's column, step 780. The list of programs is sorted by channel and time, step 782. If the all shows or favorites items are selected, the system displays the channel/time grid described above, step 784.

The IPG tool screen for the VOD domain in which pay-per-view programs are available is similar to the category grid. An exemplary screen is shown in FIG. 31. As shown in FIG. 31, the grid contains the available events listed in a column with the next and later viewing times. Viewers can navigate, tag or enter one of these events in substantially the same manner as the all channel and category grids.

The IPG is an electronic tool that has many advantages over a conventional paper or video television guide. Not only is the IPG conveniently located, but the tool is broken down into different domains and different categorical channels within each domain to facilitate obtaining the desired information therefrom. Additionally, the tool is always located at the same location and provides additional information about those programs about which the viewer desires to receive more information. Furthermore, the viewer can link to the desired program by executing on a hot-spot.

Channel Tool

Figure 33:
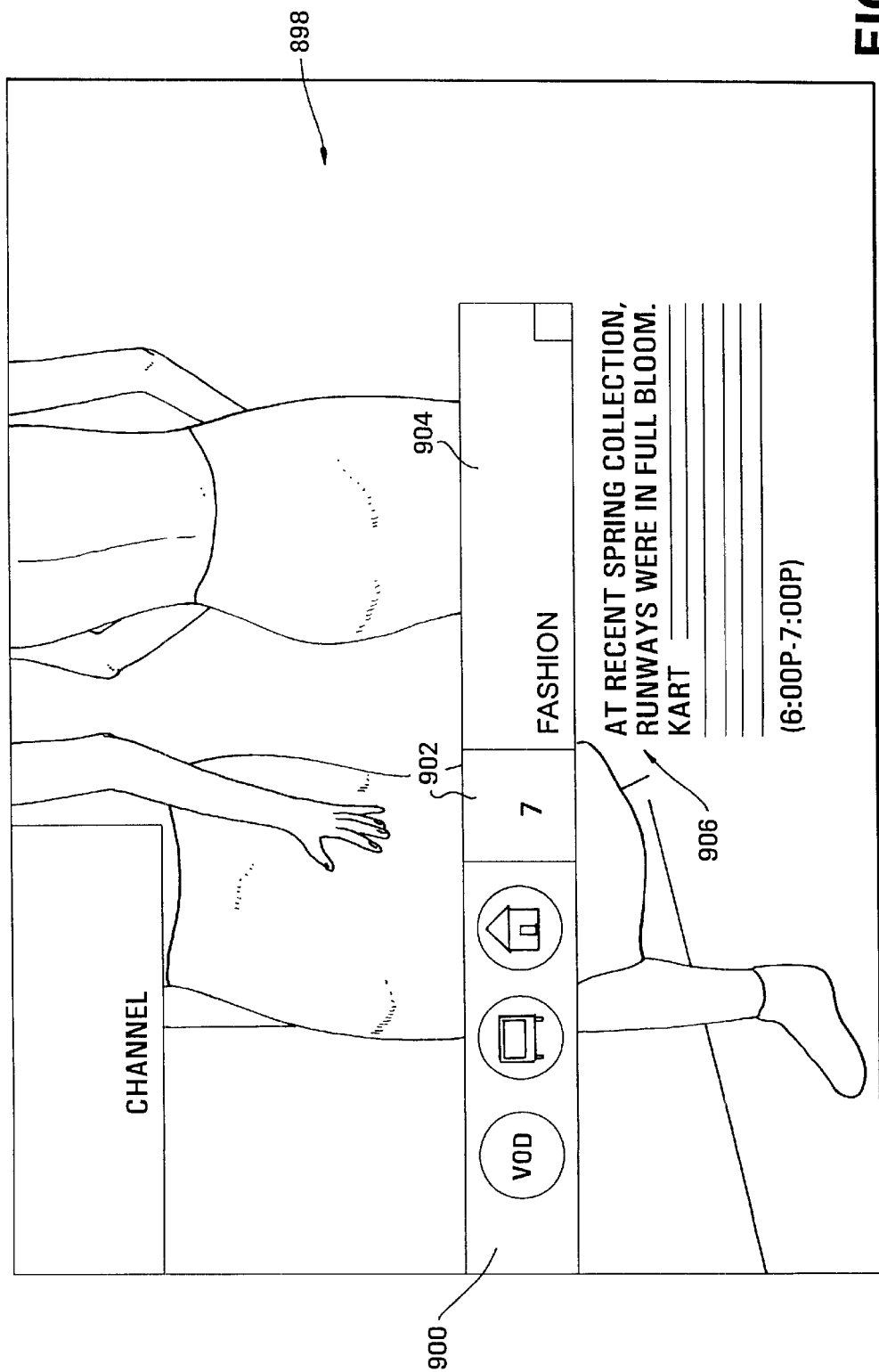
FIG. 33 is an exemplary screen in the channel tool with an informational banner displayed in full.

The channel tool displays television programs in full screen resolution mode. A viewer may enter the channel tool by either navigating to it using the up/down actuation keys 75 and 76, or by pressing the gimme button on a hot-spot linked to a program, as explained above. The channel tool contains an additional advantageous feature, an informational banner containing information about the current channel and program, which further supports the goals of the present invention. The viewer can display the banner in parts, and the information in the banner is received from the head end linked to the video data for the program. FIG. 33 contains an exemplary screen showing the full extension of the informational banner. As shown in FIG. 33, the banner contains the domain identifier 900, channel icon and number cell 902, program title indicator 904, and description box 906.

The process of navigating within the channel tool and displaying the informational banner is described with reference to FIGS. 32A–32D. When entering the channel tool or when changing channels within the tool, the program on the selected channel is displayed in full screen mode, step 950. If the informational banner was fully or partially displayed before entering the new channel, step 952, the information in the banner as displayed is updated and the banner remains on the screen for a short period of time such as five seconds, step 954. If the informational banner was not displayed, the tool identifier, domain identifier 900, and channel icon 902 are displayed on the screen for a short period such as five seconds, step 956.

The viewers navigates through channels by pressing the channel up button, step 958, or channel down button, step 960. If the viewer goes up a channel, step 962 (FIG. 32B), the system tunes to the next channel, step 964, which is the first channel, step 962, if the viewer was currently at the last channel. Similarly, if the viewer goes down a channel, step 962 (FIG. 32B), the system tunes to the prior channel, step 968, or the last channel, step 970, if the viewer was currently at the first channel. If the next or prior channel to which the system tunes is not blocked, step 972, the program on the channel is displayed, step 950 (returning to FIG. 32A). If the next or prior channel is blocked, the system may keep advancing channels until a non-blacked channel is found, or may prompt the viewer for a PIN to view the channel.

Figure 32A:
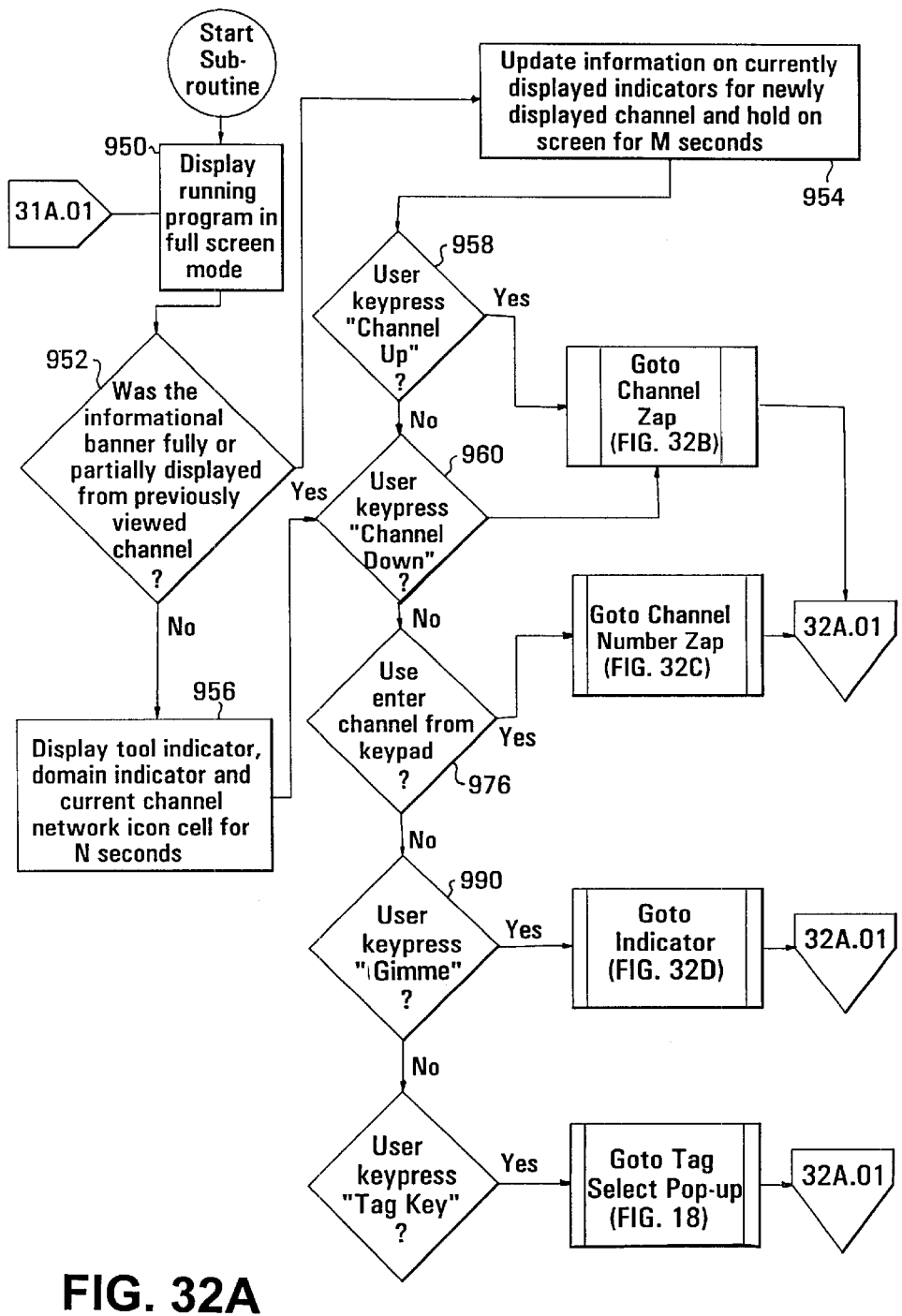
FIGS. 32A–32D contain flow charts showing the process of navigating within the channel tool of one embodiment of the present invention.
Figure 32B:
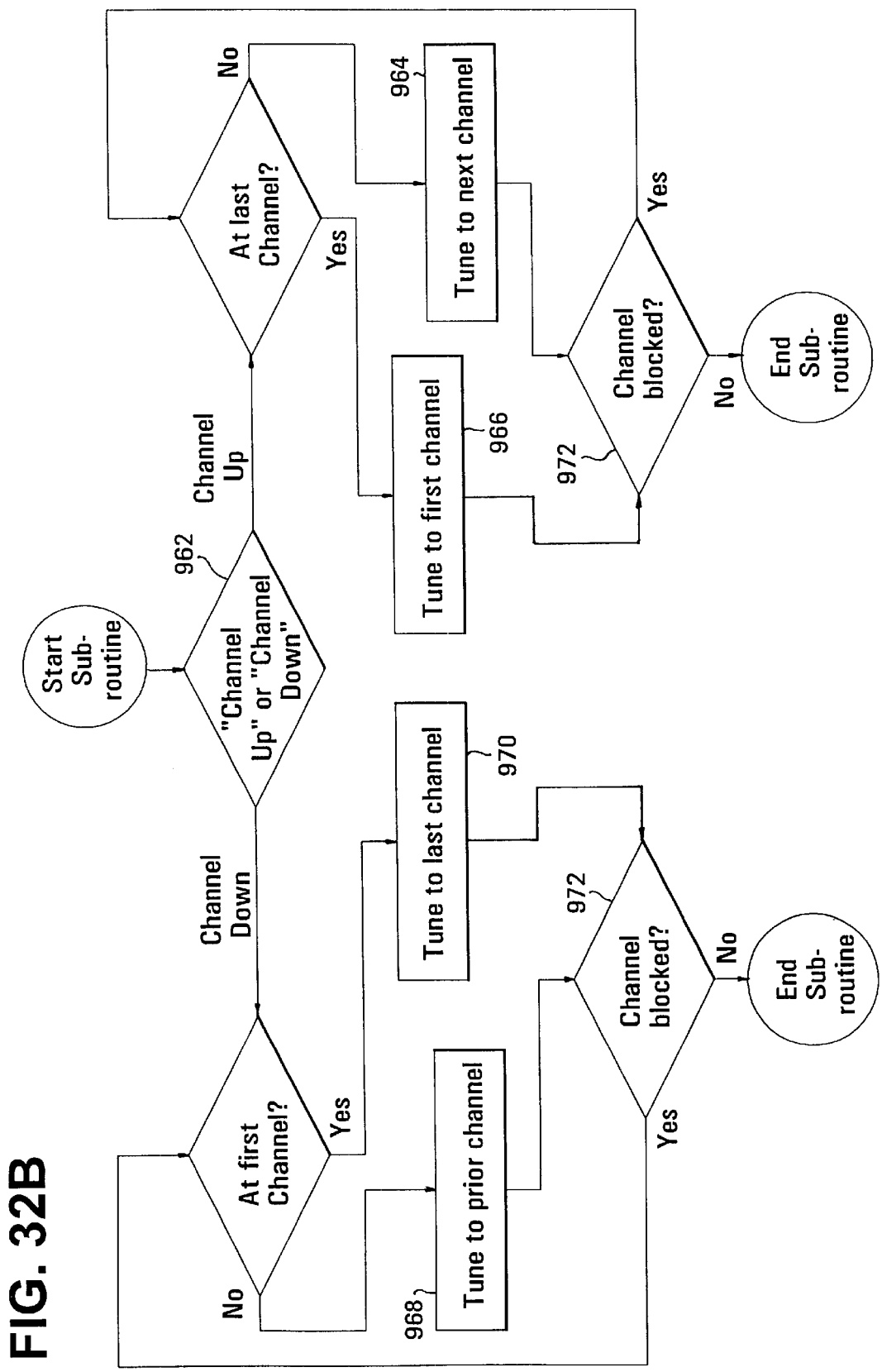
Figure 32C:
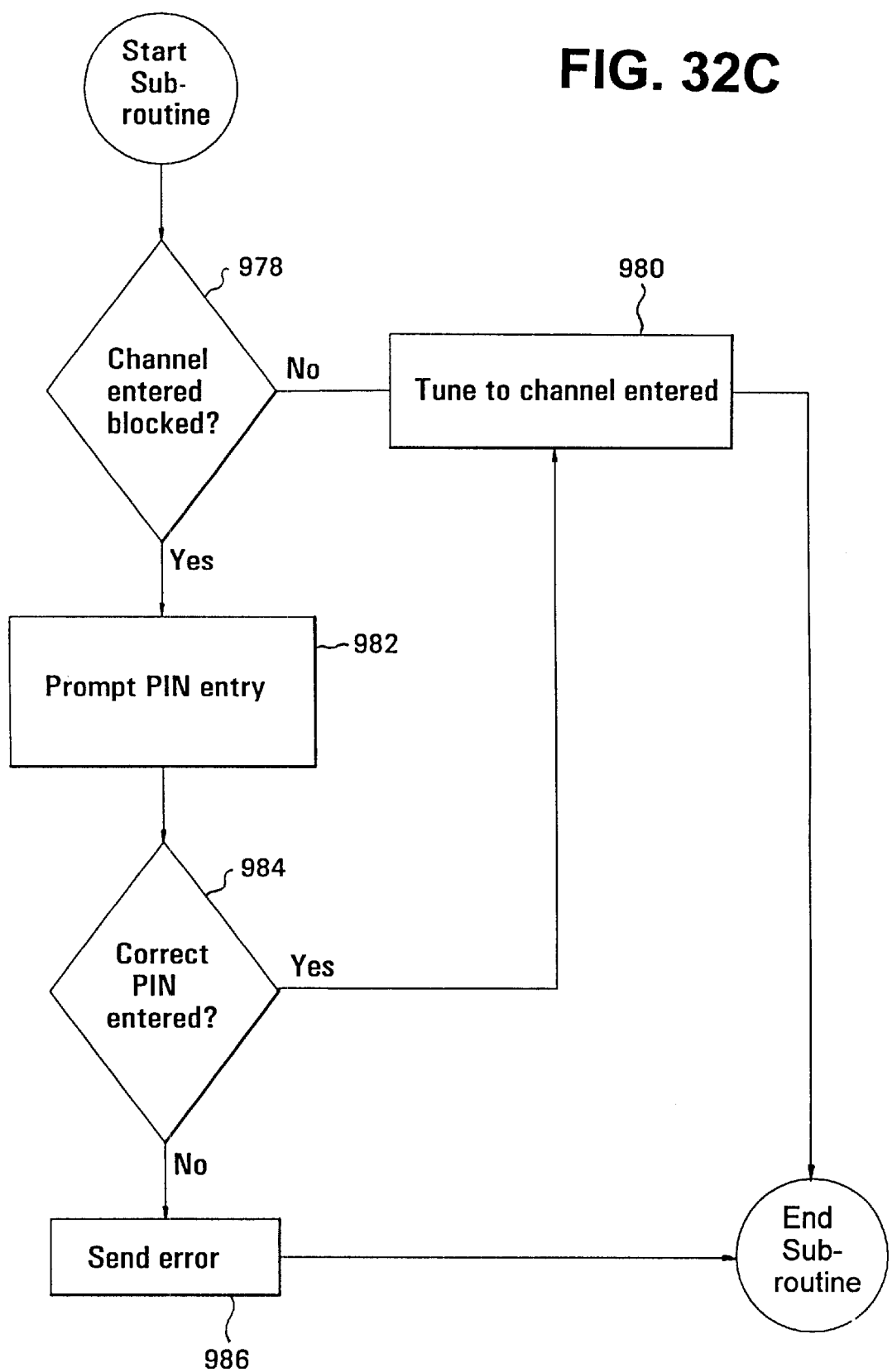

The viewer can also navigate to a specific channel by entering the channel number on the keypad 96 of remote control unit 68, step 976 (FIG. 32A). In that event, if the channel selected is not blocked, step 978 (FIG. 32C), the system tunes to the channel, step 980. If the channel is blocked, the system prompts the viewer for the PIN, step 982, and tunes to the channel if the correct PIN is entered, step 984. Otherwise, an error message is sent, step 986, indicating that the program or channel may not be viewed by the current viewer.

Figure 32D:
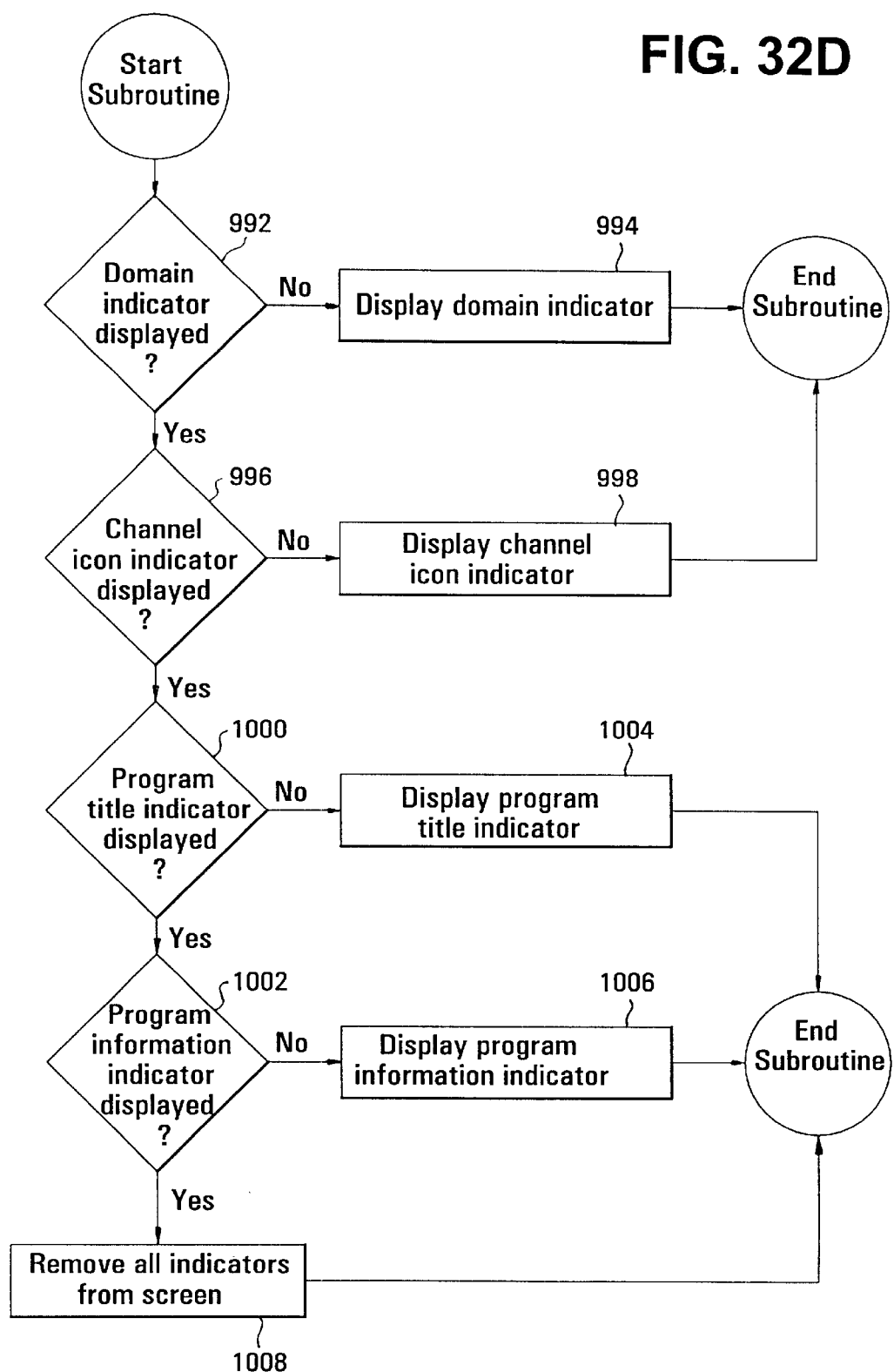

The portions of the informational banner 898 are displayed sequentially by sequential presses of the gimme key 92, step 990 (FIG. 32A). Referring now to FIG. 32D, when the gimme button is pressed, if the domain identifier is not already displayed, step 992, the system displays it, step 994. If the domain identifier is displayed, but the channel icon and number cell 902 is not yet displayed, step 996, the system displays the cell, step 998. If the program title indicator is not yet displayed, step 1000, or the program information indicator or description box is not yet displayed, step 1002, the system displays those elements at the press of the gimme button 92, steps 1004 and 1006. If the entire informational banner is displayed at the press of the gimme button, it is removed from the screen, step 1008.

Returning to FIG. 32A, if the viewer presses the tag button while watching a channel, the tag menu is displayed and the program may be tagged in accordance with the process described above with reference to FIGS. 18 and 19.

Although the channel tool allows viewers to watch programs in a manner similar to existing television systems, the channel tool also contains additional functions which enhance the objects of the navigational system of the present invention of giving viewers greater control over and more information for their viewing experience.

Information (Info) Tool

The info tool provides viewers with additional information regarding the programming delivered by the system. The info tool contains informational content that is valuable to the viewer who has limited his/her choice of programming to a few events and may obtain more information regarding the selected events. This information is often in the form of text and graphics.

The data provided in the info tool may be harvested from the world wide web, with additional meta tags added to the web documents to support the hot-spot functionality described above for selectable items in the document. The data is transmitted from the head end in synch with and linked to each program currently being transmitted on each channel. Thus, the data displayed when a viewer enters the info tool relates to the channel to which the viewer was tuned just prior to entering the info tool, as determined from the index described above. In some embodiments, background graphics data for the info tool is stored in the set top box memory and overlaid with the data feed received from the head end.

The info tool screen contains some of the common screen elements described above, including the tool identifier, domain identifier, clock, picture-in-graphics cell, and pick menu. The picture-in-graphics cell presents the video and audio data from the channel to which the info tool screen relates. Thus, viewers can read facts about a program or channel while watching it. The pick menu presents different documents or pages which can be retrieved relating to the program or channel.

In the organizational structure of the navigational map of FIG. 5, the info tool is located adjacent to the channel tool. For that reason, and further because of the content sensitive switching capabilities of the present invention, a viewer watching a program in the channel tool need only move one tool down to obtain more information about the content being watched.

Custom Tool

The custom tool provides viewers with the ability to set preferences, edit the list of tagged programs, create and edit rings of favorite channels for each of a number of viewers in a household, and block programs based on channel or rating. FIG. 34 illustrates an exemplary entry screen for the custom tool. As shown, the screen contains many common tool screen elements, including the tool identifier 1020, domain identifier 1022, clock 1024, and pick menu 1026. The pick menu lists the functions available in the tool, including those set forth above.

As also shown in FIG. 34, many of the functions available in the custom tool can be performed by multiple viewers having individual PINs. The custom tool screen contains tabbed screens 1028 for different viewers having different PINs to set their individual preferences. As explained below, each viewer's tagged program list, list of favorites, and list of blocked channels or programs is stored in a channel ring individual to that viewer.

To allow editing of the tagged list, the custom tool displays rows of the tagged to program titles and frequency for the tag, e, daily, weekly, etc., which is set as described above. The viewer may navigate up and down the rows using the directional keys, and may untag specific programs or edit the frequency by pressing the tag button and using the tag edit menu shown in FIG. 20.

Figure 35A:
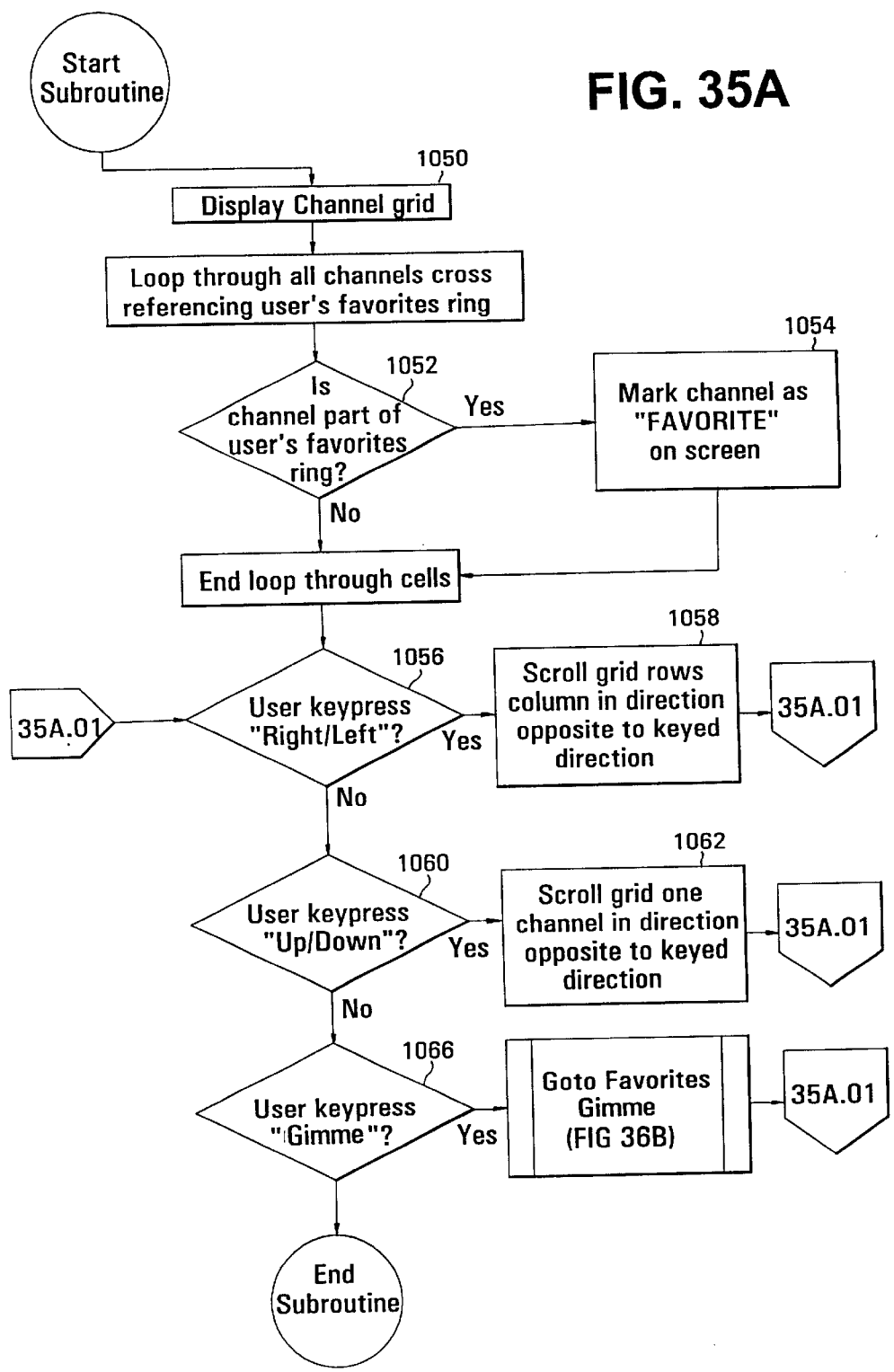
FIGS. 35A–35B contain flow charts showing the process of selecting and storing favorite channels in the custom tool.
Figure 35B:
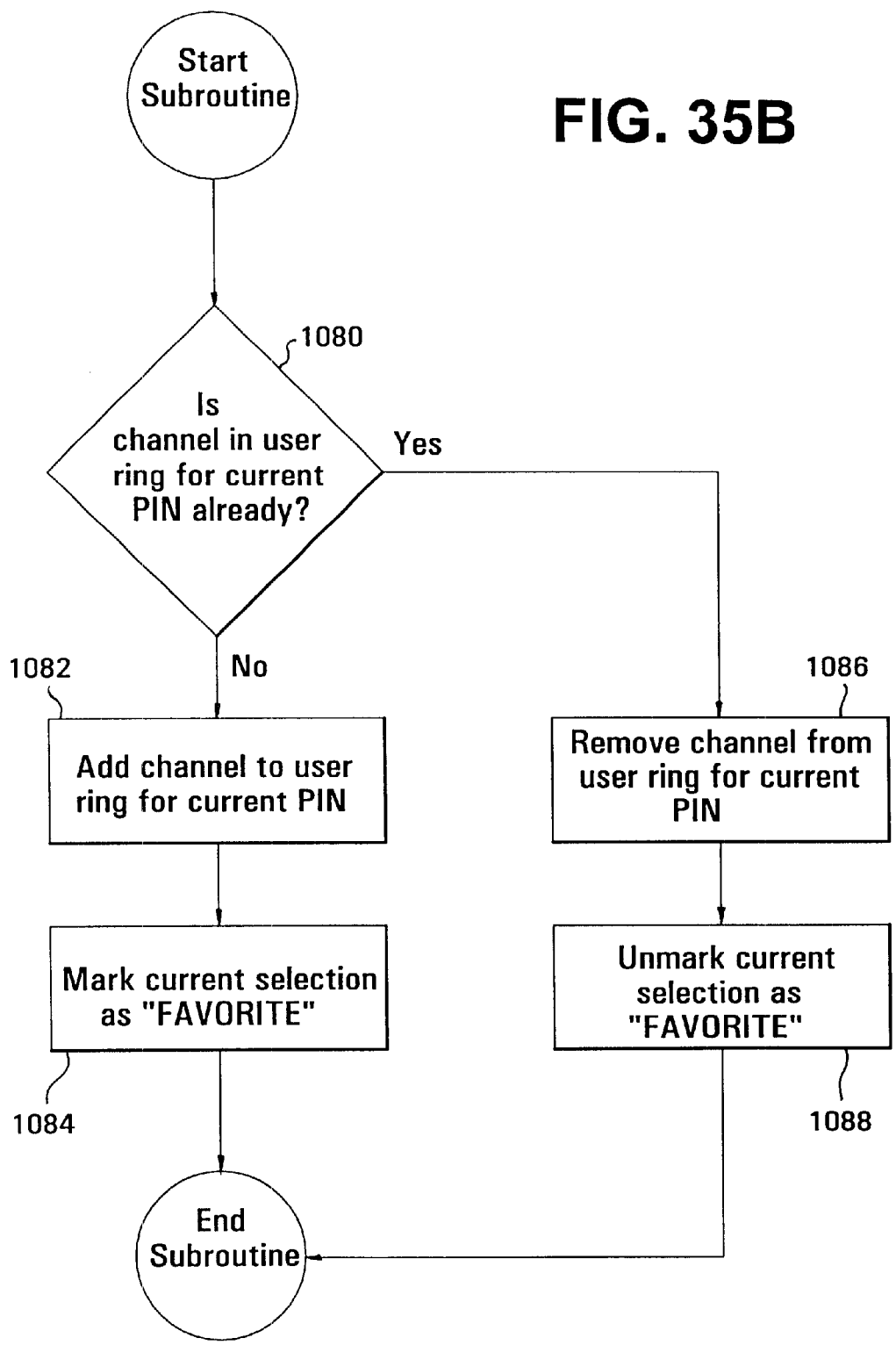

Viewers create and edit a list of favorite channels by selecting that option in the pick menu 1026. The process of navigating around this list and setting favorites is shown in FIGS. 35A–35B. The custom tool displays the entire list of channels available on the system in a grid, step 1050. For each channel in the grid, the system determines whether the channel is in the particular viewer's ring or list of favorites, step 1052, and marks those channels on the grid as "Favorites," step 1054. If the viewer presses the right or left directional keys 88 or 86, step 1056, the favorites grid is scrolled right or left to the screen for the next PIN, step 1058. If the viewer presses the up or down directional keys 82 or 84, step 1060, the favorites grid is scrolled one channel down or up, respectively, step 1062. As with the IPG tool, the lens or selected cell in the favorites grid remains stationary while the grid moves up or down.

The viewer selects and deselects a channel as a favorite by pressing the gimme button 92, step 1066. At the press of the gimme button, if the channel is not already in the particular viewer's favorites ring, step 1080, it is added to the ring, step 1082, and the channel is marked as a favorite, step 1084. If the channel is already in the viewer's favorite's ring, the channel is removed from the ring, step 1086, and the selected channel is unmarked as a favorite, step 1088.

Figure 36A:
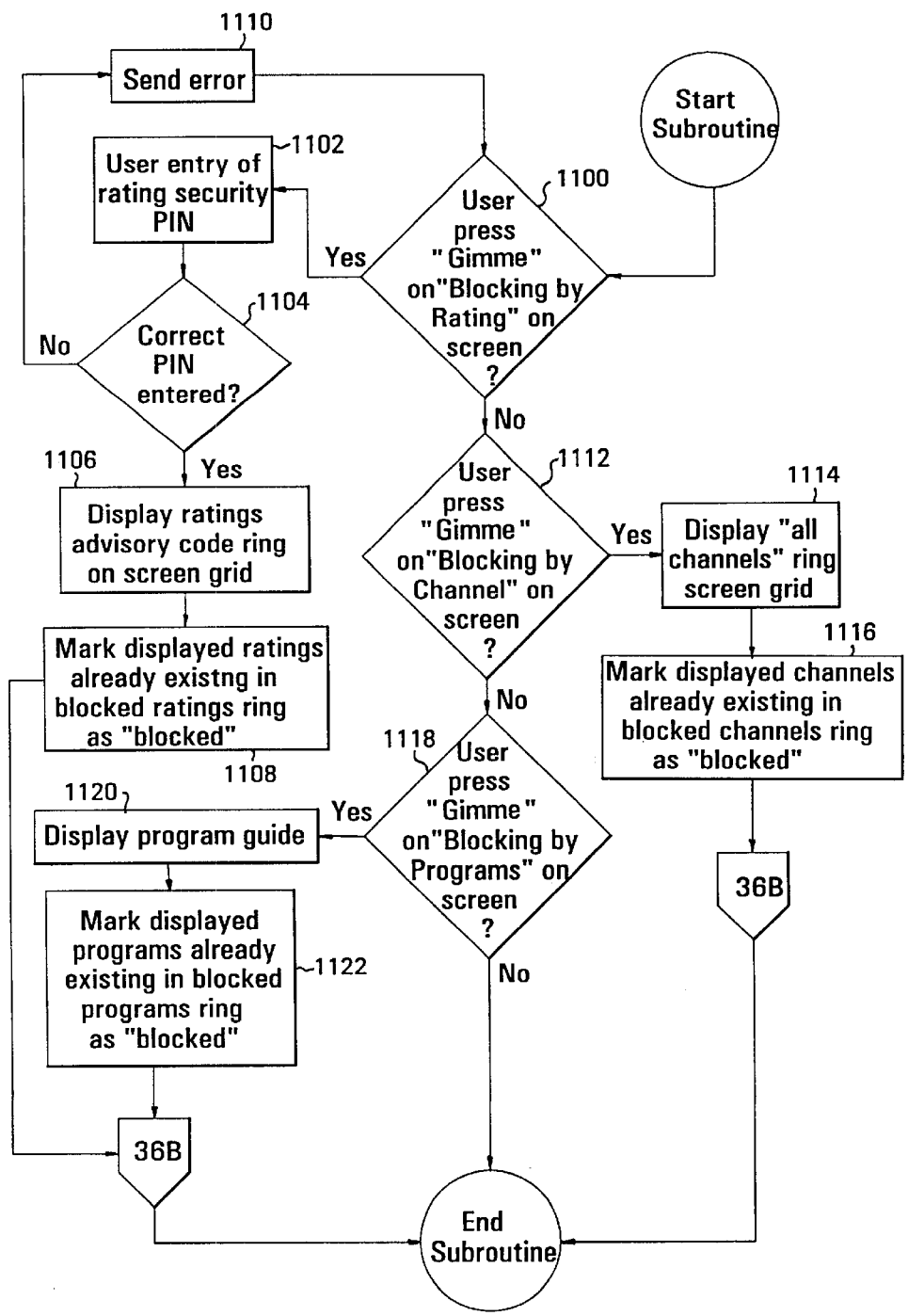
FIGS. 36A–36B contain flow charts showing the process of setting blocked channels and programs in the custom tool.
Figure 36B:
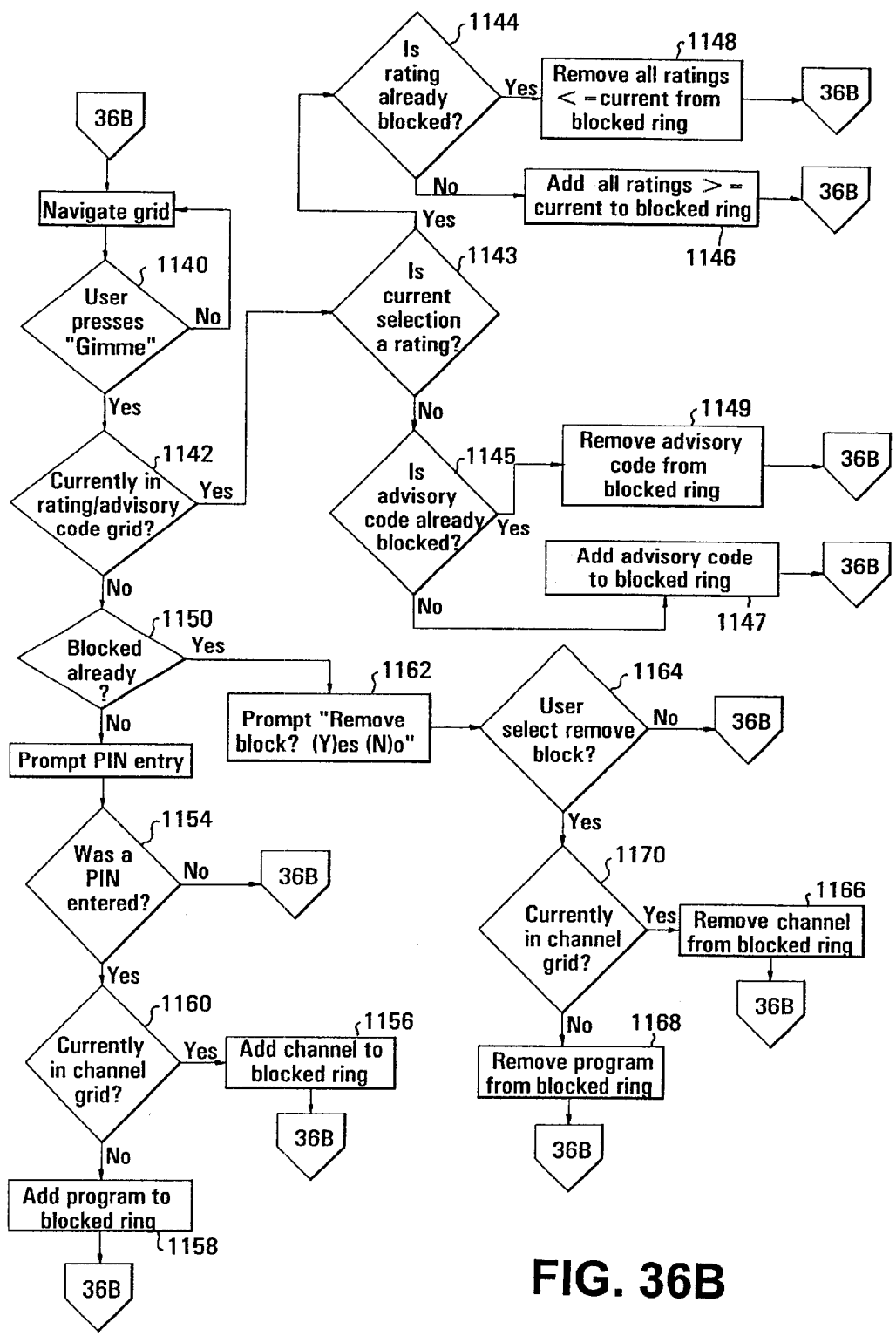

The operation of the blocking function of the custom tool is similar. A viewer may block programs by blocking the program directly, blocking the channel, or blocking all programs having a certain rating or advisory code (e.g., violence, drug use, adult content, etc.). The system stores the various blocking choices in rings, as further described below. When the viewer enters the blocking function in the custom tool, the system presents options to the viewer to select blocking by rating/advisory code, by channel or by program. Referring now to FIGS. 36A–36B, if the viewer selects with the gimme key 92 to block by rating, step 1100, the viewer is prompted to input a PIN for blocking by ratings, step 1102. If the correct PIN is input, step 1104, a ratings or advisory code grid is displayed on the screen, step 1 106, and the ratings or advisory codes already in the blocked ratings ring are marked as blocked, step 1108. If an incorrect PIN is input, an error message is presented, step 1110.

Similarly, if the viewer prefers to block by channel, step 1112, the system displays a grid of channels on the screen, step 1114, with channels already in the channel blocking ring marked as blocked, step 1116. If the viewer selects to block by program, step 1118, the system displays a program guide grid on the screen, step 1120, which may be similar to the IPG screen, with programs already in the program blocking ring marked as blocked, step 1122.

Referring to FIG. 36B, the viewer navigates around the selected grid using the remote control unit 68 in the manner explained above. If the viewer presses the gimme key 92 over any selected item in the grid, step 1140, and if the ratings/advisory code grid is displayed, step 1142, and the viewer selected a rating, step 1143, the system determines whether the selected rating is already blocked by comparing it to the blocked rating ring, step 1144. If the rating is not yet blocked, all ratings equal to and higher than the selected rating are added to the blocked rating ring, step 1146. For example, if the viewer selects the rating of R to be blocked, the R rating is blocked along with ratings of NC-17, X, etc. If the selected rating is already blocked, that rating and all ratings below it, if any, are removed from the rating ring, step 1148. If the viewer selected an advisory code, the system determines whether the advisory code is already blocked, step 1145, and if not adds the code to a ring of blocked advisory codes, step 1147, and if blocked, removes the code from the ring, step 1149.

If the viewer is in either the channel or program grid when pressing the gimme key 92, and the selected channel or program is not already blocked, step 1150, the system prompts the viewer for a PIN, step 1152. If a PIN was input, step 1154, the selected channel or program is added to the respective ring, steps 1156, 1158, depending upon whether the viewer is currently in the channel or program grid, step 1160. If the selected program or channel is already blocked, and system prompts the viewer whether to remove the block, step 1162. If the viewer wants to remove the block, step 1164, the system removes the blocked channel or program from the respective ring, steps 1166, 1168, depending upon whether the viewer is currently in the channel or program grid, step 1170.

The custom tool thus allows viewers, and parents in particular, to block their children from watching particular programs or channels, or from watching any programs or channels having certain ratings.

Channel Rings and Policies

A channel ring is data structure in which television channel line-ups for particular categories, customized favorites, and blocked programs or channels are defined and stored by the navigational system of the present invention. Particularly, a channel ring shows the channel progression when a viewer channels up from a base channel through subsequent channels. Channel ring data for categories can be delivered from the head end using the techniques described above.

Figure 37B:
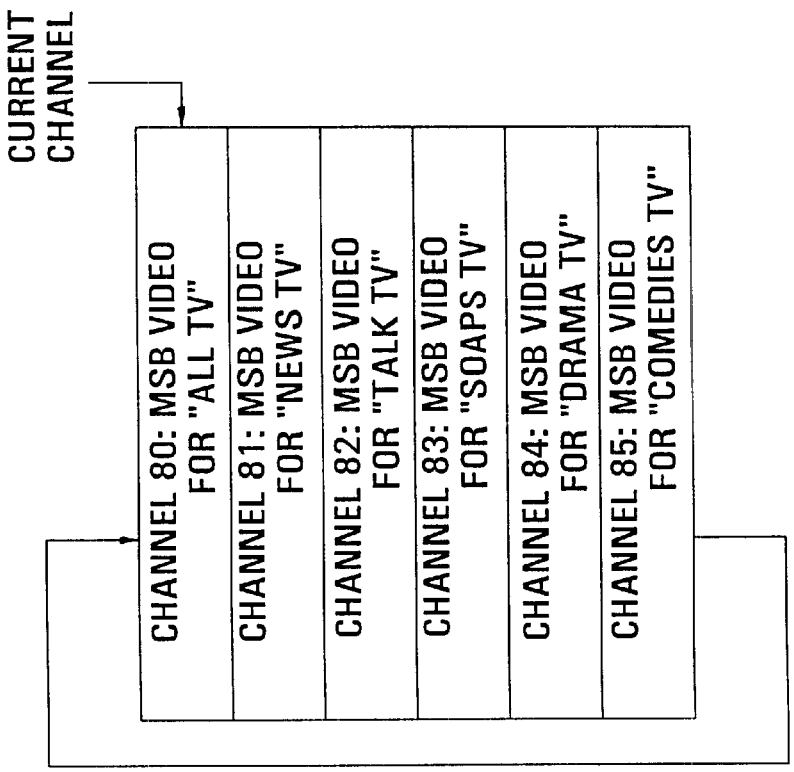
FIGS. 37A–37C illustrate exemplary channel rings with current data pointers for the host, MSB and viewing tools in the television domain.
Figure 37A:
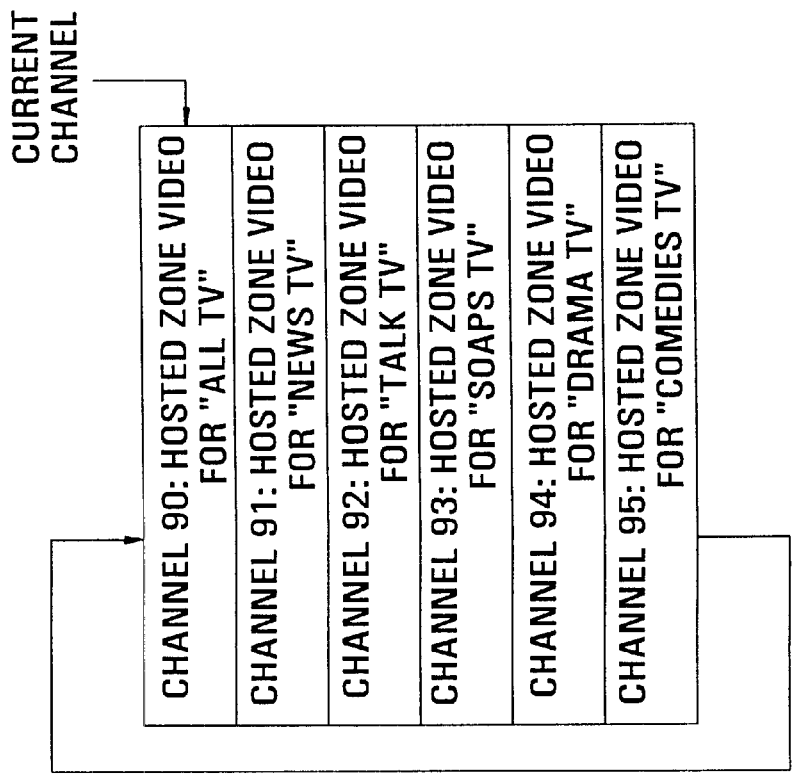

With particular reference to FIG. 37A, a channel ring with current channel pointer for the zone consisting of the host tool and television domain is provided. As explained above, a "zone" is generally the intersection between a tool and a domain. The current channel pointer indicates channel 90 (host video for "all television"). When channel up is hit, the channel will move to channel 91 the host tool and news television, and as the channels are continued to be moved up, the user will scroll through the host tool and talk television, soap opera television, drama television and comedies television, sequentially. If channel up is hit one more time after comedy television (channel 95), the channel ring will loop back to channel 90 for all television, and will progress in that manner. Moving in the down direction on the up/down channel button 74 on the remote will cause motion in the opposite direction for the channel ring.

With particular attention to FIG. 37B, a channel ring with current channel pointer for the MSB and television domain is depicted. The current channel is indicated at MSB for all television (channel 80). The channel ring, similar to that of FIG. 37A, includes six channels, channel 80 through channel 85 and scrolls sequentially through all television, news television, talk television, soap opera television, drama television and comedies television. Likewise, after comedies television at channel 85, if the up channel button is depressed one more time, the channel ring loops back to channel 80 for the MSB of "all television."

Figure 37C:
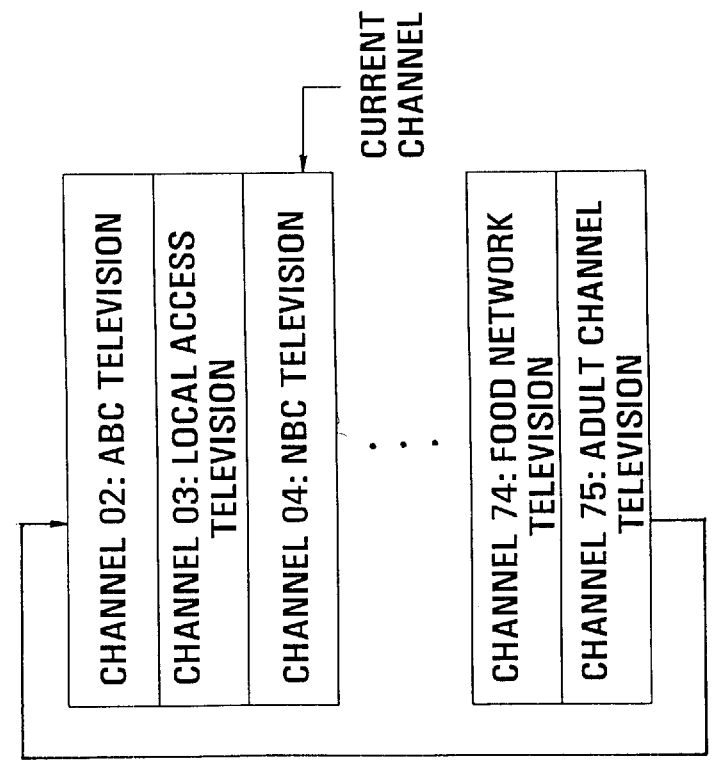

Attention is next directed to FIG. 37C which illustrates the channel ring with current channel pointer for viewing in the channel tool and television domain. This channel ring illustrates a 75 channel system, and it is sequentially accessed from channel 2 through channel 75. The middle section of the channel ring, channel 5 through channel 73, is eliminated in FIG. 37C for simplicity. However, all 75 channels would contain different programming.

Figure 38A:
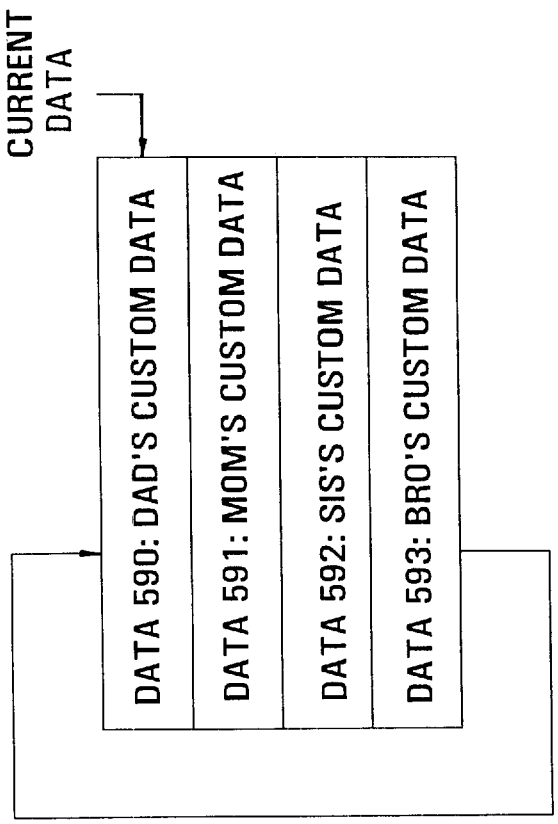
FIGS. 38A–38C illustrate exemplary channel rings with current data pointers for the custom, IPG and information tools in the television domain.

Particular attention is next directed to FIG. 38A which illustrates a data ring with current data pointer for the custom tool and television domain. The data ring includes four data channels for favorites illustrated in FIG. 38A with DAD being at data channel 590, MOM being at data channel 591, SIS at data channel 592 and BRO at data channel 593. The data channels can be scrolled through, and moved consecutively from data 590 to data 591 to data 592 to data 593 and back to data 590.

Figure 38C:
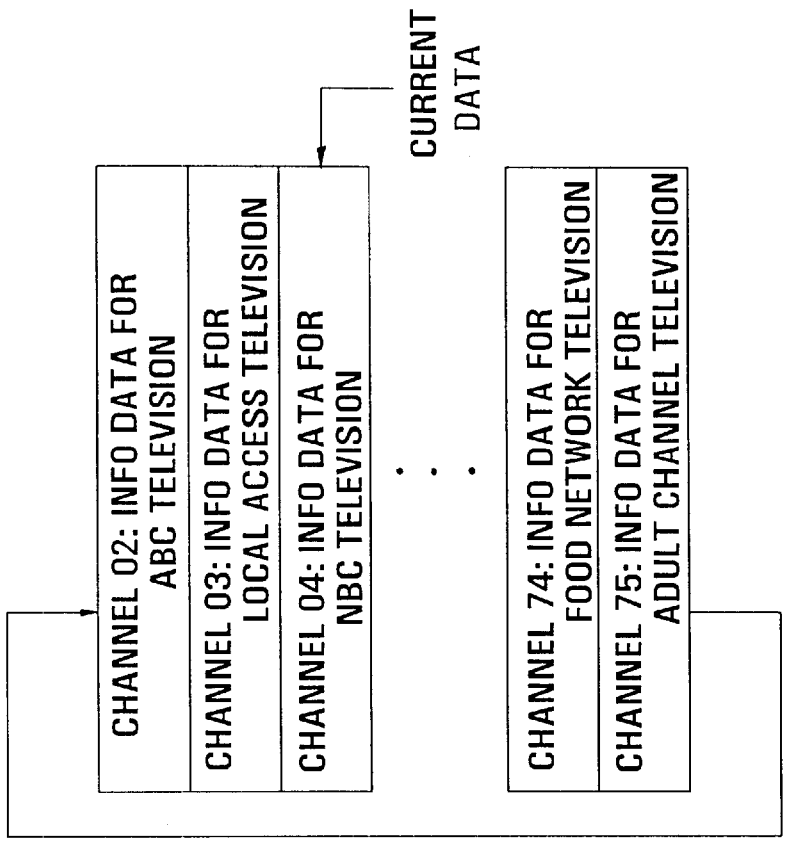
Figure 38B:
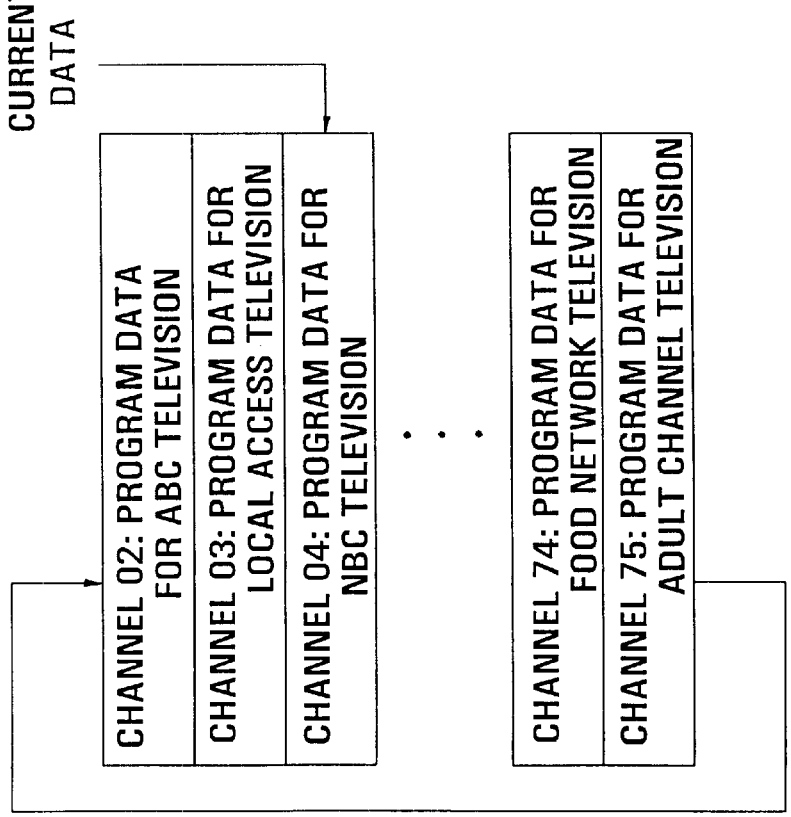

With particular attention to FIG. 38B a data ring with current data pointer for the IPG and television data is illustrated. This tool provides program data for each of the channels. For each television channel in the channel or viewing tool there is programming data for that channel in the data ring for the IPG.

Particular attention is next directed to FIG. 38C which illustrates the data ring with current data pointer for the information tool and television domain. The ring for this tool essentially mimics the channel tool, and functions similarly. For each television channel in the channel tool there is an information channel giving information on that television show as explained above.

Figures 39A, 39B:
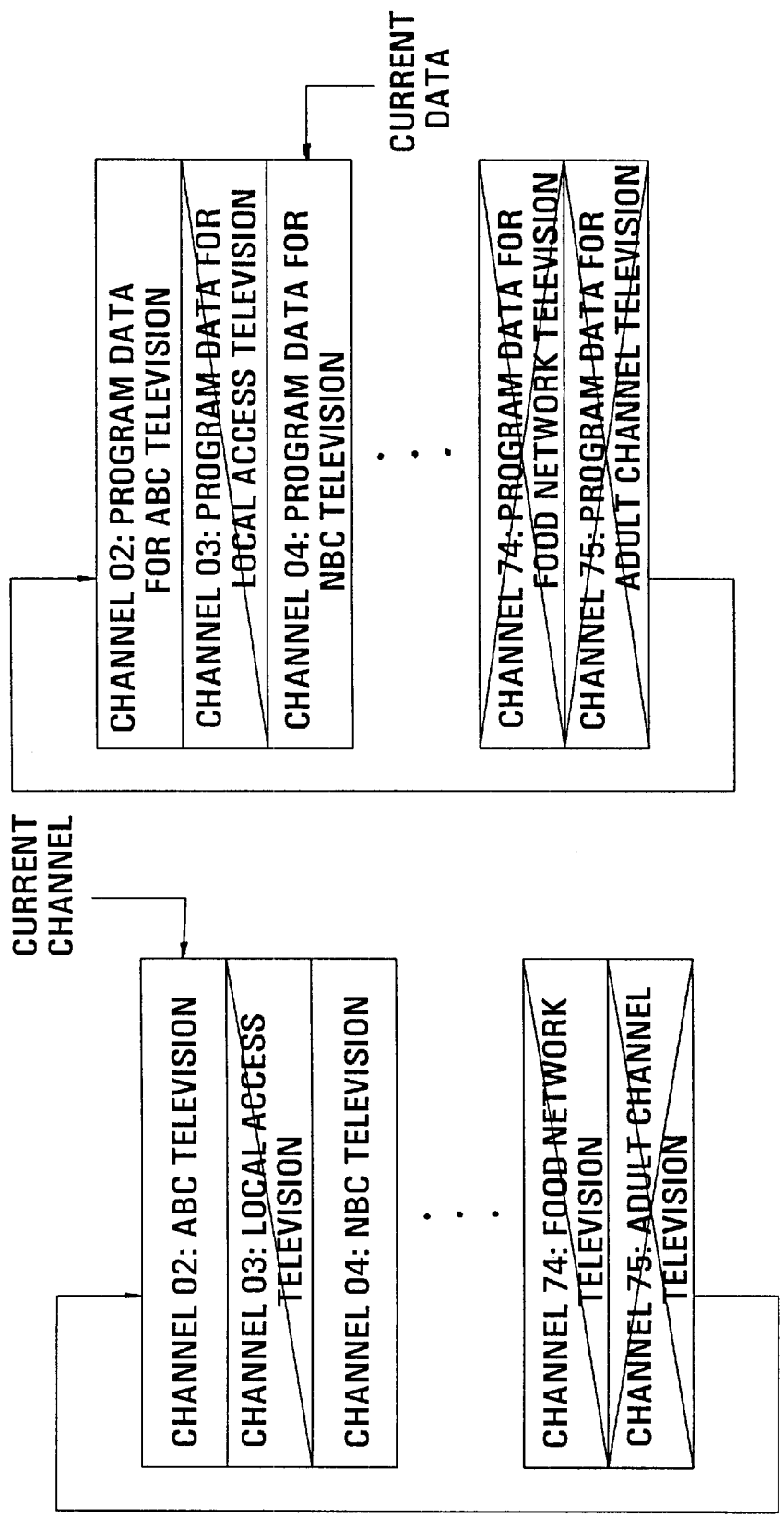
FIGS. 39A–39B illustrate exemplary channel rings with current data pointers, sorted for news and blocked for adult content in the viewing tool and IPG in the television domain.

Attention is directed to FIGS. 39A and 39B which illustrate channel rings with portions sorted and blocked. Particularly, in connection with FIG. 39A the channel ring with current channel pointer for the viewing tool and television domain is illustrated. These channel rings are sorted for news and blocked for adult content. In particular, channel 3 (local access television) and channel 74 (food network television) are sorted out as not containing news. Additionally, channel 75 (adult channel television) is blocked out as containing adult content. Accordingly, in these embodiments, the ABC television programming and NBC television programming on channels 2 and 4 respectively are accessed by the set top box when a viewer channel surfs the content on the channel ring.

With particular reference to FIG. 39B, a data ring with current data pointer for the IPG and television domain is illustrated. Similarly, channel 3 (program data for local access television) and channel 74 (program data for food network television) are sorted out as not containing news. Channel 75 (program data for adult channel television) is blocked out as containing adult content. Thus, the data ring would skip from channel 2 (program data for ABC television) to channel 4 (program data for NBC television) both of which contain news, and no adult content.

Another advantageous feature of the navigational scheme of the present invention is context sensitivity. As introduced above with reference to FIGS. 5 and 6, context sensitivity generally refers to the feature whereby when moving between tools a viewer remains in the same category of content. For example, referring to FIG. 6, when moving from a television channel in the zone defined by the channel tool and television domain, e.g., channel 5 at map coordinates (3, 2, 3), if the tool is changed such that the viewer moves to map coordinates (4, 2, 3) which is the information tool, then the system will move from the television channel 5 to information regarding the programming on channel 5.

The system associates policies with the channel rings and their pointers to control the operation of the tools in various domains. The policies affect the context sensitivity of each tool as well as the blocking functions of the present invention. Particular attention is directed to FIG. 40 which is an exemplary map of domains and zones including channel ring pointers and pointer policies for each zone. Default policies are set for each zone. Exemplary default policies include:

I. If the pointer state and the policies below would point to a blocked position, set the pointer to the default position (which is unblocked) for the channel ring;

II. If the default position is sorted-out, change the sort state to the default and the pointer to the default position;

III. If the appropriate channel ring does not exist in the current domain, use the default channel ring for that domain.

Exemplary channel ring policies include:

A. Drop any blocked items for this ring for this family member;

B. Change the ring to the last sort state and block according to family member;

C. Leave the ring for this zone unchanged.

Exemplary pointer policies are as follows:

1. Leave the pointer for this zone unchanged;

2. Change pointer to the last sort state (e.g., news);

3. Set the pointer to the last channel watched in this domain, or the nearest channel that is not blocked or sorted-out;

4. Set pointer to last family member.

In the exemplary embodiment of FIG. 40, every zone includes a channel ring policy and pointer policy. For example, in the zone defined by the host tool and games domain, the policies are "C,1", meaning that the channel ring policy is to leave the ring for this zone unchanged and the pointer policy is to leave the pointer for this zone unchanged. Alternatively, at the intersection of the channel tool and shopping domain, the policy is "A,3". Policy A states that the channel ring policy is to drop any blocked items for this ring for this family member and pointer policy 3 is to set the pointer to the last channel watched in this domain, or the nearest channel that is not blocked or sorted-out.

Taking the television domain as an example, it can be seen that the policies work to provide a user with an intuitive and efficient system. For example, the host tool has a policy "A,2" which requires that any blocked items be dropped for this ring for this family member and change pointer to the last sort state. If the last sort was news, the channel ring would start with the news host (or map location (0, 2, 1) of FIG. 6). Similarly, the zone defined by the MSB in the television domain also carries policy "A,2" which means that if news was the last sort state, this policy would require that the system go to map location (1, 2, 1) of FIG. 8 and display the news MSB.

For the IPG tool in the television domain, the policy is "B, 3" which means that the channel ring changes the ring to the last sort state and blocks according to family member. Additionally, the pointer policy is to set to the last channel watched in this domain or nearest channel that is not blocked or sorted.

Additionally, the zones for the channel and info tools have policies the same as the IPG, and would function the same. The custom tool in the television zone has a policy "C, 4" which means that the ring for this zone is unchanged and the pointer policies are to set the pointer to the last family member. Accordingly, if DAD was the last family member to be in this zone, then when this zone is accessed it would go back to DAD.

From the foregoing, it can be seen that the navigation scheme is designed to facilitate easy and effective navigation through a multiplicity of channels. Viewers can change among domains, among tools, and, when in a certain zone, among channels within that zone. The viewer is provided with a feeling of three dimensional movement when moving among domains, tools, and channels. Additionally, direct access to particular programming is provided using an enter key.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. A method for providing a dynamically changing set of categories of television programming, the method comprising:
   generating a first data set identifying a first plurality of programming categories based on a number of television programming choices available for viewing within each category at a first time exceeding a threshold;
   transmitting the first data set to at least one remote receiver;
   generating a second data set identifying a second plurality of programming categories based on a number of television programming choices available for viewing within each category at a second time later than the first time exceeding a threshold; and
   transmitting the second data set to the at least one remote receiver;
   thereby avoiding presentation of programming categories which are extraneous according to predetermined criteria.

2. The method of claim 1, comprising storing a programming schedule comprising a plurality of television programming choices available at a plurality of different times, storing at least one category associated with programming choices contained in the schedule, and wherein the steps of generating the first and second data sets comprises retrieving information contained within the programming schedule to thereby identify associated categories.

3. The method of claim 1, wherein the step of generating the second data set comprises updating the first data set to account for changes in television programming choices available for viewing from the first time to the second time.

4. The method of claim 1, comprising transmitting data representing television programming choices together with the fist data set.

5. The method of claim 4, wherein the television programming choices are represented as digital data, comprising embedding the first data set within the digital data.

6. The method of claim 1, wherein the step of transmitting comprises broadcasting the first data set from a central station to a plurality of receivers.

7. The method of claim 6, comprising transmitting with the first data set additional data representing the television programming choices associated with the plurality of categories identified by the fist data set.

8. The method of claim 1, comprising receiving the first and second data sets at the at least one remote receiver and presenting on a display device coupled to the receiver the plurality of categories contained in the first and second data sets, respectively.

9. The method of claim 8, comprising presenting the categories identified by the first data set on the display device at the first time and presenting the categories identified by the second set on the display device at the second time.

10. The method of claim 1, wherein the number of categories identified by the second data set differs from the number of categories identified by the first data set.

11. The method of claim 1, wherein the number of categories identified by the second data set equals the number of categories identified in the first data set.

12. A method for presenting a dynamically changing set of categories of programming, the method comprising:
   receiving a first set of programming categories based on a number of television programming choices available for viewing within each category at a first time exceeding a threshold;
   presenting the programming categories in the first set on a display device;
   receiving a second set of programming categories based on a number of television programming choices available for viewing within each category at a second time later than the first time exceeding a threshold; and
   presenting the plurality of programming categories in the second set on the display device;
   thereby avoiding presentation of programming categories which are extraneous according to predetermined criteria.

13. The method of claim 12, comprising allowing a viewer to select one of the programming categories presented on the display device.

14. The method of claim 13, comprising presenting the television programming choices associated with a selected category.

15. A system for presenting a dynamically changing set of categories of programming available for viewing at a given time, the method comprising:
   a transmitter for transmitting from a central station to at least one receiver first data identifying a first set of categories available at a first time and second data identifying a second set of categories available at a second time, each category in the first and second sets being associated with a set of television programming choices available for viewing at the first and second times and being based on a number of television programming choices available for viewing within each category at the first and second times exceeding a threshold, respectively;

a receiver for receiving the first and second data; and means for presenting on a display device coupled to the receiver the plurality of categories in the first and second data sets;

thereby avoiding presentation of programming categories which are extraneous according to predetermined criteria.

16. The system of claim 15, comprising means for allowing a viewer to select one of the categories from the first or second sets presented on the display device.

17. The system of claim 16, comprising means for presenting at least part of the set of television programming choices associated with a selected category.

18. A computer readable medium containing program code, which, when executed on one or more computers, causes the computer(s) to perform a method for providing a dynamically changing set of categories of television programming, the method comprising:

generating a first data set identifying a first plurality of programming categories based on a number of television programming choices available for viewing within each category at a first time exceeding a threshold;

transmitting the first data set to at least one remote receiver;

generating a second data set identifying a second plurality of programming categories based on a number of television programming choices available for viewing within each category at a second time later than the first time exceeding a threshold; and transmitting the second data set to at least one receiver;

thereby avoiding presentation of programming categories which are extraneous according to predetermined criteria.

19. The computer readable medium of claim 18, wherein the method performed by the computer(s) comprises storing a programming schedule comprising a plurality of television programming choices available at a plurality of different times, storing at least one category associated with programming choices contained in the schedule, and wherein the step of generating the first and second data sets comprises retrieving information contained within the programming schedule to thereby identify associated categories.

20. The computer readable medium of claim 18, wherein generating the second data set comprises updating the first data set to account for changes in television programming choices available for viewing from the first time to the second time.

21. The computer readable medium of claim 18, wherein the method performed by the computer(s) comprises transmitting data representing television programming choices together with the first data set.

22. The computer readable medium of claim 21, wherein the television programming choices are represented as digital data and wherein the method performed by the computer comprises embedding the first data set within the digital data.

23. The computer readable medium of claim 18, wherein the step of transmitting comprises broadcasting the first data set from a central station to the plurality of receivers.

24. The computer readable medium of claim 23, wherein the method performed by the computer(s) comprises transmitting with the first data set additional data representing the television programming choices associated with the plurality of categories identified by the first data set.

25. The computer readable medium of claim 18, wherein the method performed by the computer(s) comprises receiving the first and second data sets at the at least one remote receiver and presenting on a display device coupled to the receiver the plurality of categories contained in the first and second data sets, respectively.

26. The computer readable medium of claim 25, wherein the method performed by the computer(s) comprises presenting the categories identified by the first data set on the display device at the first time and presenting the categories identified by the second set on the display device at the second time.

27. The computer readable medium of claim 18, wherein the number of categories identified by the second data set differs from the number of categories identified by the first data set.

28. The computer readable media of claim 18, wherein the number of categories identified by the second data set equals the number of categories identified in the first data set.

29. A computer readable medium containing program code, which, when executed on one or more computers, causes the computer(s) to perform a method for presenting a dynamically changing set of categories of programming, the method comprising:

receiving a first set of programming categories based on a number of television programming choices within each category available for viewing at a first time exceeding a threshold;

presenting the programming categories in the first set on a display device;

receiving a second set of programming categories based on a number of television programming choices with on a number of television programming choices with each category available for viewing at a second time later than the first time exceeding a threshold; and presenting the plurality of programming categories in the second set on the display device;

thereby avoiding presentation of programming categories which are extraneous according to predetermined criteria.

* * * * *